United States Patent [19]
Hashima et al.

[11] Patent Number: 5,617,335
[45] Date of Patent: Apr. 1, 1997

[54] SYSTEM FOR AND METHOD OF RECOGNIZATING AND TRACKING TARGET MARK

[75] Inventors: Masayoshi Hashima; Fumi Hasegawa; Keijü Okabayashi; Ichiro Watanabe; Shinji Kanda; Naoyuki Sawasaki; Yuichi Murase, all of Kawasaki, Japan

[73] Assignee: Fujitsu Limited, Kawasaki, Japan

[21] Appl. No.: 588,320

[22] Filed: Jan. 18, 1996

Related U.S. Application Data

[62] Division of Ser. No. 119,228, Sep. 28, 1993, Pat. No. 5,521,843.

[30] Foreign Application Priority Data

| Jan. 30, 1992 | [JP] | Japan | 4-015557 |
| Jun. 26, 1992 | [JP] | Japan | 4-193457 |
| Aug. 18, 1992 | [JP] | Japan | 4-219029 |
| Oct. 29, 1992 | [JP] | Japan | 4-291628 |
| Nov. 17, 1992 | [JP] | Japan | 4-307015 |

[51] Int. Cl.[6] ................................. G01S 5/00
[52] U.S. Cl. ........................ 364/516; 340/815.57
[58] Field of Search ........................ 364/516, 559; 340/815.57, 815.68; 382/10, 14, 18, 25, 51; 33/293

*Primary Examiner*—Ellis B. Ramirez
*Assistant Examiner*—Thomas Peeso
*Attorney, Agent, or Firm*—Armstrong, Westerman, Hattori, McLeland & Naughton

[57] ABSTRACT

A system for and a method of recognizing and tracking a target mark with a video camera is disclosed. The system includes a target mark (10) disposed on an object (1) and composed of a black circle and a white triangle mounted centrally on the black circle and three-dimensionally shifted from the black circle, a video camera (20) for imaging the target mark (10), a robot (30) supporting the video camera (20) and movable in directions with six degrees of freedom, an image processor (40) for processing image data of the target mark which is produced by the video camera (20), a shift calculating unit (50) for detecting a shift of the target mark (10) from projected histogram information of the target mark (10) which is produced by the image processor (40), and a robot controller (60) for controlling movement of the robot depending on the shift to enable the video camera (20) to track the target mark (10). The system is capable of tracking the target mark (20) attached to the object (1) on a real-time basis. Mark recognizing apparatus capable of accurately recognizing target marks of other shapes is also disclosed.

20 Claims, 47 Drawing Sheets

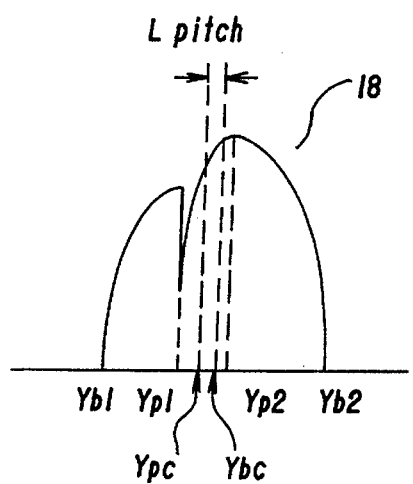
FIG.20
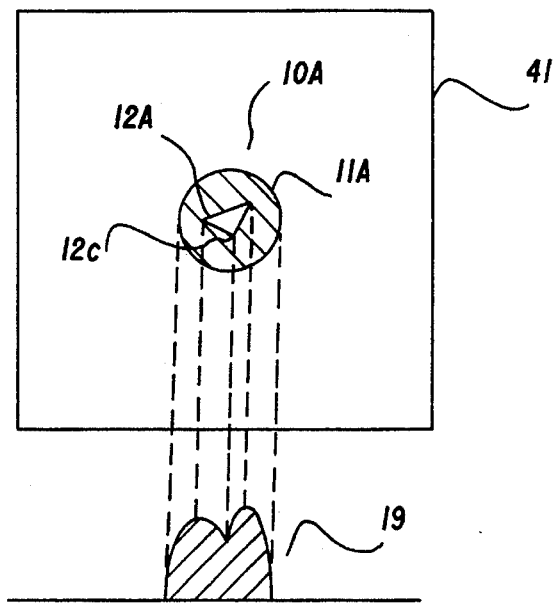
FIG.21
FIG.22
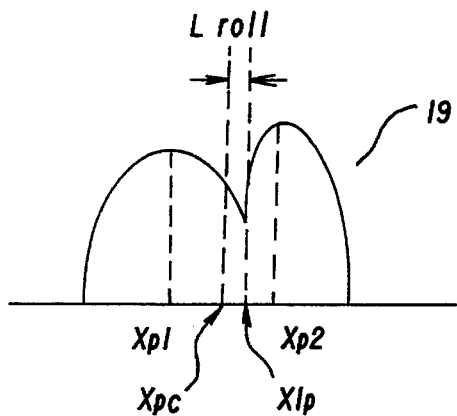
FIG.23
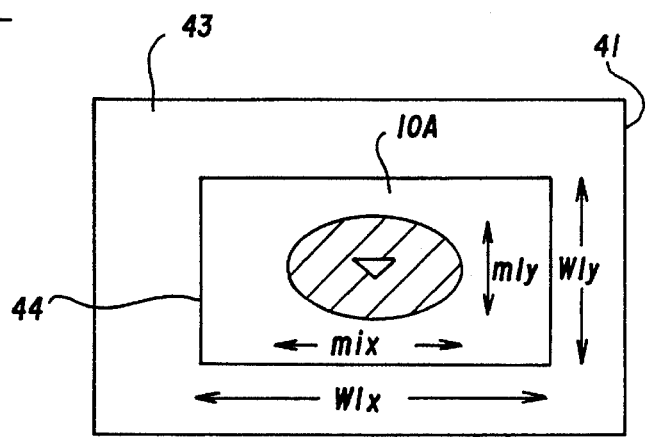

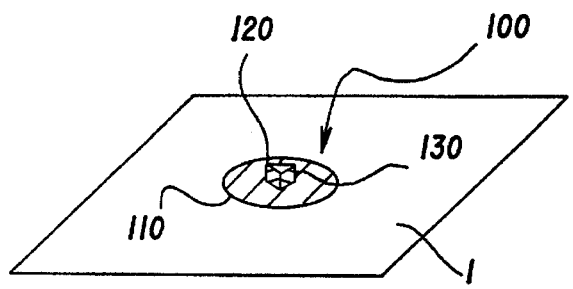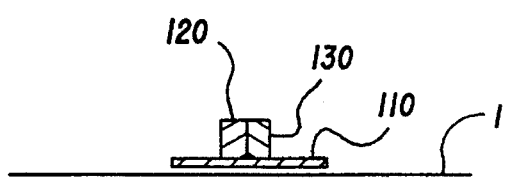
FIG.24(A)   FIG.24(B)
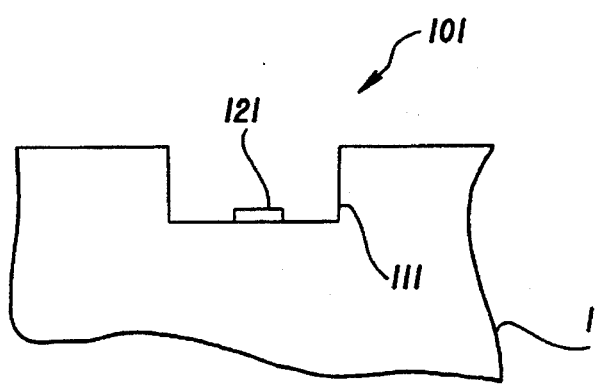
FIG.25
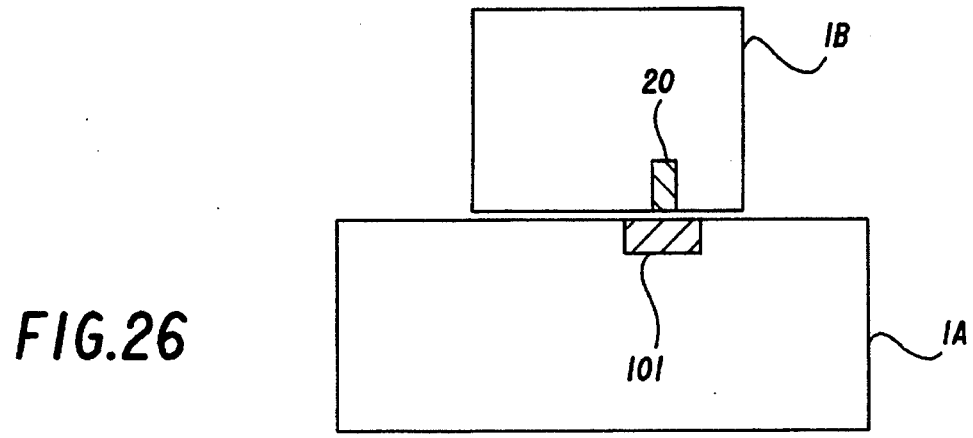
FIG.26

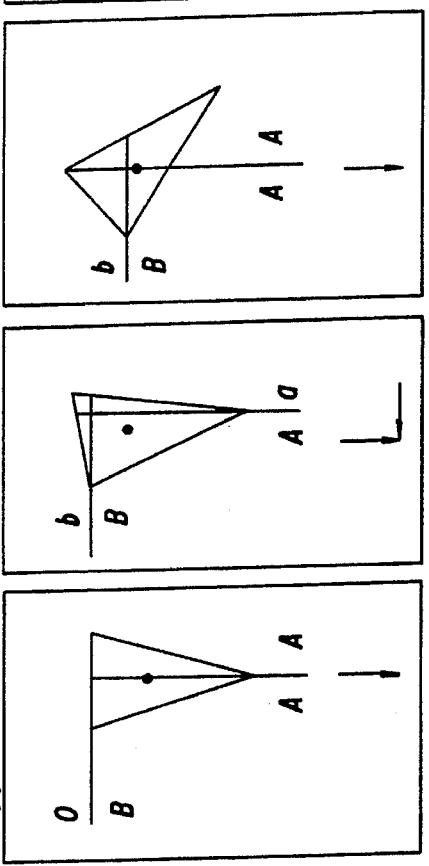
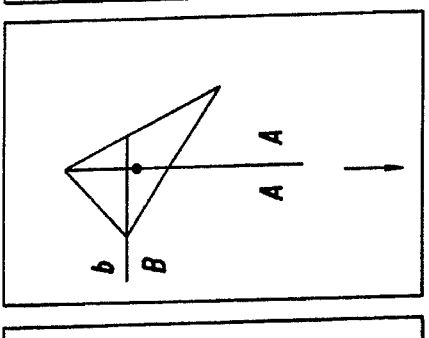
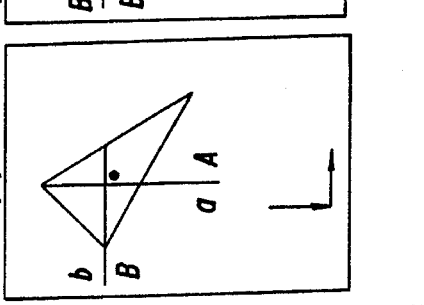
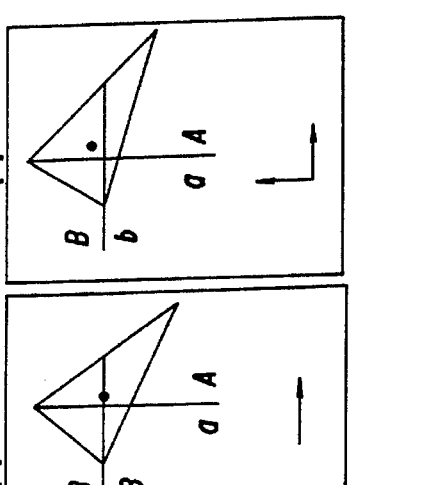
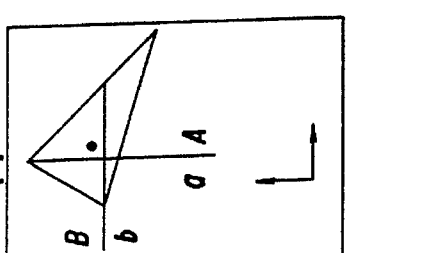
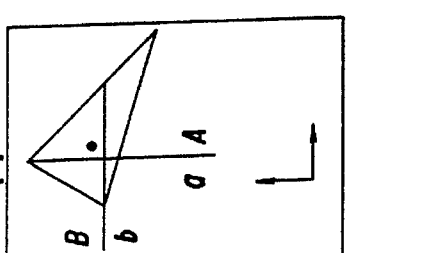
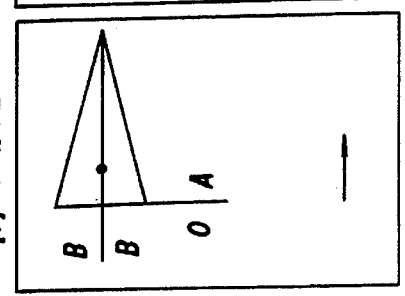
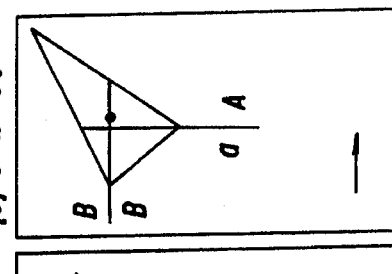
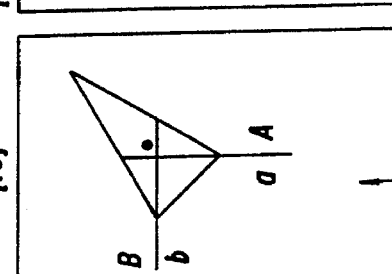
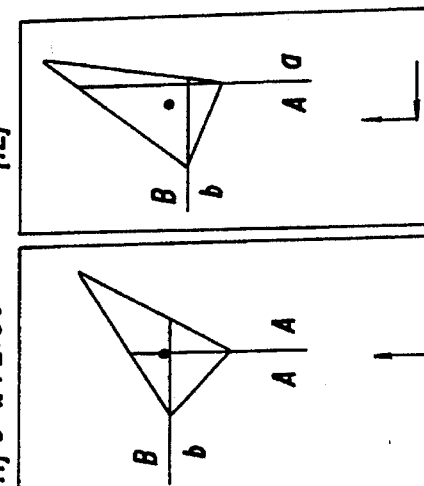
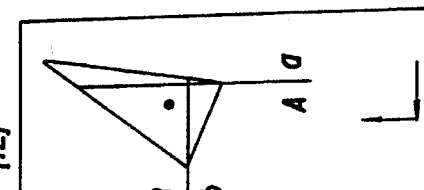
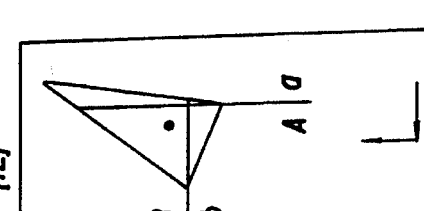

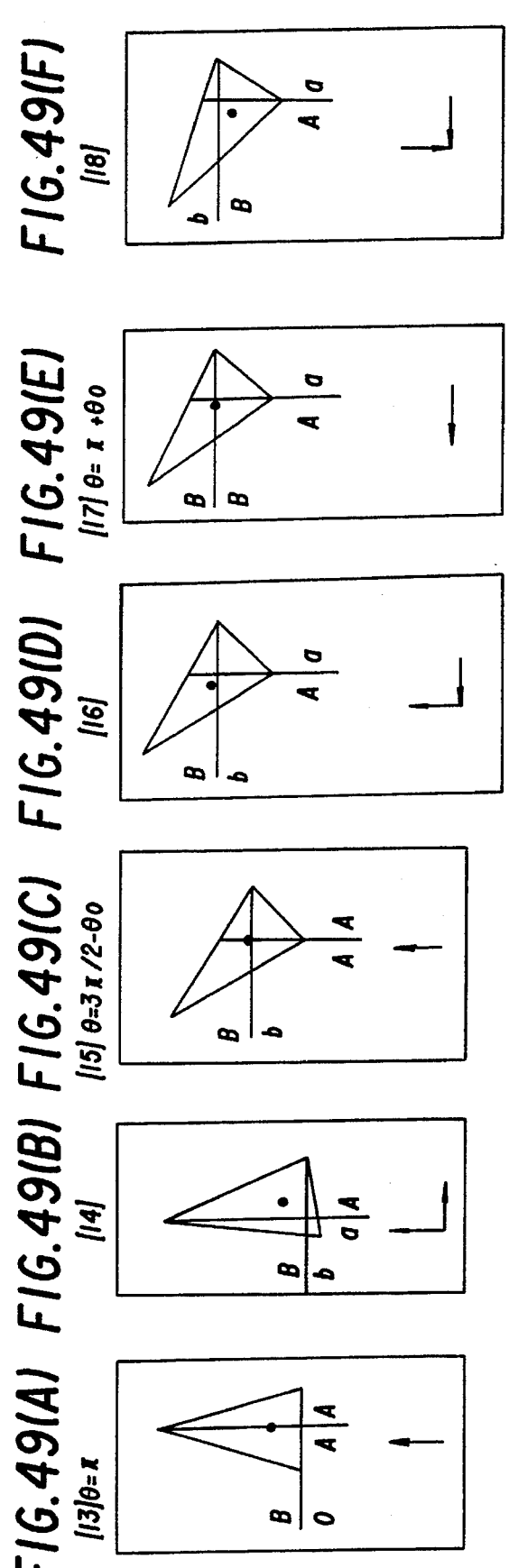

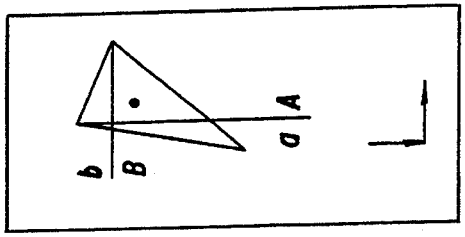
FIG.49(G) [19] θ=3π/2
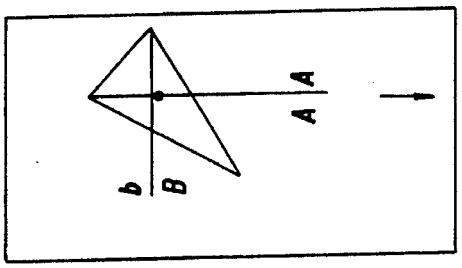
FIG.49(H) [20]
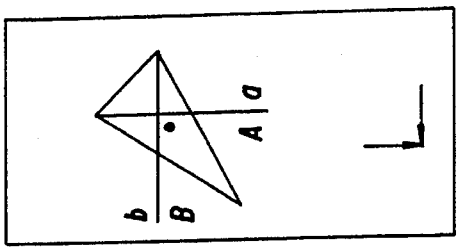
FIG.49(I) [21] θ=2π−θ₀
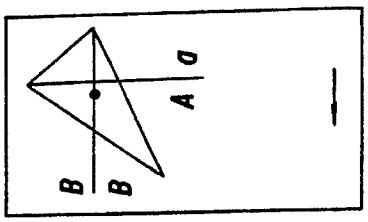
FIG.49(J) [22]
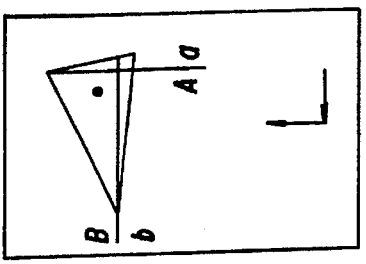
FIG.49(K) [23] θ=3π/2+θ₀
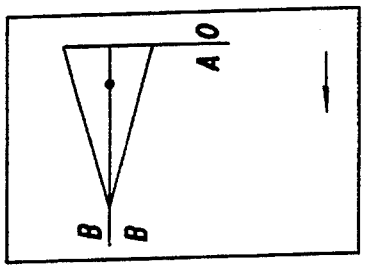
FIG.49(L) [24]

FIG. 50(A)

| CLASSIFIED BY MAXIMUM LENGTH POSITION AND CENTER-OF-GRAVITY POSITION | CLASSIFIED BY MAXIMUM LENGTH RELATIONSHIP | PERTINENT PATTERN |
|---|---|---|
| Xm=Xg, Ym>Yg | Hy>Lp, Hx<Lp | [1] |
| Xm=Xg, Ym>Yg | Hy=Lp, Hx<Lp | [3], [23] |
| Xm=Xg, Ym<Yg | Hy>Lp, Hx<Lp | [13] |
| Xm=Xg, Ym<Yg | Hy=Lp, Hx<Lp | [11], [15] |
| Xm>Xg, Ym=Yg | Hy<Lp, Hx>Lp | [19] |
| Xm>Xg, Ym=Yg | Hy<Lp, Hx=Lp | [17], [21] |
| Xm<Xg, Ym=Yg | Hy<Lp, Hx>Lp | [7] |
| Xm<Xg, Ym=Yg | Hy<Lp, Hx=Lp | [5], [9] |

FIG. 50(B)

| Position | Length relationship | Pertinent pattern |
|---|---|---|
| Xm>Xg, Ym>Yg | Hy>Lp, Hx<Lp | [2] |
| Xm>Xg, Ym>Yg | Hy<Lp, Hx<Lp | [18] |
| Xm>Xg, Ym>Yg | Hy>Lp, Hx>Lp | [22] |
| Xm<Xg, Ym<Yg | Hy>Lp, Hx<Lp | [14] |
| Xm<Xg, Ym<Yg | Hy<Lp, Hx<Lp | [6] |
| Xm<Xg, Ym<Yg | Hy>Lp, Hx>Lp | [10] |
| Xm<Xg, Ym>Yg | Hy>Lp, Hx<Lp | [24] |
| Xm<Xg, Ym>Yg | Hy<Lp, Hx<Lp | [8] |
| Xm<Xg, Ym>Yg | Hy>Lp, Hx>Lp | [4] |
| Xm>Xg, Ym<Yg | Hy>Lp, Hx<Lp | [12] |
| Xm>Xg, Ym<Yg | Hy<Lp, Hx<Lp | [20] |
| Xm>Xg, Ym<Yg | Hy>Lp, Hx>Lp | [16] |

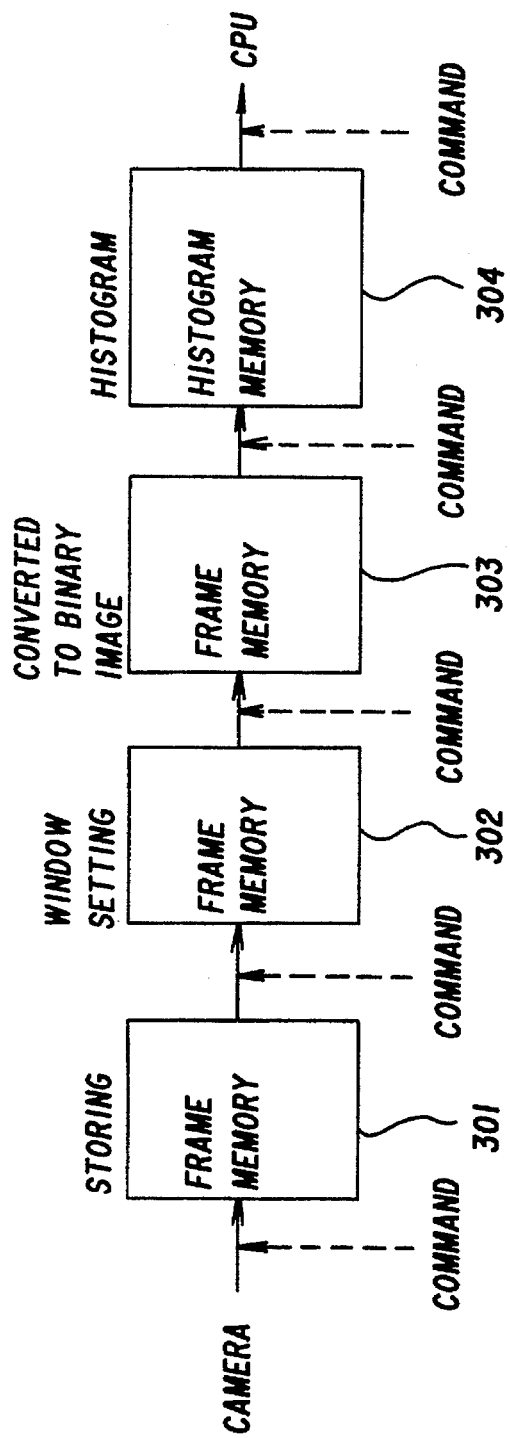
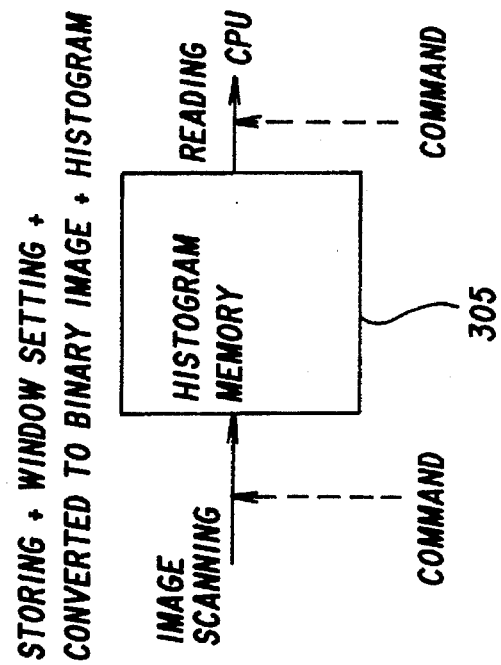
FIG.51(A)
FIG.51(B)

FIG. 54(A) VIDEO SIGNAL
FIG. 54(B) VERTICAL SYNCHRONIZING SIGNAL
HORIZONTAL SYNCHRONIZING SIGNAL
FIG. 54(C) DOT CLOCK (12.5MHz)
FIG. 54(D) COMPARATOR OUTPUT (BINARY PULSES)
FIG. 54(E) SIGNAL IN WINDOW
FIG. 54(F) AND GATE OUTPUT

FIG.64(A)
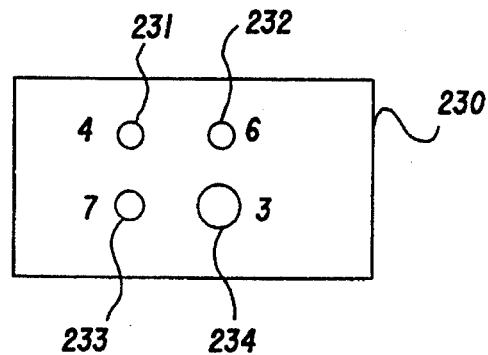
FIG.64(B)
| LABEL NUMBER | NUMBER OF PIXELS |
|---|---|
| 3 | 8500 |
| 4 | 5110 |
| 6 | 5120 |
| 7 | 5114 |
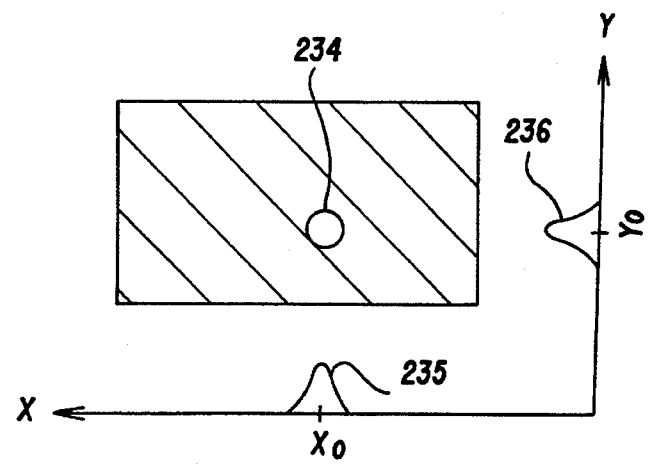
FIG.65

SYSTEM FOR AND METHOD OF RECOGNIZATING AND TRACKING TARGET MARK

This is a division of application Ser. No. 08/119,228, filed Sep. 28, 1993, now U.S. Pat. No. 5,521,843.

TECHNICAL FIELD

The present invention relates to a system for and a method of recognizing and tracking a target mark using a video camera, and more particularly to a system for and a method of recognizing and tracking a target mark for detecting the position and attitude of the target mark by processing an image of the target mark produced by a video camera, detecting a shift of the position of the target mark from a predetermined position, and controlling the position and attitude of a processing mechanism based on the detected shift.

BACKGROUND ART

To have a robot grip a moving object by itself or dock a spacecraft with another spacecraft, it is necessary to recognize and track a target mark on the moving object or the spacecraft using a video camera.

There has heretofore been known a process of measuring the position and attitude of an object by producing an image of a target mark on the object with a video camera, and processing the data of the produced image to determine the position and attitude of the object. The process may be used in an application for gripping the object with a robot hand. In such an application, the video camera is mounted on a robot, which tracks the target mark based on position and attitude data of the target mark which are produced by the video camera, for gripping the object with the robot hand.

The conventional process takes its time until the position and attitude of the object are recognized by processing the image data of the target mark. It has been impossible for the prior process to effect a real-time data feedback to the robot and also difficult to track the object.

Another process which effects pattern matching on images to track an object is time-consuming as it requires lots of calculations in a two-dimensional space.

According to still another process of tracking an object, movement of the object is grasped, and the position of the moving object is predicted. This process cannot simply be applied to movement of an ordinary object because the process is based on the fact that the object makes regular movements.

Before a target mark is recognized, it is necessary to extract a desired mark from an image which either contains another object or objects or has a lot of noises. To meet such a requirement, the conventional processes compare the area of the mark or extracts features by way of pattern matching.

The area comparison procedure determines as a desired mark an extracted image having substantially the same area as the desired mark. It is virtually impossible, however, to extract a desired mark from an image which either contains an object of almost the same size around the mark or has a lot of noises. The area comparison procedure thus finds use in a limited range of applications.

The feature extraction procedure based on pattern matching needs a large expenditure of time for searching an image memory, and hence it processing time is long.

To measure the position and attitude of an object in a three-dimensional space, there is employed a triangular or rectangular target mark representing the positional relationship between three or four points. If such a target mark is attached to a certain plane of an object, then the position and attitude of the object can be measured from the positional relationship of the image of the target mark in an image space. In the measurement, calculations based on projective geometry are effected on the coordinates of image points that are projected from the object space of the target mark onto the image plane of a camera. When the position or attitude of the object changes, the relationship between image points on the target mark also changes. Therefore, it is possible to calculate the position and attitude of the object in the three-dimensional space based on the change in the relationship between image points on the target mark.

Since a conventional measuring system using target marks calculates the position and attitude of an object based on the coordinates of image points that are extracted from a triangular or rectangular target mark image, the measuring accuracy tends to vary depending on the attitude of the target mark with respect to the camera. Specifically, when image data containing a directional component is obtained from each image point on an image plane to describe a certain plane of the object to which a target mark is attached, a reference distance with respect to each image point varies, resulting in a lack of stability with respect to the measuring accuracy for the position and attitude.

Conventional calculations of a position using a target mark require that the plane of the target mark be at a certain angle to the plane of an image, and hence need much more calculation parameters than if the camera faces the target mark head on. Therefore, the calculations in measuring the position are complex, and the measuring accuracy is lowered.

When a mark in the form of four points is converted into an image by an imaging means, the four points are shown as having a certain area on the image, making it impossible to accurately determine the positions of the points in the image data. Accordingly, the positions of the points on the image cannot be determined in terms of subpixels. Since the distance up to the object and the attitude of the object are calculated based on the inaccurate positions of the points in the image data, the distance up to the object and the attitude of the object cannot be measured with accuracy.

DISCLOSURE OF THE INVENTION

In view of the above problems of the conventional systems and processes, it is a first object of the present invention to provide a system for and a method of recognizing and tracking a target mark on a real-time basis using a video camera.

A second object of the present invention is to provide a system for and a method of recognizing and tracking a target mark so as to be capable of extracting a desired target mark quickly and reliably.

A third object of the present invention is to provide a system for and a method of recognizing and tracking a target mark while eliminating measuring error variations due to the positional relationship between the target mark and a camera.

A fourth object of the present invention is to provide a system for and a method of recognizing and tracking a target mark to measure the distance up to and the attitude of an object simply with high accuracy.

To achieve the above objects, there is provided in accordance with the present invention a target mark tracking system for tracking a target mark with a video camera, comprising a target mark disposed on an object and composed of a black circle and a white triangle mounted centrally on the black circle and three-dimensionally shifted from the black circle, a video camera for imaging the target mark, a moving mechanism supporting the video camera and movable in directions with six degrees of freedom, image processing means for processing image data of the target mark which is produced by the video camera, shift detecting means for detecting a shift of the target mark from projected histogram information of the target mark which is produced by the image processing means, and moving mechanism control means for controlling movement of the moving mechanism depending on the shift to enable the video camera to track the target mark.

The target mark is composed of the black circle and the white triangle mounted centrally on the black circle and three-dimensionally shifted from the black circle, and is mounted on the object. The video camera is mounted on the moving mechanism which is movable in the directions with six degrees of freedom and images the target mark. The image processing means processes the image data of the target mark which is produced by the video camera. The shift detecting means detects a shift of the target mark from projected histogram information thereof. The moving mechanism control means controls movement of the moving mechanism depending on the shift to enable the video camera to track the target mark.

As described above, the target mark composed of the three-dimensionally shifted white triangle disposed centrally on the black circle is imaged by the video camera, and a shift in each of the coordinate axis directions of the target mark is determined from the image data. The shifts can be determined from projected histograms of the image data, which are calculated in a one-dimensional domain. Therefore, the calculations of the projected histograms are very simple and small in amount. Therefore, the shifts of the target mark can be determined by a high-speed processing. As a consequence, real-time data can be fed back to the moving mechanism depending on the determined shifts, making it possible to enable the video camera to track the target mark on a real-time basis.

According to the present invention, there is also provided a visual target mark tracking control system for imaging a target mark with a video camera and processing image data of the target mark produced by the video camera to hold the video camera in a predetermined positional relationship to the target mark at all times, comprising image change detecting means for detecting a change from a target position and attitude for the target mark in an image of the target mark produced by the video camera, actual change detecting means for detecting a relative actual change from the predetermined positional relationship between the video camera and the target mark, and relating means for experimentally shifting the predetermined positional relationship between the video camera and the target mark, and relating values which are detected by the image change detecting means and the actual change detecting means when the predetermined positional relationship is experimentally shifted, to each other.

The relating means experimentally shifts the predetermined positional relationship between the video camera and the target mark, and relates a value which is detected by the image change detecting means, i.e., a change from a target position and attitude for the target mark on its image, and a value which is detected by the actual change detecting means, i.e., a relative actual change from the predetermined relationship between the video camera and the target mark, to each other.

By thus relating the changes, the change in the image of the target mark can quickly be converted into the relative actual change from the predetermined relationship between the video camera and the target mark. Thus, even when the distance between the target mark and the video camera is greatly varied, the moving object can stably be tracked without a reduction in the response.

According to the present invention, there is also provided a target mark attitude detecting method of detecting the attitude of a target mark to detect the attitude of an object about the direction of a camera based on an image produced by the camera of a target mark which is composed of at least a triangle of a particular shape, comprising the steps of determining projected histograms in X and Y directions of the image of the triangle of the target mark, determining the positions of the centers of gravity in the X and Y directions of the image of the triangle of the target mark in the projected histograms, determining maximum histogram values and X- and Y-axis values in the projected histograms, determining which of classified and preset attitude patterns the attitude of the triangle of the target mark belongs to based on the positions of the centers of gravity, the maximum histogram values, the X- and Y-axis values, and known geometrical data of the target mark, and calculating the attitude of the triangle of the target mark in the determined attitude pattern about the direction of the camera.

Attitudes for the triangle of the target mark are classified into attitude patterns. Then, it is determined which of the classified and preset attitude patterns the attitude of the triangle of the target mark belongs to based on the positions of the centers of gravity, the maximum histogram values, the X- and Y-axis values, and known geometrical data of the target mark. The attitude of the triangle of the target mark in the determined attitude pattern about the direction of the camera is then calculated. The rolling interval of the target mark can properly and simply be grasped.

According to the present invention, there is further provided a method of detecting a target mark, comprising the steps of converting an original image to binary images, grouping the binary images into images with joined pixels, determining X- and Y-projected histograms of the grouped images, counting extreme values of the X- and Y-projected histograms of the grouped images, and comparing the counted extreme values with predetermined extreme values of X- and Y-histograms of a target mark to determine whether the grouped images represent the target mark.

According to the present invention, there is also provided an apparatus for measuring the position and attitude of an object based on an image of a target mark, comprising a target mark disposed on a particular flat surface of an object and composed of a circle and a central point thereof, a camera for imaging the target mark to generate an image of the circle and the central point thereof, feature extracting means for extracting feature points required to measure the position and attitude of the object, from the image of the target mark, and calculating means for calculating the position and attitude of the target mark in an object space according to projective geometrical calculations on the feature points.

According to the present invention, there is also provided a distance and attitude measuring apparatus for measuring the distance up to and the attitude of an object, comprising four disk-shaped marks disposed on an object and having respective centers of gravity positioned in one plane, at least one of the disk-shaped marks having a radius different from the radii of the other disk-shaped marks, imaging means for imaging the disk-shaped marks, center-of-gravity calculating means for calculating the positions of the centers of gravity of the respective disk-shaped marks based on image data of the four disk-shaped marks which are outputted by the imaging means, and calculating means for solving a four-point perspective problem to calculate the distance up to and the attitude of the object based on the positions of the centers of gravity calculated by the center-of-gravity calculating means.

BRIEF DESCRIPTION OF THE DRAWINGS

FIG. 20 is a diagram illustrating the manner in which a shift in a pitch direction is determined;

FIG. 21 is a diagram showing the target mark image as it is rotated in a roll direction and its X-projected histogram;

FIG. 22 is a diagram illustrating the manner in which a shift in the yaw direction is determined;

FIG. 23 is a diagram showing the manner in which a window is established;

FIGS. 24(A) and 24(B) are views of another target mark;

FIG. 25 is a view of still another target mark;

FIG. 26 is a view showing an example in which the target mark shown in FIG. 25 is used;

FIG. 48 is a diagram showing a former half group of attitude patterns produced when the roll angle of the triangle is progressively increased;

FIG. 49 is a diagram showing a latter half group of attitude patterns produced when the roll angle of the triangle is progressively increased;

FIG. 50 is a diagram of attitude patterns classified according to the position of the center of gravity, the maximum values of the histograms, and their positions;

FIGS. 51(A) and 51(B) are hardware arrangements for producing projected histogram data;

FIGS. 64(A) and 64(B) are diagrams illustrative of a labeling process and a histogram process;

FIG. 65 is a diagram of X- and Y-projected histograms;

BEST MODE FOR CARRYING OUT THE INVENTION

Embodiments of the present invention will hereinafter be described below with reference to the drawings.

Figure 1:
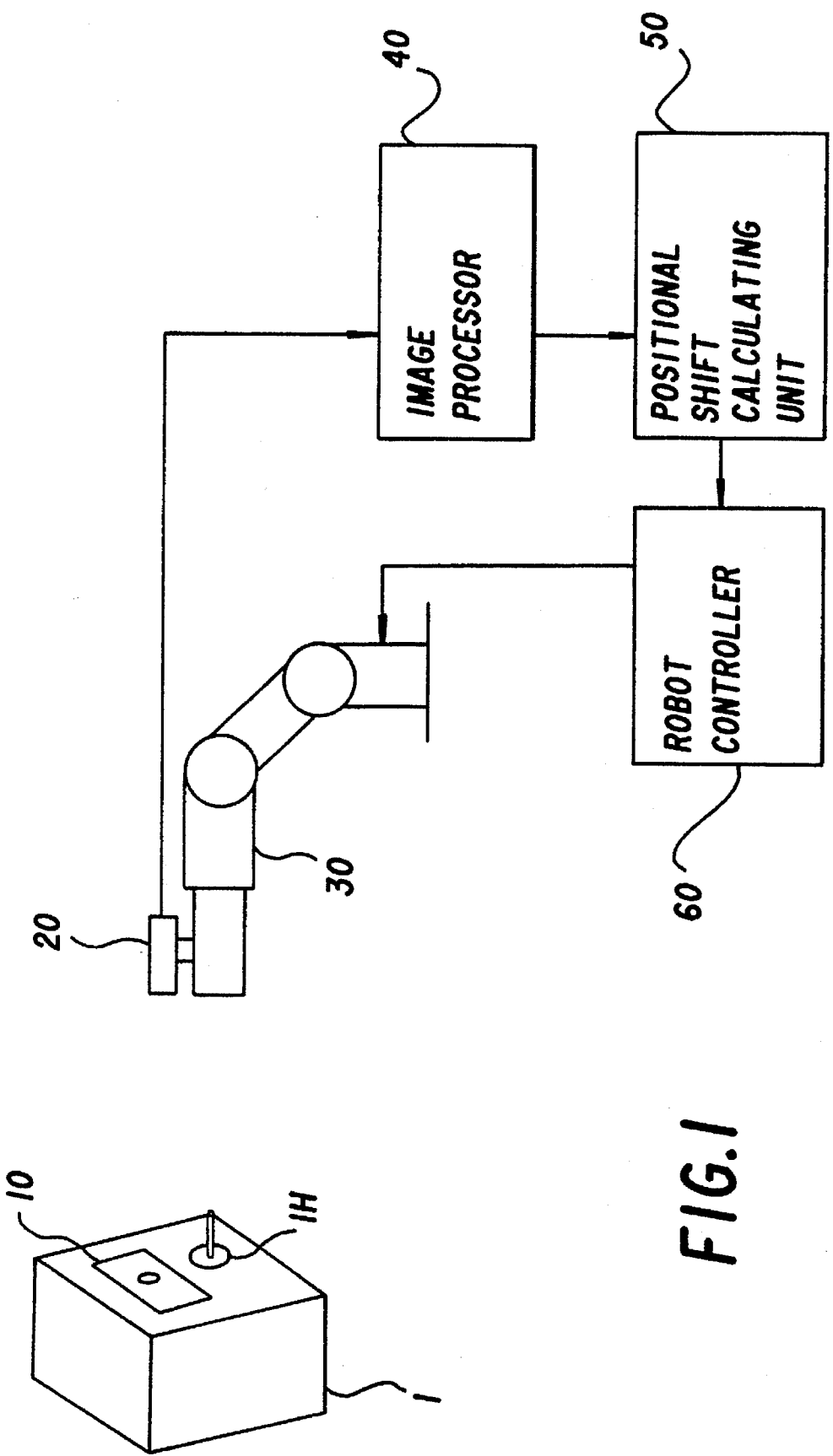
FIG. 1 is a view showing an overall arrangement of a target mark tracking system.

FIG. 1 shows an overall arrangement of a target mark tracking system according to the present invention. In FIG. 1, the target mark tracking system comprises an object 1, a target mark 10, a camera 20, a robot 30, an image processor 40, a positional shift calculating unit 50, and a robot controller 60.

As described later on, the target mark 10 comprises a black circle with a white triangle shifted three-dimensionally at the center of the black circle, and is mounted on the object 1. The camera 20 is mounted on the robot 30 that is movable with six degrees of freedom, and produces an image of the target mark 10. The image processor 40 processes image data of the target mark 10 from the camera 20, and determines projected histograms of the target mark 10 with respect to respective coordinate axes. The positional shift calculating unit 50 comprises a work station, for example, and extracts the target mark 10 from the information representing the projected histograms which is supplied from the image processor 40, and detects a shift of the extracted target mark 10, as described later on. The robot controller 60 controls movement of the robot 30 depending on the detected shift to enable the camera 20 to track the target mark 10. As a result of its tracking action, the robot 30 grips a handle 1H of the object 1 and achieves a predetermined operation objective. The arrangement of the target mark 10 will be described below with reference to FIGS. 2 through 4.

Figure 2:
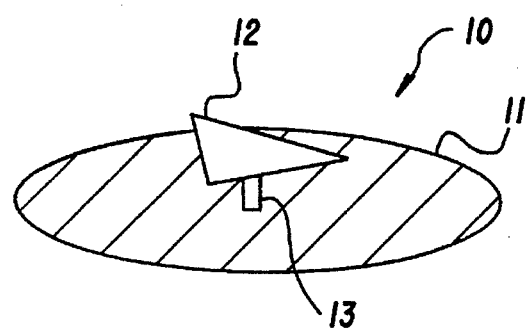
FIG. 2 is a perspective view of a target mark.
Figure 3:
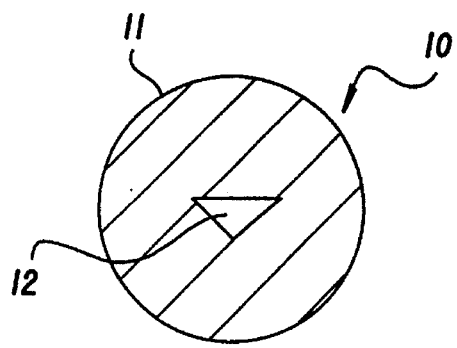
FIG. 3 is a plan view of the target mark.
Figure 4:
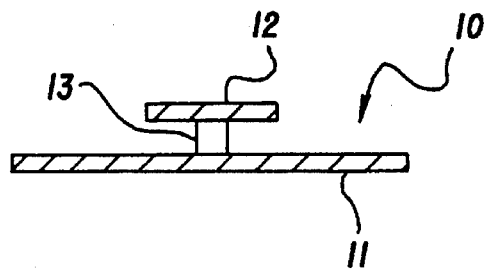
FIG. 4 is a side elevational view of the target mark.

FIGS. 2, 3, and 4 are perspective, plan, and side elevational views, respectively, of the target mark. As shown in FIGS. 2, 3, and 4, the target mark 10 comprises a black circle 10 having a central support column 13 thereon and a white triangle 12 placed on the support column 13. The white triangle 12 is thus shifted by the height of the support column 13. As described later on, a white region is provided on the back of the black circle 11. The support column 13 is painted black as with the black circle 11. The support column 13 may not necessarily be black insofar as it is apparent that the support column 13 will not enter an imaging area of the camera 20 because of the moving pattern of the object 11. As described above, the target mark 10 is mounted on the object 1, and imaged by the camera 20. The target mark 10 is extracted and a shift of the target mark 10 is detected based on the image data of the target mark 10. A process of extracting the target mark 10 from an image will be described below with reference to FIGS. 5 through 13, and a process of detecting a shift of the target mark 10 will be described below with reference to FIGS. 14 through 50.

Figure 5:
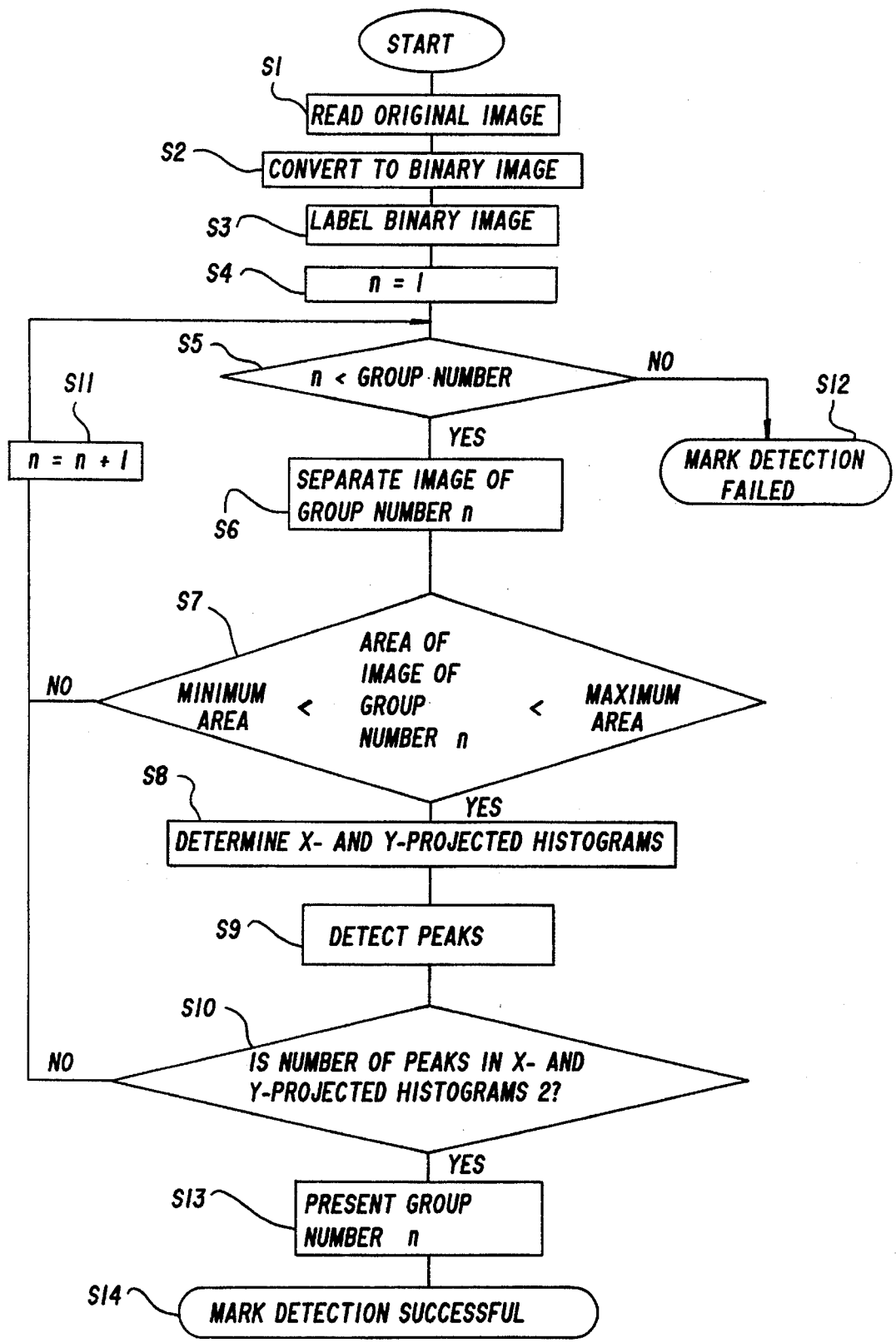
FIG. 5 is a flowchart of a sequence for detecting the target mark.
Figure 6:
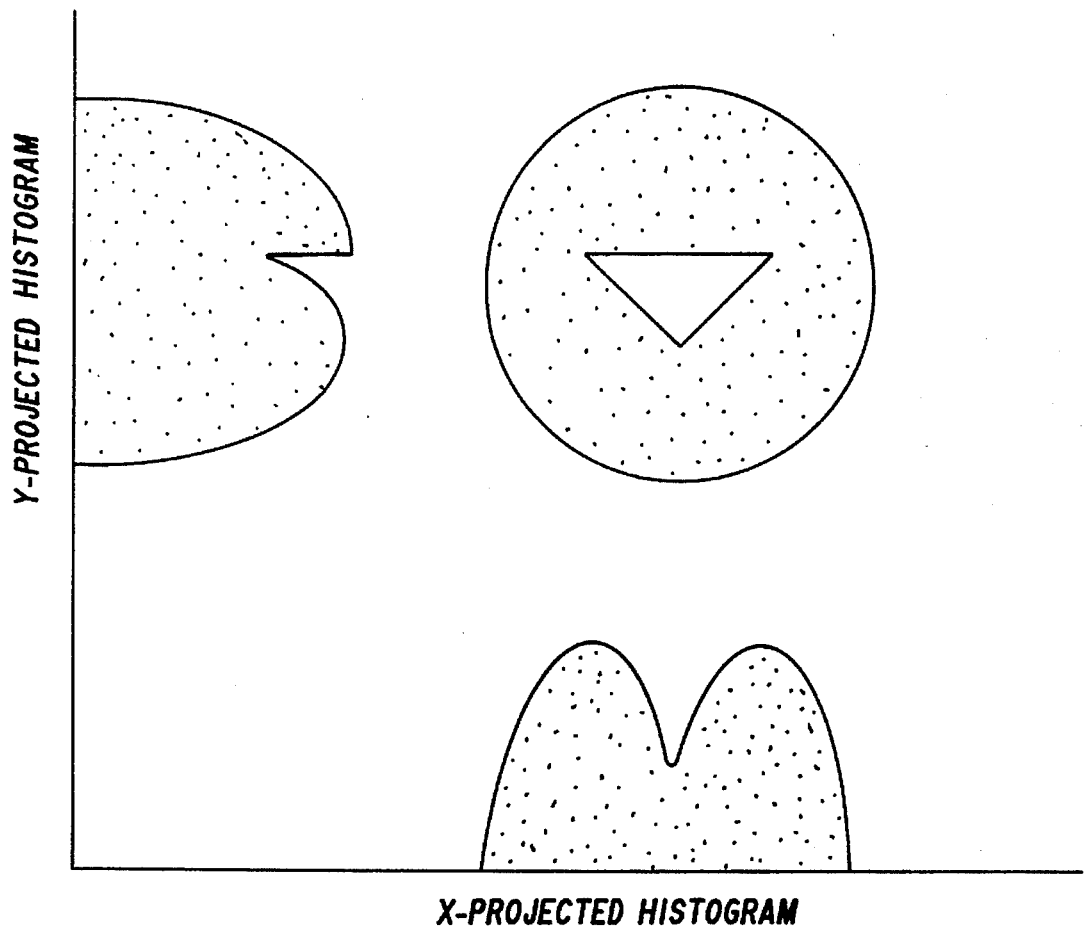
FIG. 6 is a diagram showing X- and Y-histograms of the target mark.

FIG. 5 shows a sequence for detecting the target mark. In this embodiment, it is assumed that a target mark image with a triangle located within a circle is detected from a projected image. X- and Y-projected histograms of the target mark image are determined. As shown in FIG. 6, the extreme values (maximum or minimum values which may be called "peaks" or "valleys") of each of the X- and Y-projected histograms comprise two peaks and one valley. The number of these extreme values remain unchanged even when the target mark rotates. The X-projected histogram represents the sum of pixels having the same X coordinates, and the Y-projected histogram represents the sum of pixels having the same Y coordinates. In FIG. 5, numerals following the letter "S" indicate step numbers.

[S1] An original image is produced by the camera 20, and the data of the original image is read into an image memory in the image processor 40.

Figure 7:
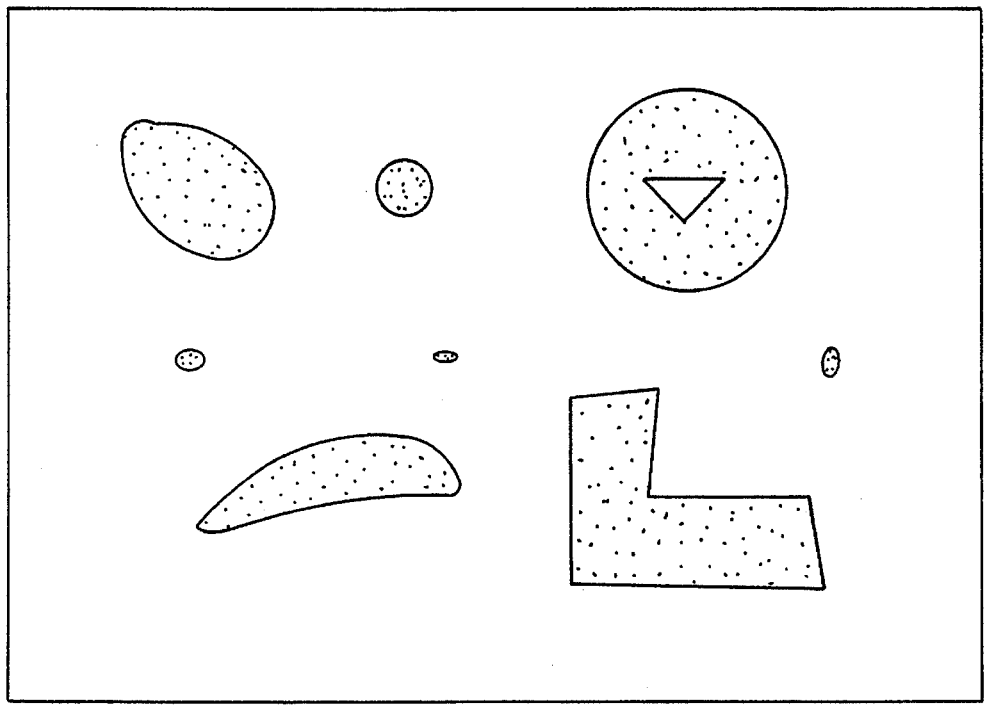
FIG. 7 is a diagram showing a binary image converted from a projected image.

[S2] Then, the image data in the image memory is converted to a binary image as shown in FIG. 7.

Figure 8:
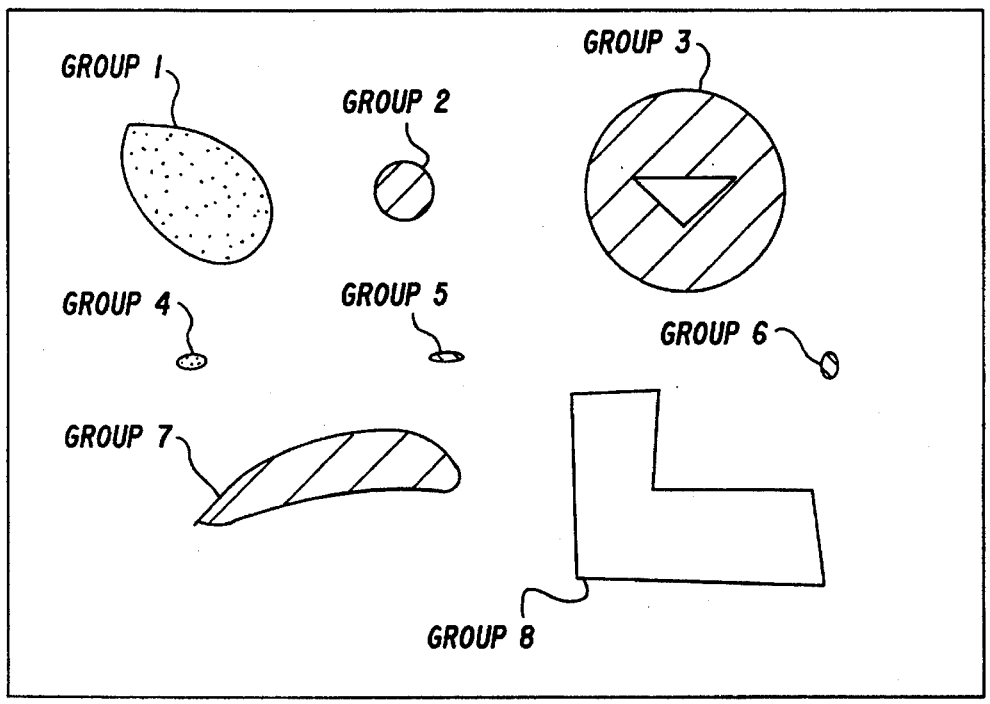
FIG. 8 is a diagram illustrative of the labeling of the binary image.

[S3] Images composed of clusters of pixels having the same value (0 or 1) and interconnected are grouped by being given respective different numbers (labels) by a labeling process. FIG. 8 shows labeled images by way of example. The binary image shown in FIG. 7 is grouped into eight groups having group numbers 1–8, respectively.

Then, a target mark is detected in steps S5–S11 with respect to the images having the respective group numbers 1–8.

[S4] The group number n is set to n=1.

[S5] The group number n is compared with the group number 8. If the group number n is smaller than the group number 8, then control proceeds to a step S5. If the group number n reaches the group number 8, then control goes to a step S12.

Figure 9:
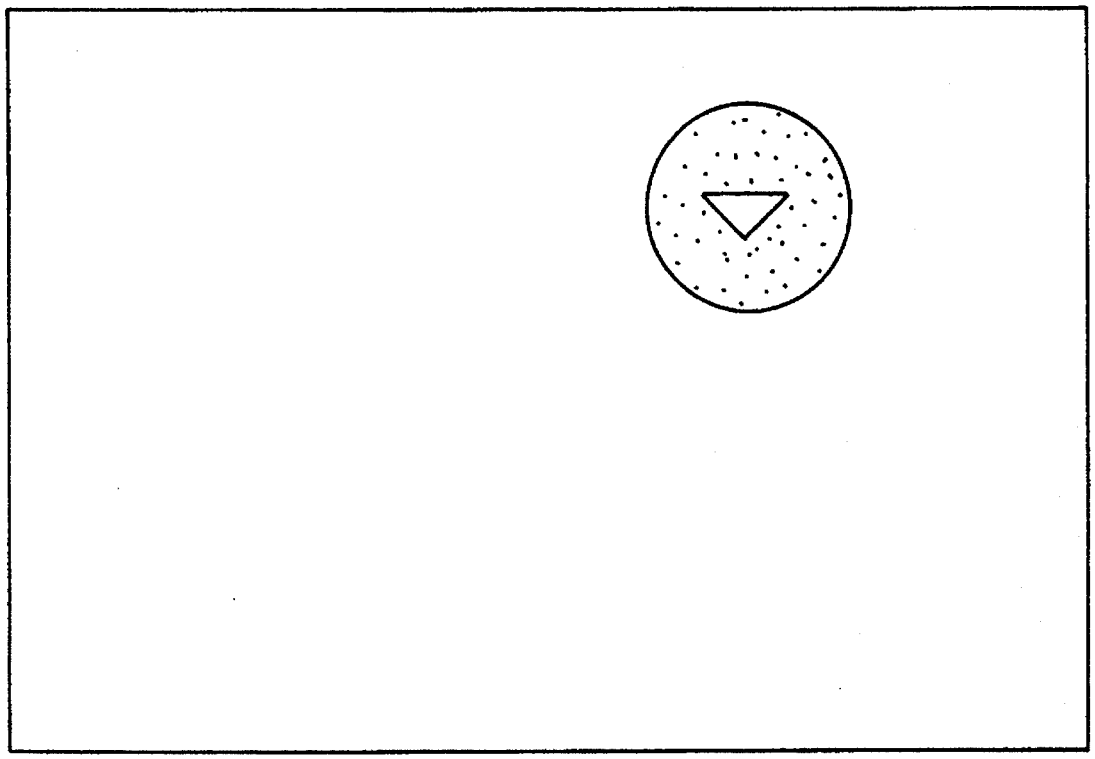
FIG. 9 is a diagram showing an example in which an object having a group number 3 is separated.

[S6] An image having the group number n is separated from the image data to be processed. That is, each of the images grouped by the labeling process is separated by a window process, generating a binary image. FIG. 9 shows an example in which a target detecting process is effected on an image having the group number 3 which represents a target mark.

[S7] Then, area filtering is effected on the image thus separated. Specifically, maximum and minimum values that can be taken by the area (number of pixels) of the target mark in a measuring range are calculated in advance, and filtering is effected by determining whether the image of the group number n falls within that range. This can roughly determine whether the separated image is the target mark or not. If not excluded by this filtering from the possibility that it is the target mark to be detected, then control goes to a step S8. If excluded, then control goes to a step S11.

Figure 10:
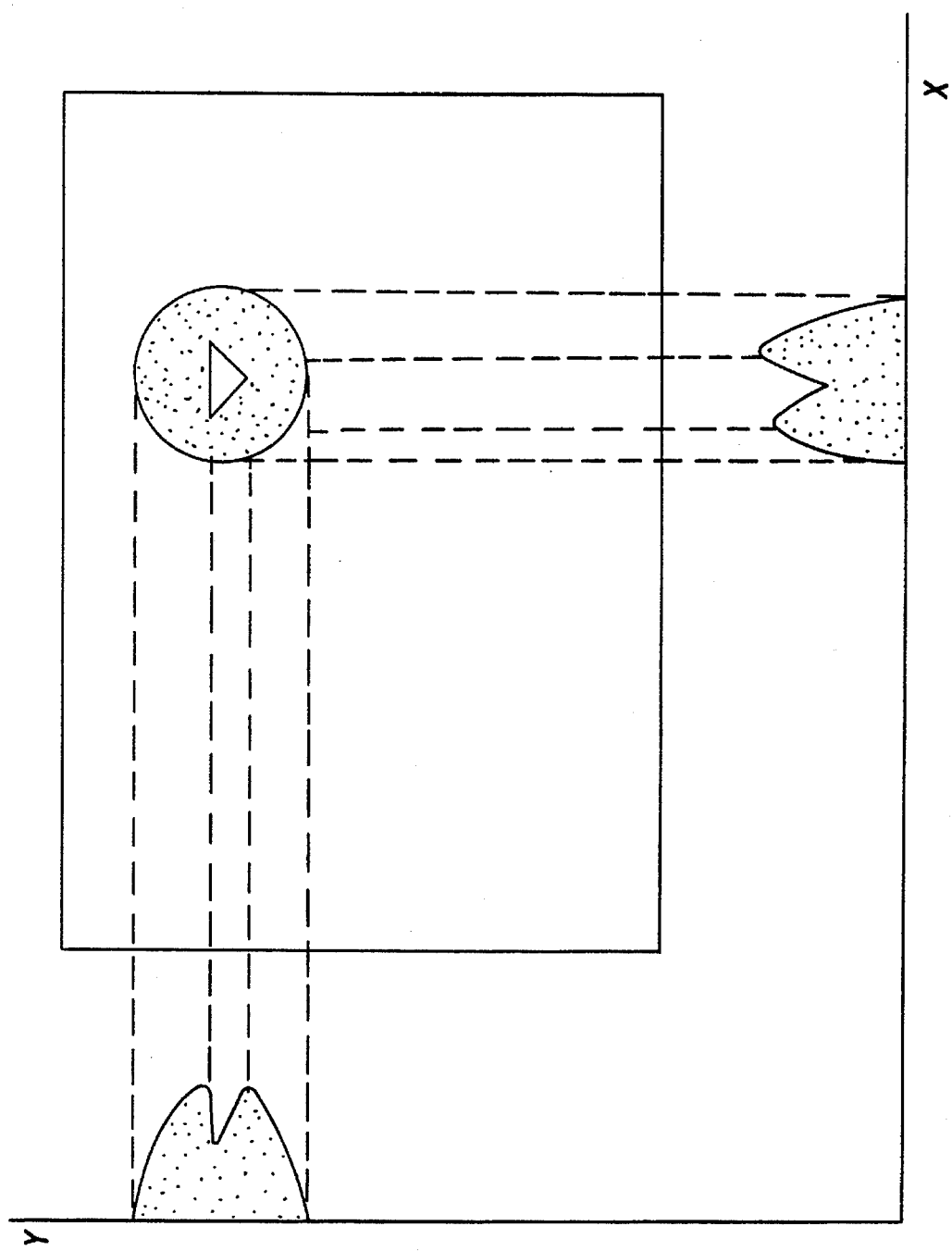
FIG. 10 is a diagram showing X- and Y-projected histograms of the separated object having a group number 3.

[S8] Then, X- and Y-projected histograms of the image having the group number n are determined and stored in a memory. FIG. 10 shows the X- and Y-projected histograms of the image having the group number 3.

[S9] Peaks in the X- and Y-projected histograms thus determined are detected and counted. Instead, valleys may be detected and counted.

[S10] This step determines whether the number of peaks is the same as the number of peaks that has been determined in advance in the X- and Y-projected histograms of the target mark shown in FIG. 6. The target mark shown in FIG. 6 is characterized in that the number of peaks of each of the X- and Y-projected histograms is 2, and the image having the group number 3 satisfies the feature. If the numbers agree with each other, then control goes to a step S13. If not, then control goes to a step S11. In the case where valleys are in question rather than peaks, the target mark shown in FIG. 6 is characterized in that the number of valleys of each of the X- and Y-projected histograms is 1, and the image having the group number 3 satisfies this feature.

[S11] The group number is incremented by 1.

[S12] When the group number n has reached the group number 8, it has not been successful to extract the target mark from the images, and the program goes to an end.

[S13] The separated image is determined as the image of the target mark shown in FIG. 6, and the group number n (3 in this embodiment) of that image is presented.

[S14] The mark detection (extraction) is successful, and the program is ended.

Figure 11:
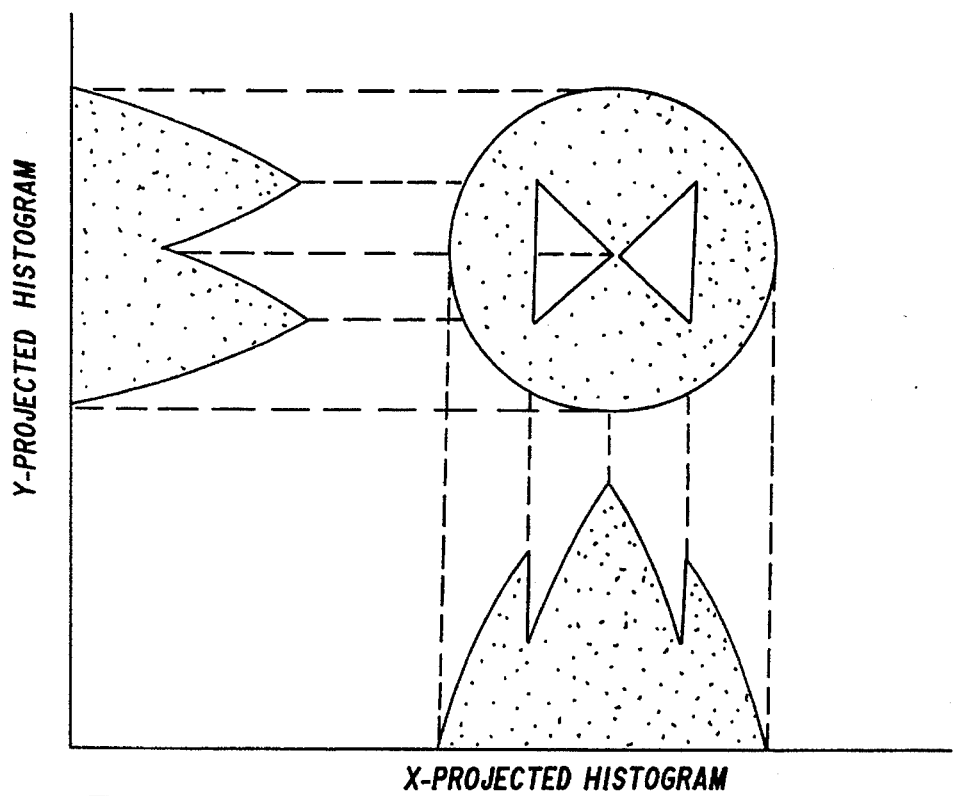
FIG. 11 is a diagram showing a target mark of other form and its X- and Y-projected histograms.
Figure 12:
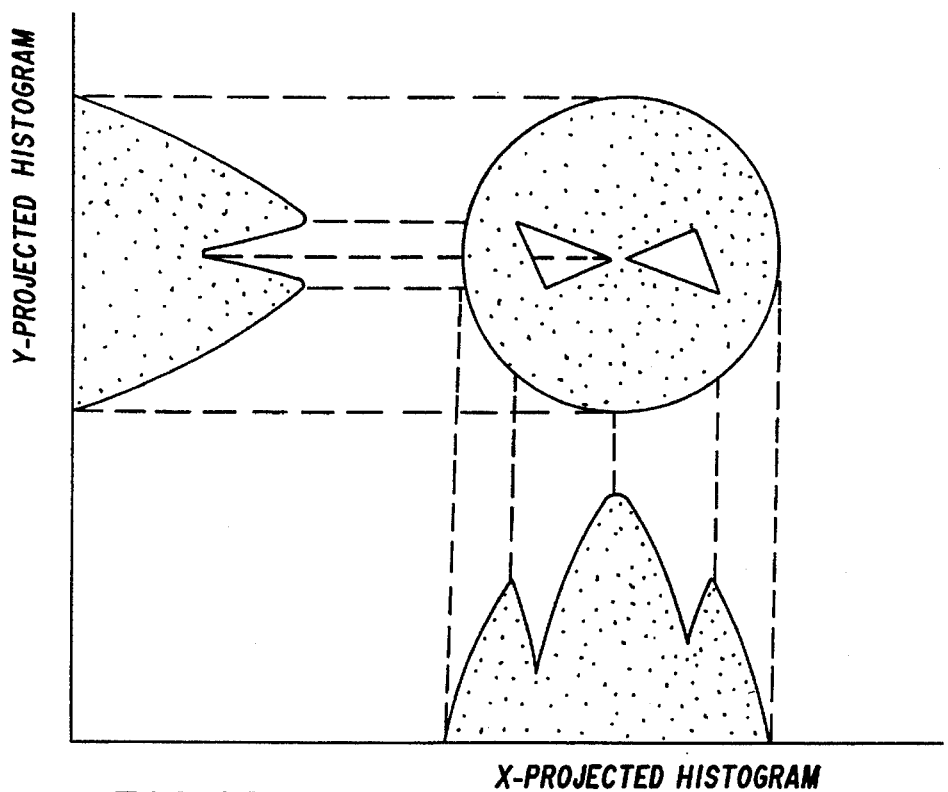
FIG. 12 is a diagram showing a target mark of still other form and its X- and Y-projected histograms.

In the above mark extraction process, the target mark to be detected is not limited to the shape shown in FIG. 6, but may be of a shape as shown in FIG. 11 or 12. The target marks shown in FIGS. 11 and 12 are characterized in that their X-projected histogram has three peaks and two valleys and their Y-projected histogram has two peaks and one valley, and can be detected based on that feature.

Figure 13:
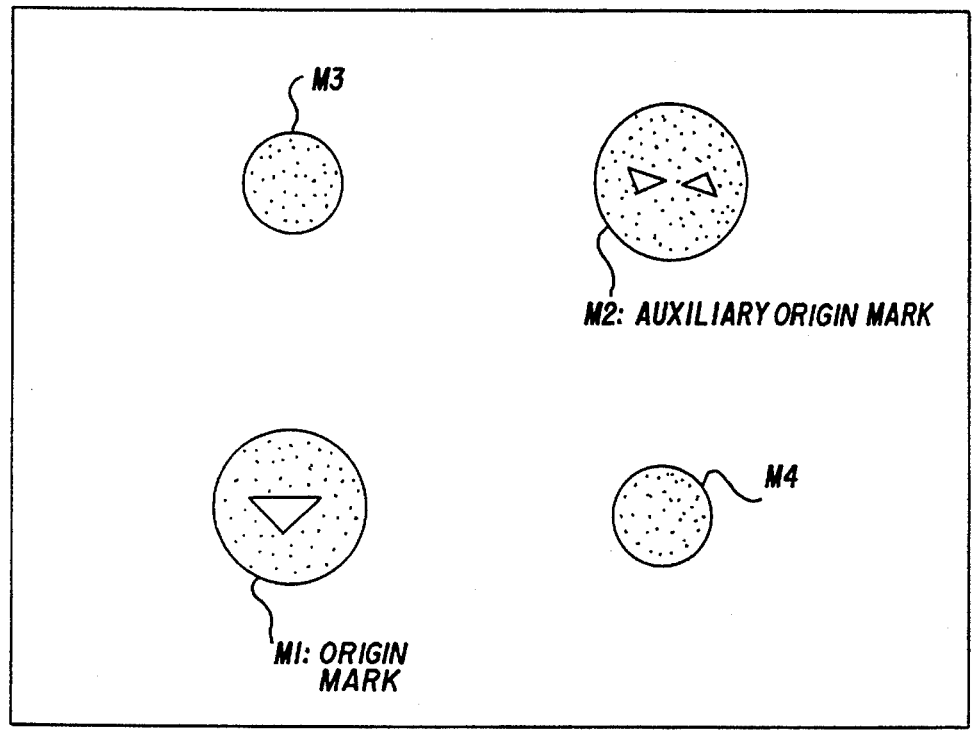
FIG. 13 is a diagram showing a four-circle target mark for measuring a position and attitude.

In this embodiment, using the two different marks shown in FIGS. 6 and 11, the position and attitude of an object with those marks applied thereto can be measured. Specifically, as shown in FIG. 13, the mark shown in FIG. 6 is used as an origin mark M1 and the mark shown in FIG. 12 as an auxiliary origin mark M2. The marks M1, M2 are interconnected by a line, and circles M3, M4 are positioned on a line which extends substantially perpendicularly across a middle point of the line interconnecting the marks M1, M2. These four circles M1–M4 serve as a four-circle target mark. The position and attitude of an object with the four-circle target mark applied thereto are estimated by measuring the position and attitude of the four-circle target mark. The estimating process is as follows:

(1) The origin mark M1 is detected by the above mark detecting process, and the coordinates (origin) of the center of gravity of the origin mark M1 are determined from the binary image of the mark M1.

(2) Similarly, the coordinates (auxiliary origin) of the center of gravity of the auxiliary origin mark M2 are determined.

(3) The coordinates of a middle point between the coordinates of the origin and the coordinates of the auxiliary origin are determined.

(4) Two objects whose centers of gravity are near the coordinates of the middle point are selected, and regarded as the remaining two circles M3, M4 of the target mark.

(5) At this stage, it is not possible to determine which of the two circles is the circle M3 or M4. To identify the circles M3, M4, the equation of a straight line interconnecting the origin and the auxiliary origin is derived from the coordinates of the origin and the auxiliary origin, and the coordinates of the two circles determined in (4) are put into the equation to determine whether the circles M3, M4 are located above or below the straight line represented by the equation. In this manner, the circles M3, M4 are identified.

(6) Since the coordinates of the four points on a plane of the four-circle target mark can now be determined, a four-point perspective problem is solved using the four points, measuring the position and attitude of the four-circle target mark.

Various modifications are possible in the detection (extraction) of a target mark. The target mark to be detected is not limited to the those in the above embodiments. Target marks of various configurations which are characterized by the extreme values of X- and Y-projected histograms can be detected by the above process. The feature extraction using extreme values may be based on either a combination of maximum and minimum values or only one of maximum and minimum values.

The process of detecting a target mark as described above can detect a target mark more reliably and quickly than the conventional process even when an image either contains many objects or has a lot of noises.

A process of detecting a shift of a target mark 10 thus detected will be described below with reference to FIG. 14 and subsequent figures.

Figure 14:
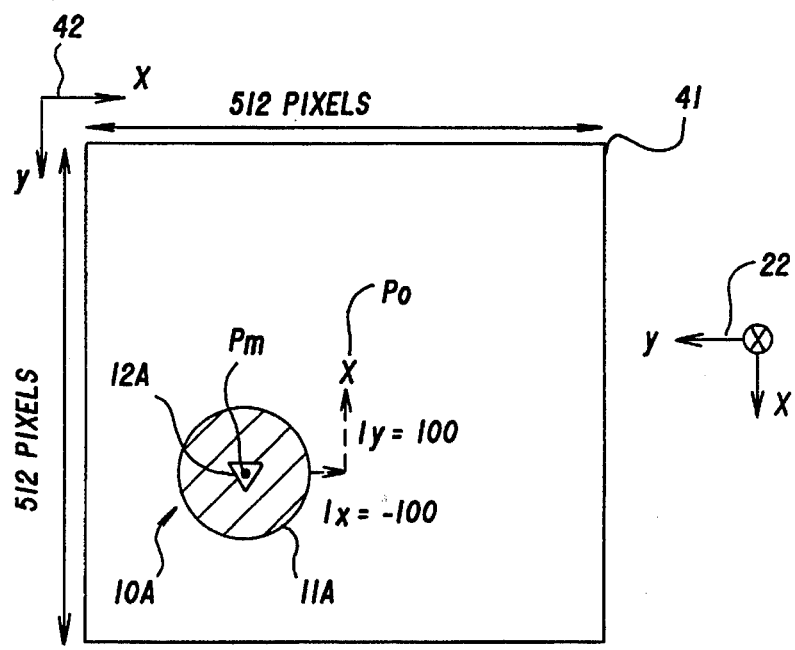
FIG. 14 is a diagram illustrative of the manner in which shifts in X- and Y-directions of a target mark are determined.

FIG. 14 is illustrative of the manner in which shifts in X- and Y-directions of a target mark are determined. In FIG. 14, the target mark 10 is imaged as being shifted from the center of the screen of the camera 20. An image (target mark image) 10A of the target mark 10 which is imaged by the camera 20 is read into an image memory 41 of the image processor 40, and recognized in an image coordinate system 42. The target mark image 10A is composed of a black circular image 11A and a white triangular image 12A. The image memory 41 is composed of 512 pixels in each of X and Y directions. The coordinate position of each point in the image memory is indicated according to the unit of pixels.

In the image coordinate system 42, shifts of the target mark 10 in the X and Y directions are expressed as the difference between a target position Po (tx, ty) and a central position Pm (mx, my) of the target mark image 10A according to the following equations (1):

Shift $l_x$ in the X direction $= mx - tx$,

Shift $l_y$ in the Y direction $= my - ty$ \hfill (1).

If the target position Po (tx, ty) is a central point Po (256, 256) of the image memory 41 and the central position Pm (mx, my) of the target mark image 10A is indicated by Pm (156, 356), then the shift lx in the X direction is 156−256= −100 and the shift ly in the Y direction is 356−256=100.

Actually, the shift of the target mark 10 is corrected in a camera coordinate system 22. Therefore, the shifts lx, ly in the image coordinate system 42 are converted into shifts Lx, Ly in the camera coordinate system 22 according to the following equations (2):

$Lx=ly$, $Ly=-lx$ (2).

In the above example, Lx=100 and Ly=-100.

A process of determining the central position Pm (mx, my) of the target mark image 10A will be described below.

Figure 15:
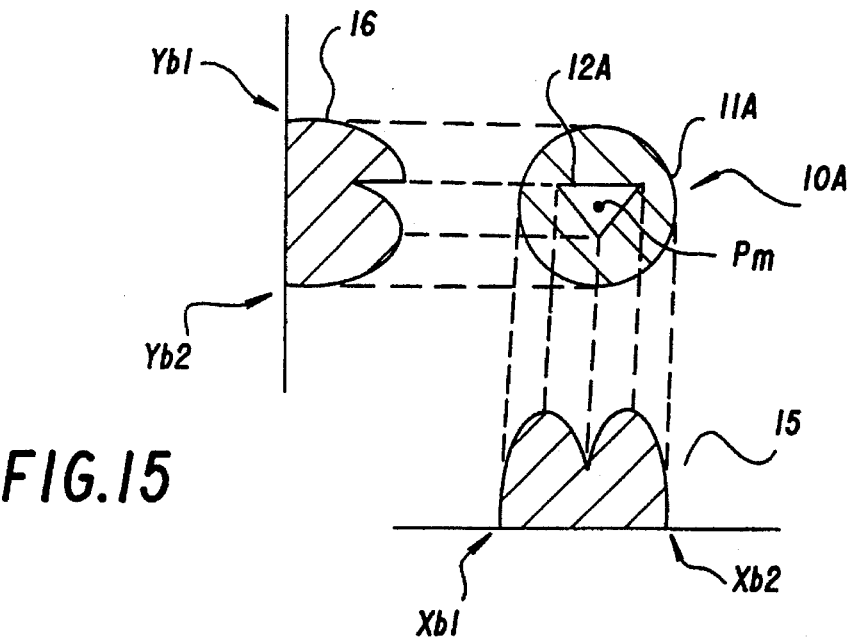
FIG. 15 is a diagram illustrative of the manner in which the central position Pm of the target mark is determined.

FIG. 15 is illustrative of the manner in which the central position Pm of the target mark is determined. In FIG. 15, the central position Pm (mx, my) of the target mark 10A corresponds to the center of a black circle image 11A. The image processor 40 integrates pixel values "0", "1" of the target mark image 10A that has been converted into a binary image, thereby generating a histogram 15 projected onto the X-axis and a histogram 16 projected onto the Y-axis, and then determines the X and Y coordinates of the central position Pm (mx, my) from the projected histograms 15, 16. Specifically, the X coordinate mx of the central position Pm (mx, my) can be determined using opposite end positions Xb1, Xb2 obtained from the X-projected histogram 15 according to the following equation (3):

$mx=(Xb1+Xb2)/2$ (3).

The Y coordinate my of the central position Pm (mx, my) can be determined using opposite end positions Yb1, Yb2 obtained from the Y-projected histogram 16 according to the following equation (4):

$my=(Yb1+Yb2)/2$ (4).

As described above, the difference between the central position Pm (mx, my) and the preset target position Po (tx, ty) represents shifts of the target mark 10 in the X and Y directions. A shift in the Z direction of the target mark 10 will be described below.

Figure 16:
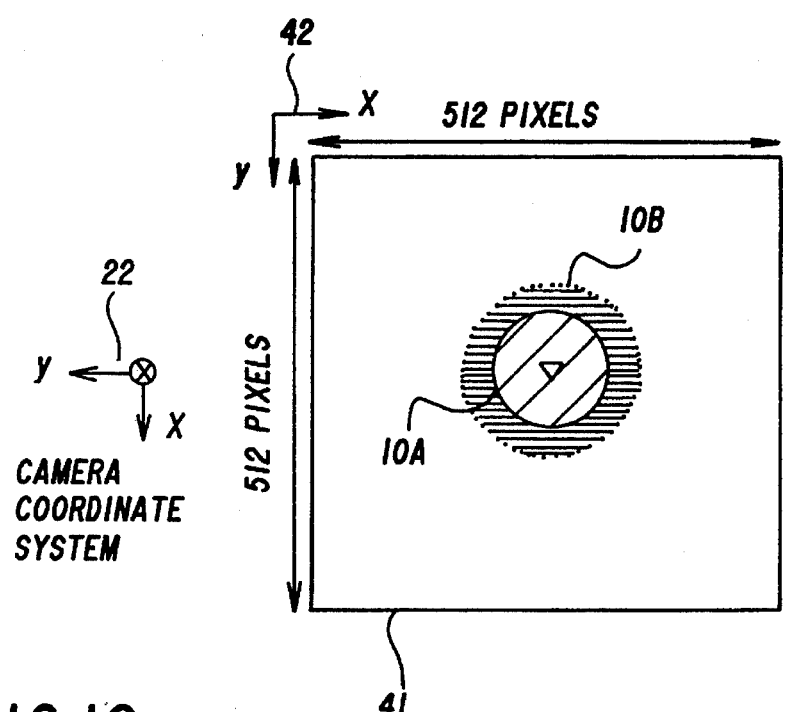
FIG. 16 is a diagram illustrative of the manner in which a shift in a Z direction of the target mark is determined.

FIG. 16 is illustrative of the manner in which a shift in a Z direction of the target mark is determined. The shift in the Z direction of the target mark can be determined from the difference between an area Ma of the target mark image 10A and a target area (the area of a circle indicated by 10B) Ta. Specifically, the image processor 40 integrates the entire region of either the X-projected histogram 15 or the Y-projected histogram 16 thereby to determine the area Ma of the target mark image 10A, and a shift in the Z direction is determined from the difference between the area Ma and the target area Ta. For example, if the target area Ta is 10000 pixels and the area Ma of the target mark image 10A is 6000 pixels, then the shift Lz in the Z direction is of a value depending on Ta-Ma=4000 pixels (10000-6000). As with the shifts Lz, Ly, the shift Lz is a shift in the camera coordinate system 22.

A process of determining a shift of the attitude of the camera coordinate system 22 will be described below.

Figure 17B:
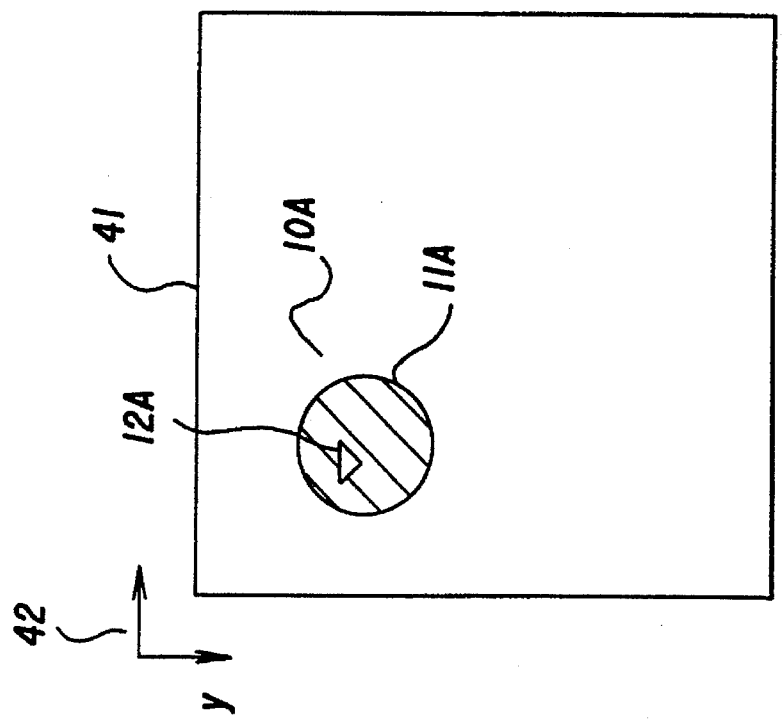
FIG. 17(B) is a view showing a target mark image.
Figure 17A:
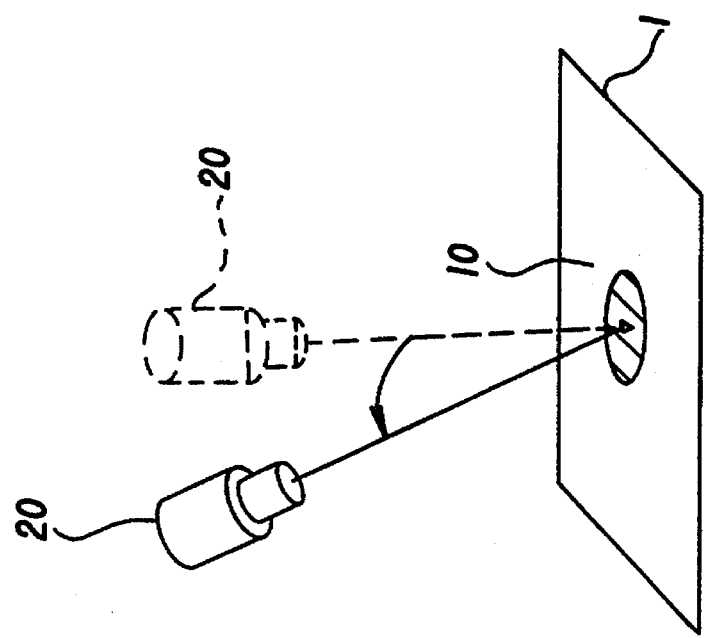
FIG. 17(A) is a perspective view of the target mark, showing the attitude of a camera.

FIGS. 17(A) and 17(B) are diagrams showing the target mark as it is viewed obliquely. FIG. 17(A) shows the attitude of a camera, and FIG. 17(B) shows a target mark image. When the camera 20 images the target mark 10 obliquely, the camera coordinate system 22 is shifted in yaw, pitch, and roll directions. Shifts in the yaw, pitch, and roll directions are rotations of the camera coordinate system 22 (see FIG. 16) about the X-, Y-, and Z-axes. If the camera 20 takes on an attitude shown in FIG. 17(A) due to shifts in the yaw and pitch directions, then the target mark image 10A produced thereby is viewed such that the white triangular image 12A is shifted with respect to the black circle image 11A as shown in FIG. 17(B). The white triangular image 12A is viewed as being shifted because the white triangle 12 is shifted from the black circle 11 by a distance corresponding to the support column 13. The shifts in the yaw and pitch directions can be determined by detecting the shift of the while triangle image 12A. A process of determining these shifts will be described below.

Figure 18:
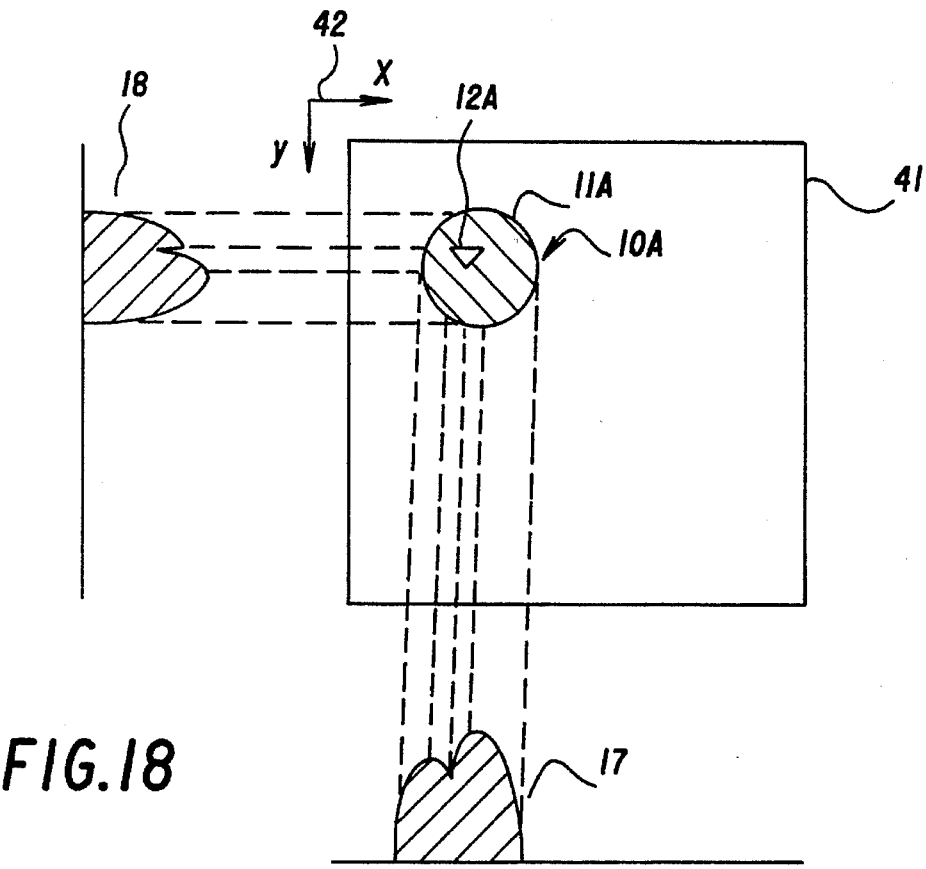
FIG. 18 is a diagram showing X- and Y-projected histograms of the target mark image.

FIG. 18 shows X- and Y-projected histograms of the target mark image shown in FIG. 17(B). As shown in FIG. 18, the positions of the peaks and valley (low peak) of the X- and Y-projected histograms 17, 18 appear as being shifted due to the shift of the white triangle 12 with respect to the black circle 11. The shifts in the yaw and pitch directions can be determined from the X- and Y-projected histograms 17, 18.

Figure 19:
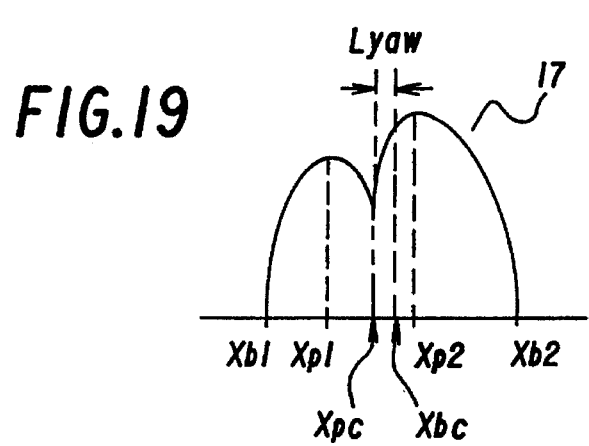
FIG. 19 is a diagram illustrating the manner in which a shift in a yaw direction is determined.

FIG. 19 illustrates the manner in which the shift in the yaw direction is determined. First, Xb1, Xb2, Xp1, Xp2 are determined from the X-projected histogram 17 shown in FIG. 19. Xb1, Xb2 represent the coordinates of the opposite ends of the X-projected histogram 17. Xp1, Xp2 represent the coordinates of the peaks of the X-projected histogram 17. The white triangle image 12A is positioned between Xp1, Xp2. To determine the shift Yyaw in the yaw direction, it may determined where the white triangle image 12A (Xp1–Xp2) is positioned in the black circle image 11A (Xb1–Xb2). Specifically, the difference may be determined between the central position Xbc of the entire black circle image 11A (target mark image 10A) and the central position Xpc of the white triangle image 12A. The shift Yyaw in the yaw direction can be determined according to the following equations (5), (6), and (7):

$Xpc=(Xp1+Xp2)/2$ (5), $Xbc=(Xb1+Xb2)/2$ (6), and $Lyaw=Xbc-Xpc$ (7), where Xpc: the central position in the X-axis direction of the white triangle image 12A;

Xbc: the central position of the X-projected histogram 17 (central position in the X-axis direction of the black circle image 11A); and Lyaw: the shift in the yaw direction.

FIG. 20 illustrates the manner in which the shift in the pitch direction is determined. The shift Lpitch in the pitch direction may be determined in exactly the same manner as the shift Yyaw in the yaw direction. Specifically, Yb1, Yb2 (coordinates of the opposite ends of the Y-projected histogram 18) and Yp1, Yp2 (coordinates of the peaks of the Y-projected histogram 18) are determined from the Y-projected histogram 18, and using these values, the shift Lpitch in the pitch direction can be determined according to the following equations (8), (9), and (10):

$Ypc=(Yp1+Yp2)/2$ (8), $Ybc=(Yb1+Yb2)/2$ (9), and $Lpitch=Ybc-Ypc$ (10), where Ypc: the central position in the Y-axis direction of the white triangle image 12A;

Ybc: the central position of the Y-projected histogram 18 (central position in the Y-axis direction of the black circle image 11A); and Lpitch: the shift in the pitch direction.

A process of determining a shift in a roll direction when the camera coordinate system 22 is rotated in the roll direction.

FIG. 21 shows the target mark image as it is rotated in the roll direction and its X-projected histogram. When the camera coordinate system 22 is rotated in the roll direction, a vertex 12C of the white triangle image 12A in the target mark image 10A is rotated, and the position of the valley of an X-projected histogram 19 is also varied depending on the position of the vertex 12C. In view of this behavior, a shift in the roll direction is determined from the X-projected histogram 19 as shown in FIG. 22.

FIG. 22 shows the manner in which a shift in the roll direction is determined. To determine a shift Lroll in the roll direction, Xp1, Xp2, and X1p are determined from the X-projected histogram 19. Xp1 and Xp1 represent coordinates of the peaks of the X-projected histogram 19 (coordinates of the opposite ends in the X-axis direction of the white triangle image 12A). X1p represents the coordinate of the valley of the X-projected histogram 19 (coordinate in the X-axis direction of the vertex 12C of the white triangle image 12A). Using these values, the shift Lroll in the roll direction can be determined according to the following equations (11) and (12):

$$Xpc=(Xp1+Xp2)/2 \quad (11), \text{ and}$$

$$Lroll=Xpc-X1p \quad (12),$$

where Xpc: the central position in the X-axis direction of the white triangle image 12A; and
Lroll: the shift in the roll direction.

The positional shift calculating unit 50 multiplies the shifts Lx, Ly, Lz, Lyaw, Lpitch, and Lroll (collectively indicated by L) by a proportional gain k (kx, ky, kz, kyaw, kpitch, and kroll) according to the equation (13) below to generate a speed command V (Vx, Vy, Vz, Vyaw, Vpitch, and Vpitch) for the robot 30.

$$V=k \cdot L \quad (13)$$

where V, k, L are vectors.

The speed command V is supplied from the positional shift calculating unit 50 to the robot controller 60. The speed command V represents the speed of movement of the camera 20 (the speed of movement of the origin of the camera coordinate system 22), i.e., the speed of movement of the hand of the robot 60 on which the camera 20 is supported. The robot controller 60 calculates an interval of movement per sampling time thereof from the speed command V, and gives the calculated interval movement as a command to control operation of the robot 30. When the sampling time of the robot controller 60 is shorter than a time (measuring time) in which the speed command V is fed back from the positional shift calculating unit 50, the speed command V is regarded as a command a few samplings ahead, and the interval therebetween is interpolated. For example, if the measuring time is five time the sampling time, then the operation of the robot 30 is controlled to move to a commanded position with operation of five samplings.

A process of establishing a window which is carried out when the target mark image 10A is processed will be described below.

FIG. 23 showing the manner in which a window is established. In FIG. 23, since the camera 20 and the target mark 10 are not positioned perpendicularly to each other, the target mark image 10A is seen flat. The target mark image 10A is read into the image memory 41 of the image processor 40, and recognized, and a window 44 is established around the recognized target mark image 10A.

The position of the center of gravity of the target mark image 10A which is obtained by the projected histogram processing when the target mark image 10A is recognized is regarded as the center of the window 44. Sizes W1x, W1y of the window 44 are obtained by multiplying vertical and horizontal sizes m1x, m1y of the target mark image 10A which are obtained by the projected histogram processing when the target mark image 10A is recognized, by a predetermined ratio, e.g., 2. In order to keep the region of the window 44 reliably in the image memory 41, a white region that is slightly greater than the product of the vertical and horizontal sizes of the target mark 10 and the predetermined ratio is provided in advance around the black circle 11 of the target mark 10 on the object 1. In this manner, a white region 43 can always be kept in the image memory 41. Even if the distance between the target mark 10 and the camera 20 varies resulting in a change in the size of the target mark image 10A as read into the image memory 41, the target mark image 10A does not exceed the white region 43, making it possible to establish the window 44 around the target mark image 10A.

By keeping the white region 43 around the target mark image 10A and setting the window 44 in the white region 43, it is possible to remove a black region such as noise other than the target mark image 10A.

When the target mark 10 starts to be tracked, the window is established using the projected histogram information obtained when the target mark image is recognized. When the target mark 10 is subsequently tracked, the window is established using new projected histogram information obtained upon each measurement made by the camera 20.

FIGS. 24(A) and 24(B) show another target mark. FIG. 24(A) is a perspective view of the target mark, and FIG. 24(B) is a side elevational view of the target mark. A target mark 100 is composed of a black circle 110, a triangular prism 130 mounted centrally on the black circle 110, and a white triangle 120 drawn on the upper surface of the triangular prism 130. Except the white triangle 120, the triangular prism 130 is painted black as with the black circle 110.

FIG. 25 shows still another target mark. A target mark 101 has a recessed black circle region 111 with a white triangle 121 placed on the bottom thereof. That is, the white triangle 121 is shifted in a negative direction. While the recessed black circle region 110 is rectangular in cross section, it may be of another shape such as a cup.

FIG. 26 shows an example in which the target mark shown in FIG. 25 is used. The target mark 101 is used when two objects are closely attached to each other as upon docking. For example, as shown in FIG. 26, the target mark 101 is attached to an object 1A and the camera 20 is mounted on an object 1B. The objects 1A, 1B are joined while the target mark 101 is being imaged by the camera 20. When the camera 20 approaches the target mark 101 and the objects 1A, 1B contact each other, the camera 20 can continue imaging the target mark 101. Therefore, the docking can be completed using the image data produced by the camera 20.

Figure 27:
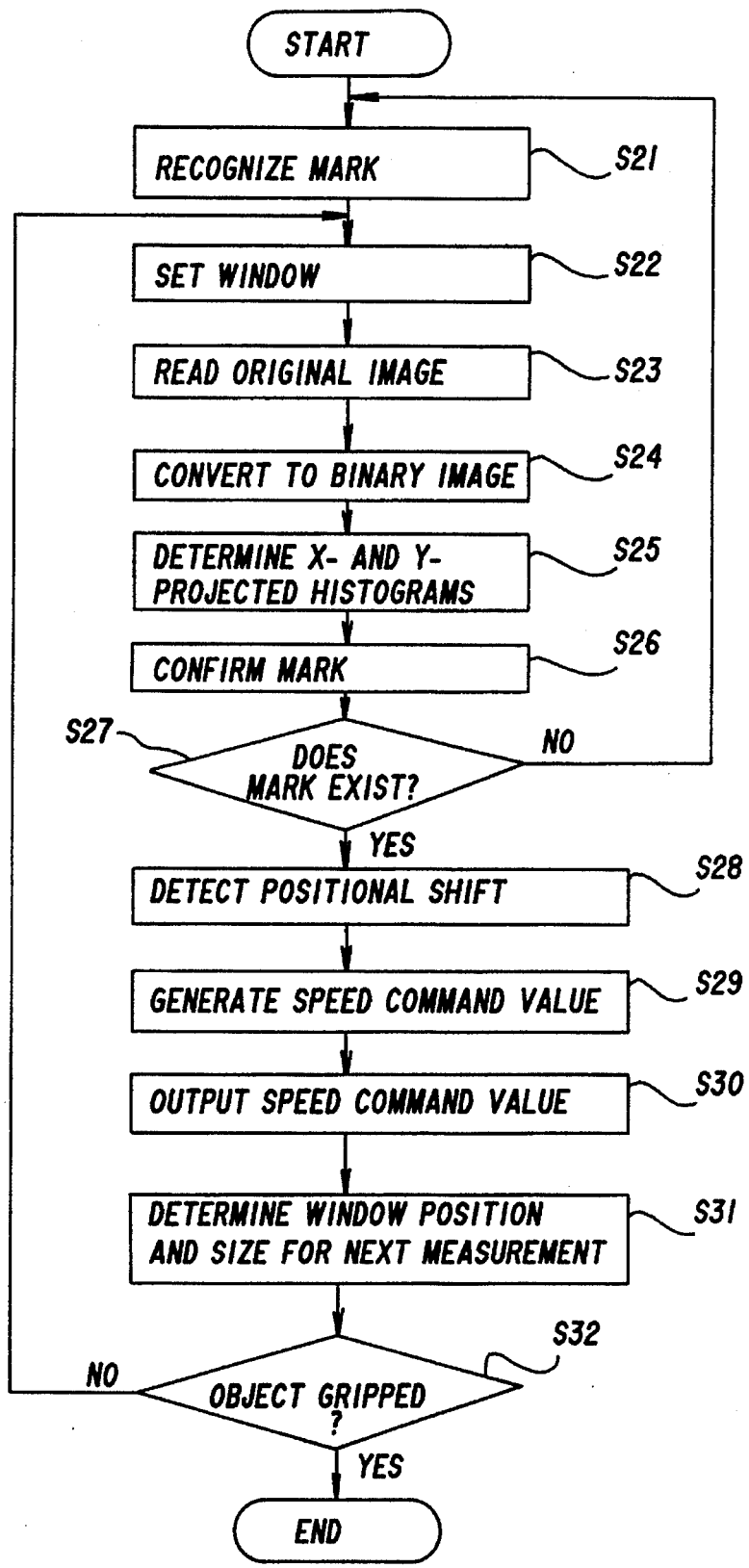
FIG. 27 is a flowchart of a sequence of detection of a positional shift and gripping an object.

FIG. 27 shows a sequence for tracking a target mark and gripping an object. In FIG. 27, numerals following the letter "S" indicate step numbers. Steps S21 through S25 are executed by the image processor 30, and steps S26 through S32 are executed by the positional shift calculating unit 50.

[S21] The target mark image is recognized based on the image data from the camera 20.
[S22] The window 44 is established.
[S23] The original image is read.
[S24] The read image is converted to a binary image.
[S25] Projected histograms 15, 16 in the X- and Y-axis directions are determined.

[S26] The target mark 10 is confirmed.

[S27] Whether the target mark 10 exists or not is determined. If it exists, then control proceeds to a step S28. If not, then control returns to the step S21. The above steps S21–S27 correspond to the mark detecting process shown in FIG. 5.

[S28] Shifts Lx, Ly, Lz, Lyaw, Lpitch, and Lroll of the target mark 10 are determined.

[S29] A speed command (control command) V is generated.

[S30] The speed command V is outputted.

[S31] The position and size of the window 44 for next measurement are determined.

[S32] Whether the object 1 is gripped or not is determined based on a sensor signal from the robot 30. If gripped, then the sequence comes to an end. If not gripped, control returns to the step S22.

In this embodiment, as described above, the target mark 10 composed of the white triangle 12 three-dimensionally shifted at the center of the black circle 11 is imaged by the camera 20, and the shifts Lx, Ly, Lz, Lyaw, Lpitch, and Lroll of the target mark 10 are determined from the image data. These shifts can be determined by the projected histograms of the image data. Since the projected histograms are calculated in a one-dimensional domain, they can simply be calculated and the required calculations are small. Therefore, the shifts of the target mark 10 can be determined by high-speed processing. As a result, real-time data depending on the shifts can be fed back to the robot 30, allowing the camera 20 to track the target mark on a real-time basis. The tracking process enables the robot 30 to grip the object 1 for achieving a desired work on the object 1.

While the target mark is composed of the black circle and the white triangle, it may be composed of a white circle and a black triangle.

The relationship between the actual interval of movement of the target mark (expressed on an absolute scale as of mm) and the interval of movement of the image (expressed by way of the number of pixels) varies nonlinearly depending on the distance between the target mark and the video camera. Therefore, when the distance between the target mark and the video camera varies greatly, the system according to the embodiment has a poor response and cannot operate stably.

Stated otherwise, whereas the target mark image moves the same interval, the actual interval of movement of the target mark differs as the distance between the target mark and the video camera differs.

According to another embodiment, the response is not lowered and a moving object can tracked stably even when the distance between the target mark and the video camera varies greatly. Such an embodiment will be described below.

Figure 28A:
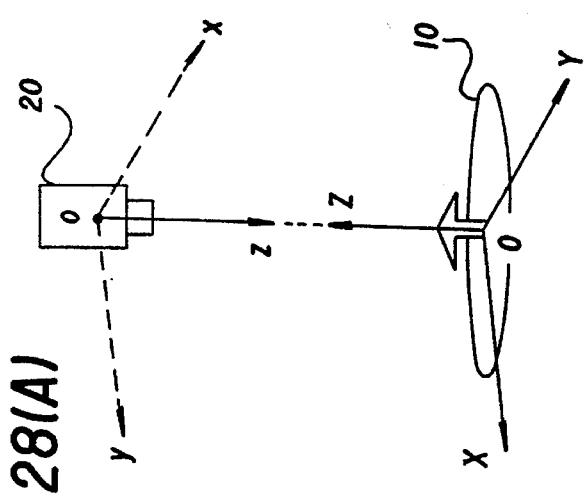
FIGS. 28(A) and 28(B) are diagrams showing the positional relationship between a video camera and a target mark.
Figure 28B:
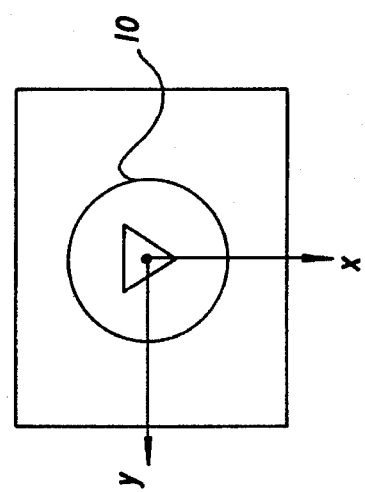

FIGS. 28(A) and 28(B) illustrate the positional relationship between a video camera 20 and a target mark 10. FIG. 28(A) illustrates the relationship between coordinate positions when the video camera 20 and the target mark 10 are in a certain positional relationship. FIG. 28(B) shows an image of the target mark 10 that is imaged by the video camera 20 when the video camera 20 and the target mark 10 are in the certain positional relationship. o-xyz represents a right-hand coordinate system fixed to the video camera 20, and O-XYZ represents a right-hand coordinate system fixed to the target mark 10. z- and Z-axes are on the same straight line but directed opposite to each other. x- and Y-axes extend parallel to each other, and y- and X-axes extend parallel to each other. When the video camera 20 and the target mark 10 are in the certain positional relationship, the image of the target mark 10 imaged by the video camera 20 is as shown in FIG. 28(B). This image of the target mark 10 is in a target position.

If the video camera 20 and the target mark 10 are displaced out of the certain positional relationship shown in FIGS. 28(A) and 28(B), then the image processor 40 and the positional shift calculating unit 50 shown in FIG. 1 compare the image of the target mark 10 obtained by the video camera 20 with its image produced when the target mark 10 is in the target position, and determine shifts in the various directions as follows:

In the X, Y directions, the shifts are determined as a shift of the central position of the white triangle 12 of the target mark 10 within the screen.

In the Z direction, the shift is determined as a shift of the area of the black circle 11 of the target mark within the screen.

In the pitch and yaw directions, the shifts are determined a shift of the distance between the central position of the black circle 11 and the central position of the white triangle 12 within the screen.

In the roll direction, the shift is determined as a shift of rotation (rotation about its own axis) of the white triangle 12 within the screen.

These shifts vary nonlinearly with respect to the shifts in the actual coordinate system depending on the distance between the video camera 20 and the target mark 10. The robot controller 60 shown in FIG. 1 first determines the relationship between the shifts of both kinds, and relate them to each other.

Figure 29A:
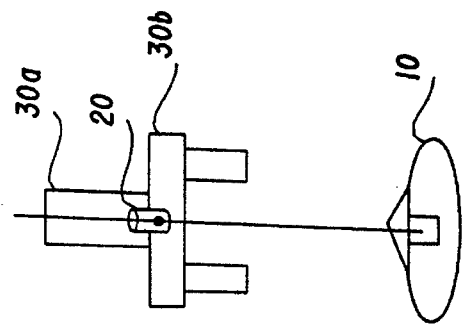
FIGS. 29(A) and 29(B) are views showing movement of the video camera when a shift is actually measured.
Figure 29B:
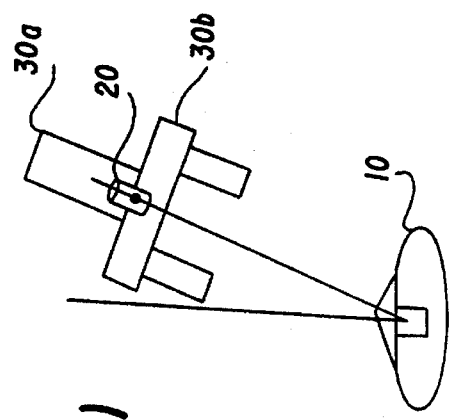

Specifically, as shown in FIGS. 29(A) and 29(B), the target mark 10 is fixed in position, and the tip end of a manipulator 30a with six degrees of freedom of the robot 30 is experimentally moved a certain distance in the coordinate system O-XYZ fixed to the target mark 10. The image of the target mark 10 which is obtained by the video camera 20 at this time is processed to measure and record shifts of the target mark 10 from a target position. Alternatively, the video camera 20 may be fixed in position, and the target mark 10 may be placed on a stage movable with six degrees of freedom and moved for measurement. In FIGS. 29(A) and 29(B), the object is gripped by a hand 30b on the manipulator 30a.

More specifically, shifts of the target mark 10 on the screen and in the actual coordinate system are measured by moving and rotating the camera coordinate system (o-xyz) in the x, y, z directions, and roll, pitch, and yaw directions (about the X-, Y-, and Z-axes) on the target coordinate system (O-XYZ), and measuring actual intervals of movement and rotation from a predetermined position and shifts of the image of the target mark 10 (in the unit of pixels).

Figure 30:
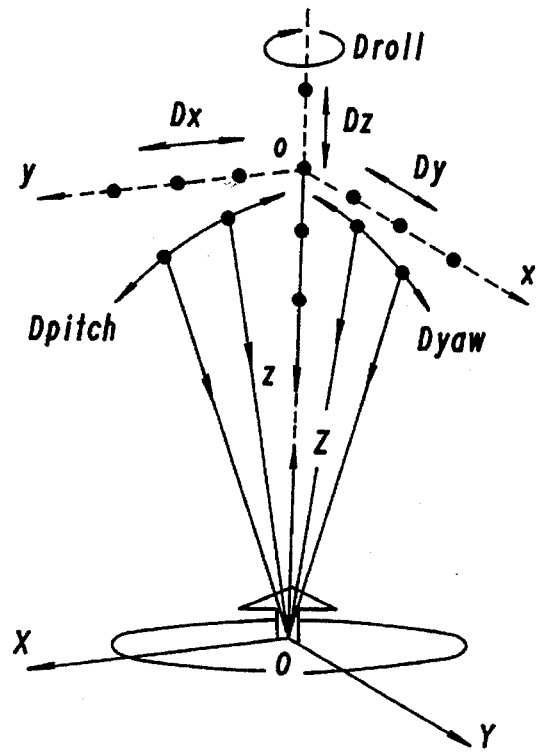
FIG. 30 is a diagram showing the shift that is actually measured.

As shown in FIG. 30, the video camera 20 is moved to various points in the z-axis direction, and the values on the z-axis (the distances between the video camera 20 and the target mark 10) and the areas Ez (pixel value) on the screen of the target mark 10 are measured. Then, the video camera 20 is moved several points in positive and negative directions along the y- and x-axes, and actual intervals Dx, Dy of movement and shifts Ex, Ey (in the unit of pixels) on the screen of the target mark 10 are measured. The video camera 20 is rotated several points about X-, Y-, and Z-axes of the target coordinate system (O-XYZ), and actual intervals Dyaw, Dpitch, Droll of movement and shifts Eyaw, Epitch, Eroll (in the unit of pixels) on the screen of the target mark 10 are measured. The above measurements are carried out on each point in the z-axis direction.

While in the middle of the tracking feedback control process, since any shifts from the certain positional relationship between the video camera 20 and the target mark 10 are relatively small, the video camera 20 may be moved in the various axis directions in a range close to the certain positional relationship.

With the above measurements, it is possible to obtain data relative to the z-Ez relationship between the distance z between the video camera 20 and the target mark 10 and the area Ez on the screen of the target mark 10, the D*-E* relationship between actual shifts D* in the directions (x, y, roll, pitch, yaw) and shifts E* on the screen in case the distance z between the video camera 20 and the target mark 10 is constant (* is a suffix and *=x, y, roll, pitch, and yaw), and the z-(D*-E*) relationship between the distance z between the video camera 20 and the target mark 10 and the D*-E* relationship.

Figure 31:
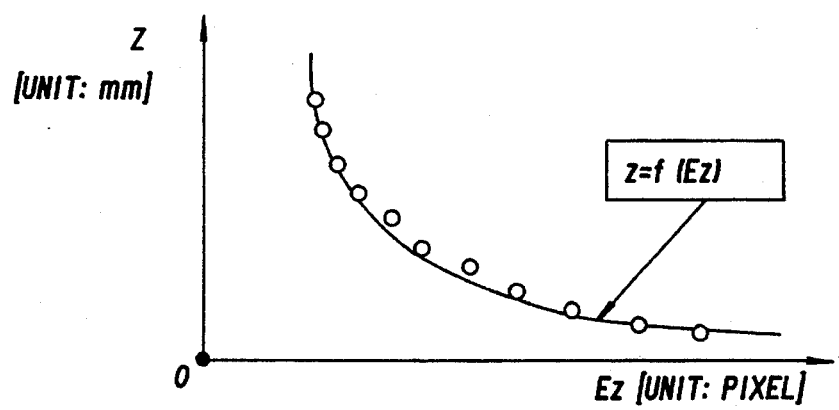
FIG. 31 is a graph showing a z-Ez relationship.

Then, the robot controller 60 shown in FIG. 1 plots data relative to the z-Ez relationship on a z-Ez plane, producing a curve shown in FIG. 31, and expresses the curve approximately with a quartic function z=f(Ez). Using the function z=f(Ez), it is possible to simply calculate the distance z between the video camera 20 and the target mark 10 from the area Ez on the screen of the target mark 10. The elliptical deformation caused on the screen of the black circle 11 of the target mark 10 when the video camera 20 does not face the target mark 10 head on does not substantially affect the area Ez.

Figure 32:
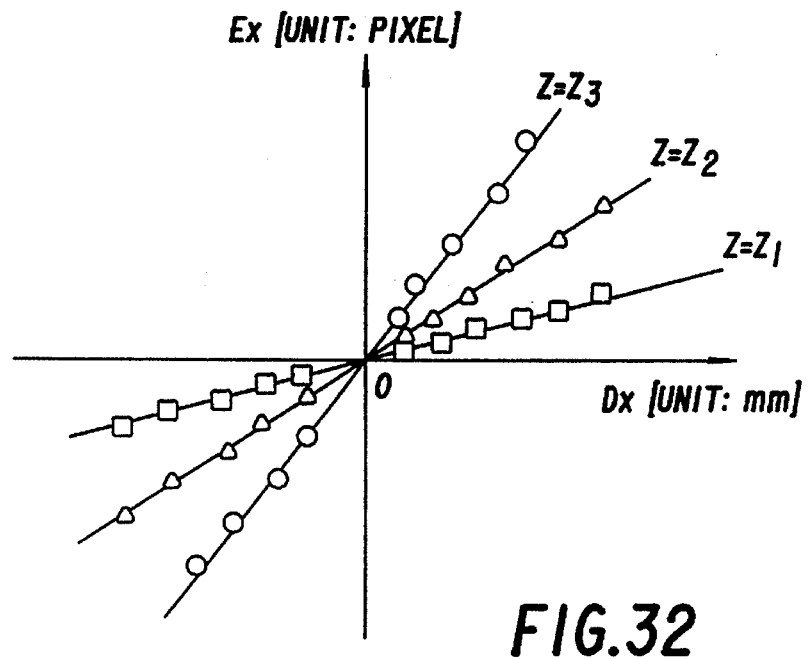
FIG. 32 is a graph showing an Ex-Dx relationship.

The relationship between the actual shifts D* in the directions (x, y, roll, pitch, yaw) and the shifts E* on the screen is plotted as shown in FIG. 32 from the data relative to the D*-E* relationship. FIG. 32 shows the Ex-Dx relationship in the x-axis direction plotted for each distance z using also the data relative to the z-(D*-E*) relationship. As can be understood from FIG. 32, in the case where the shifts from the certain positional relationship between the video camera 20 and the target mark 10 are relatively small and the distance z between the video camera 20 and the target mark 10 is constant, the Ex-Dx relationship can be approximated by straight lines passing through the origin. This holds true with respect to the other directions.

Figure 33:
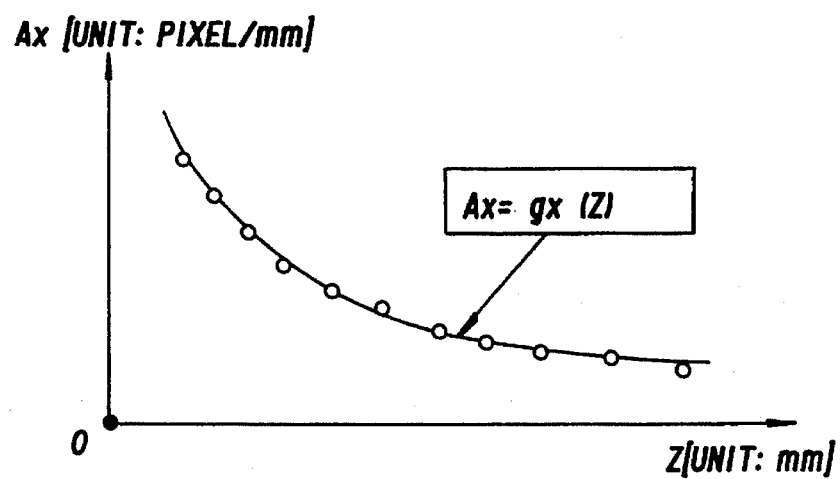
FIG. 33 is a graph showing a z-Ax relationship.

The gradients of the above straight lines can be regarded as a function of the value of the distance z. When the gradients Ax of the straight lines are plotted with respect to the distance z based on FIG. 32, a curve shown in FIG. 33 is obtained. FIG. 33 shows the z-Ax relationship in the x-axis direction. The curve shown in FIG. 33 is expressed approximately by a quadratic function Ax=gx(z). Similarly, curves for the other directions can be expressed by an equation A*=g*(z) (*=y, roll, pitch, and yaw).

From the above result of relating the shifts to each other, it is possible to convert the shifts E* (in the unit of pixels) of the target mark 10 from the target position on the screen quickly into the actual shifts D*.

Figure 34:
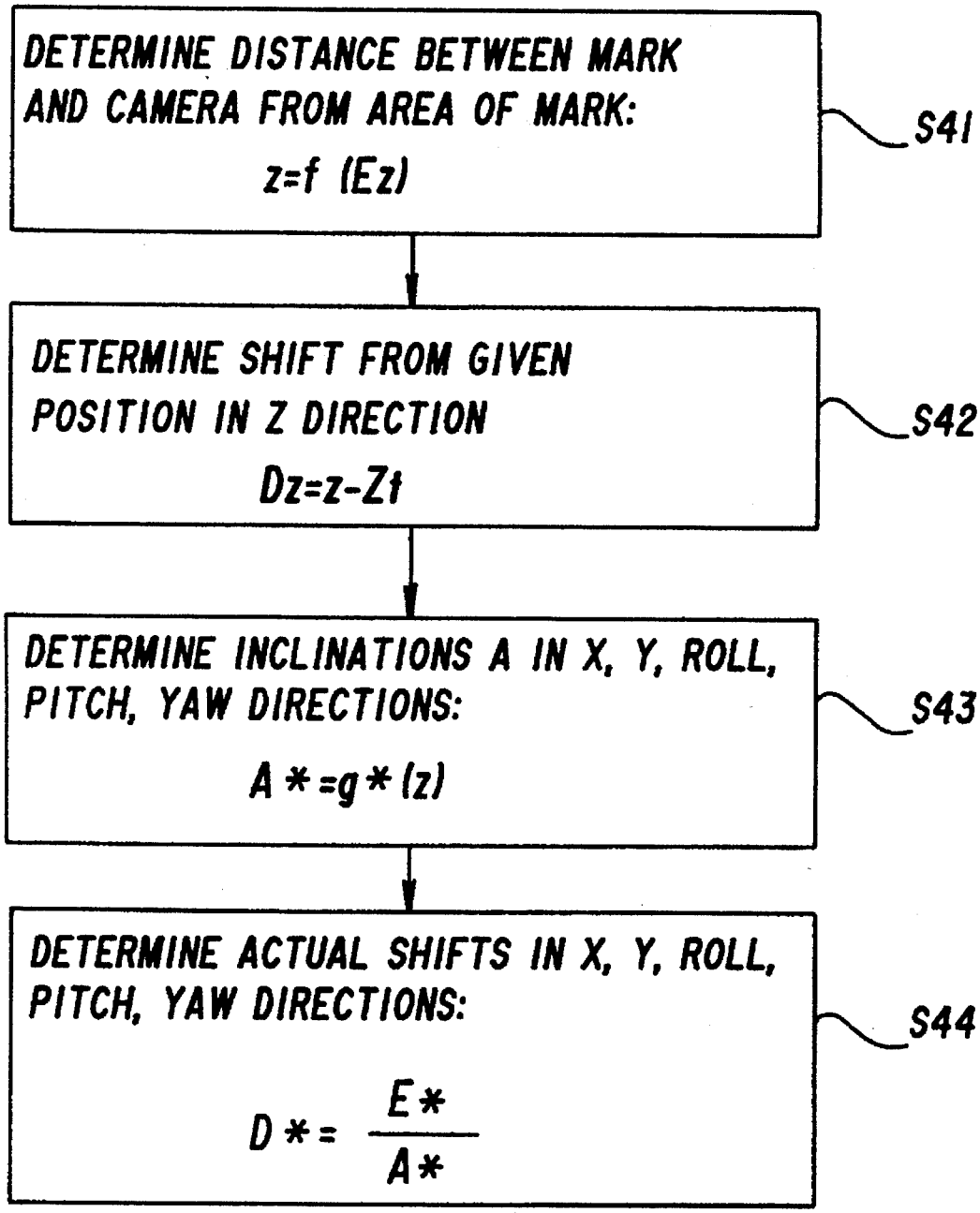
FIG. 34 is a flowchart of a sequence for converting shifts E* on an image quickly to actual shifts D*.

FIG. 34 shows a sequence for converting shifts E* on an image quickly to actual shifts D*. In FIG. 34, numerals following the letter "S" indicate step numbers.

[S41] The area Ez on the image of the black circle 11 of the target mark 10, which is outputted from the image processor 40 and the positional shift calculating unit 50 shown in FIG. 1, is put into the function z=f(Ez) determined as described above, thereby determining the distance between the video camera 20 and the target mark 10.

[S42] The distance Zt between the video camera 20 and the target mark 10 when they are in the certain positional relationship is deduced from the distance z determined in the step S41, determining an actual shift Dz in the z direction.

[S43] The distance z determined in the step S41 is put into the function A*=g*(z) (*=z, y, roll, pitch, and yaw) determined as described above, thus calculating gradients A* in the directions.

[S44] The gradients A* calculated in the step S43 and the shifts E* on the image from the target position and attitude in the respective directions, which are outputted from the image processor 40 and the positional shift calculating unit 50 shown in FIG. 1, are put into D*=E*/A* (*=x, y, roll, pitch, and yaw), thereby determining actual shifts D* in the respective directions.

Figure 35:
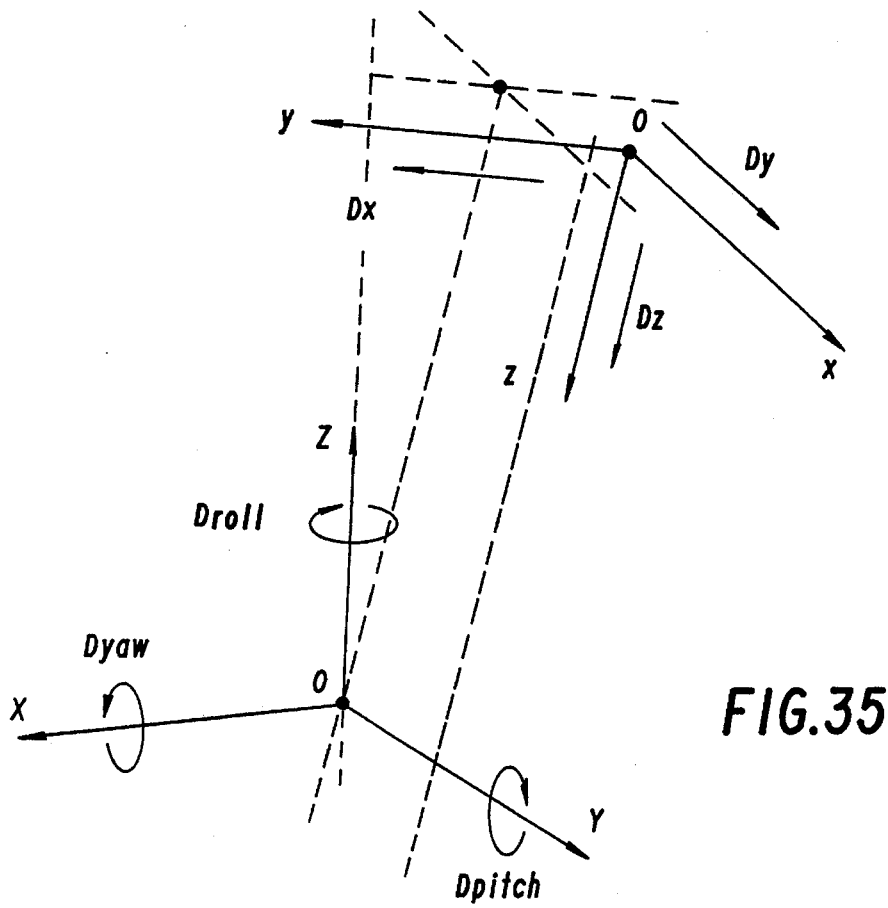
FIG. 35 is a diagram of coordinates indicative of components of the actual shift.

The actual shifts D* are expressed on an absolute scale (representing mm if they indicate the position and radians if they indicate the attitude) in actual coordinates. As shown in FIG. 35, translation components Dx, Dy, and Dz are shifts in the x-, y-, and z-axis directions in the camera coordinate system o-xyz, and rotation components Droll, Dpitch, and Dyaw are shifts described in the target coordinate system O-XYZ.

Figure 36:
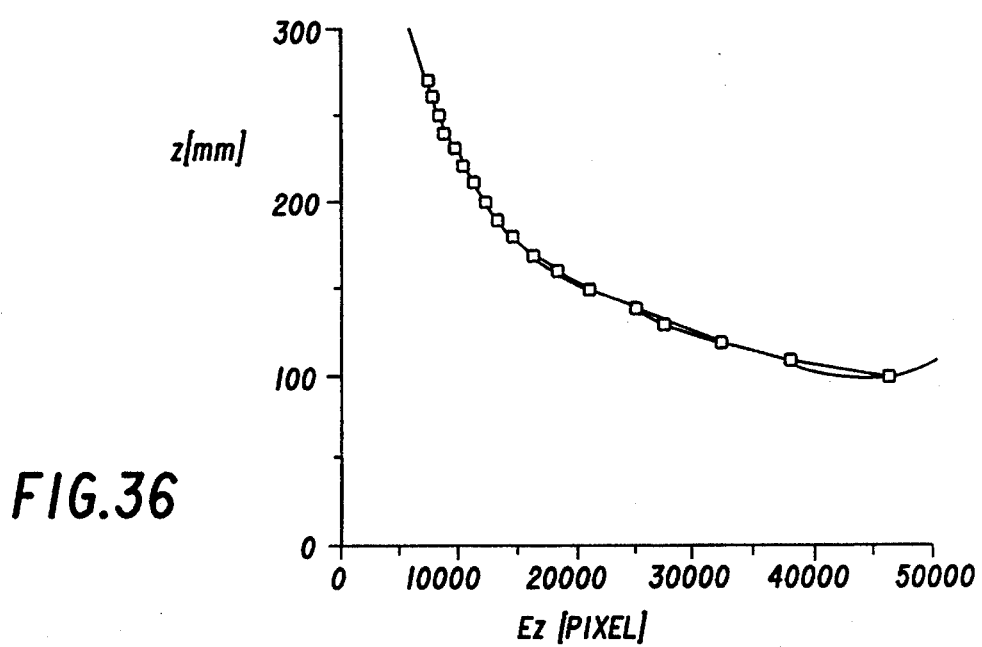
FIG. 36 is a graph showing a z-Ez relationship.
Figure 37:
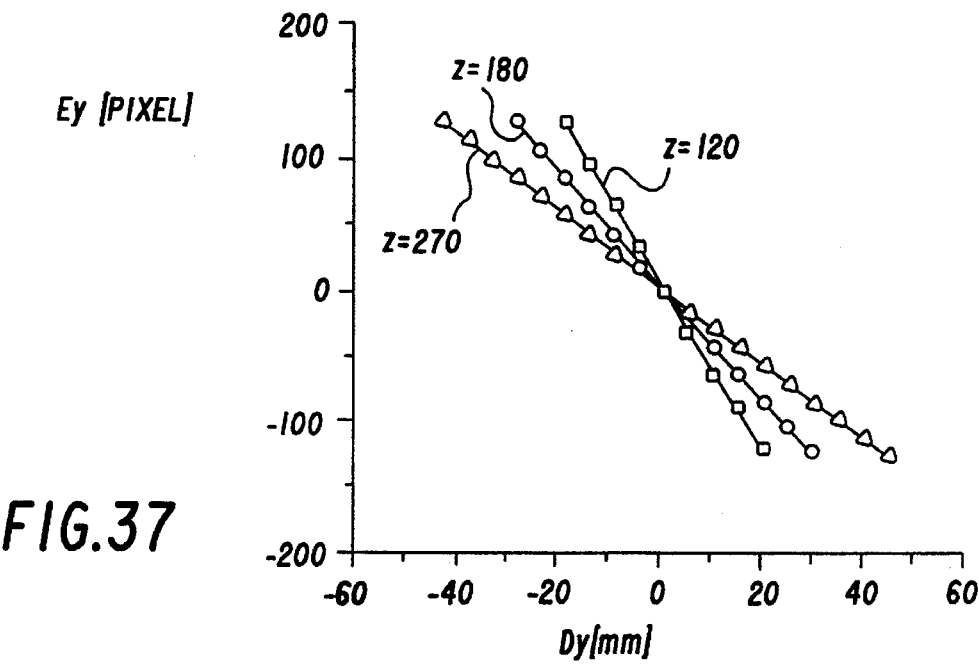
FIG. 37 is a graph showing an Ey-Dy relationship.
Figure 38:
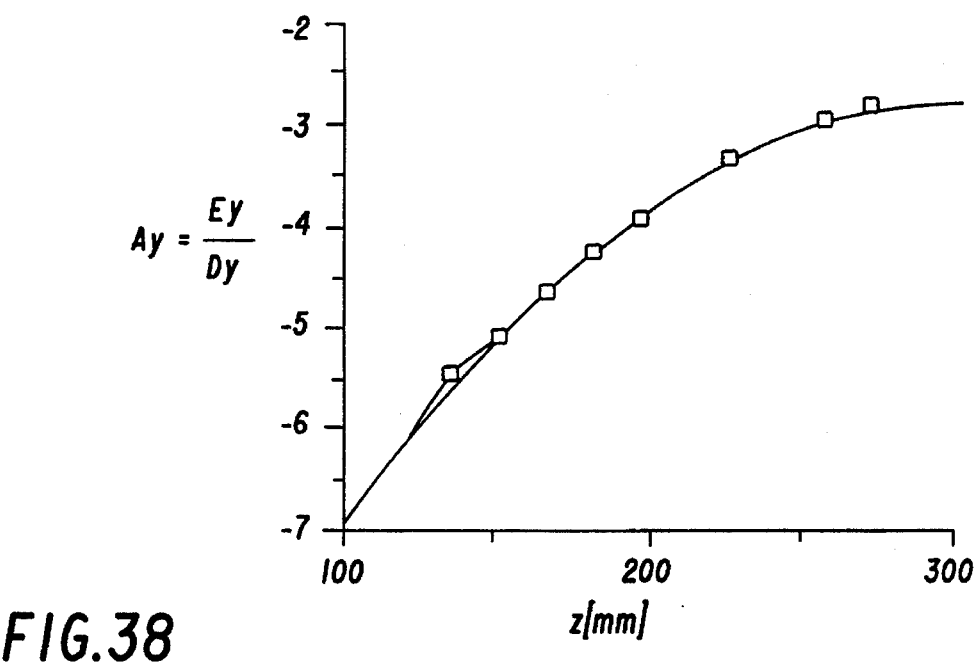
FIG. 38 is a graph showing a z-Ay relationship.

Specific data of the graphs shown in FIGS. 31–33 are illustrated in FIGS. 36 through 38. FIG. 36 shows specific numerical values representing the z-Ez relationship. FIG. 37 plots the Ey-Dy relationship in the y-axis direction at each distance z. FIG. 38 shows the z-Ay relationship in the y-axis direction.

Using the actual shifts D* (*=x, y, roll, pitch, and yaw) converted as described above, the robot controller 60 shown in FIG. 1 generates a speed command to be sent to the manipulator 30a of the robot 30 for effecting real-time tracking control over the target mark. Control sequences according to two embodiments will be described below with reference to FIGS. 39 and 41, respectively.

Figure 39:
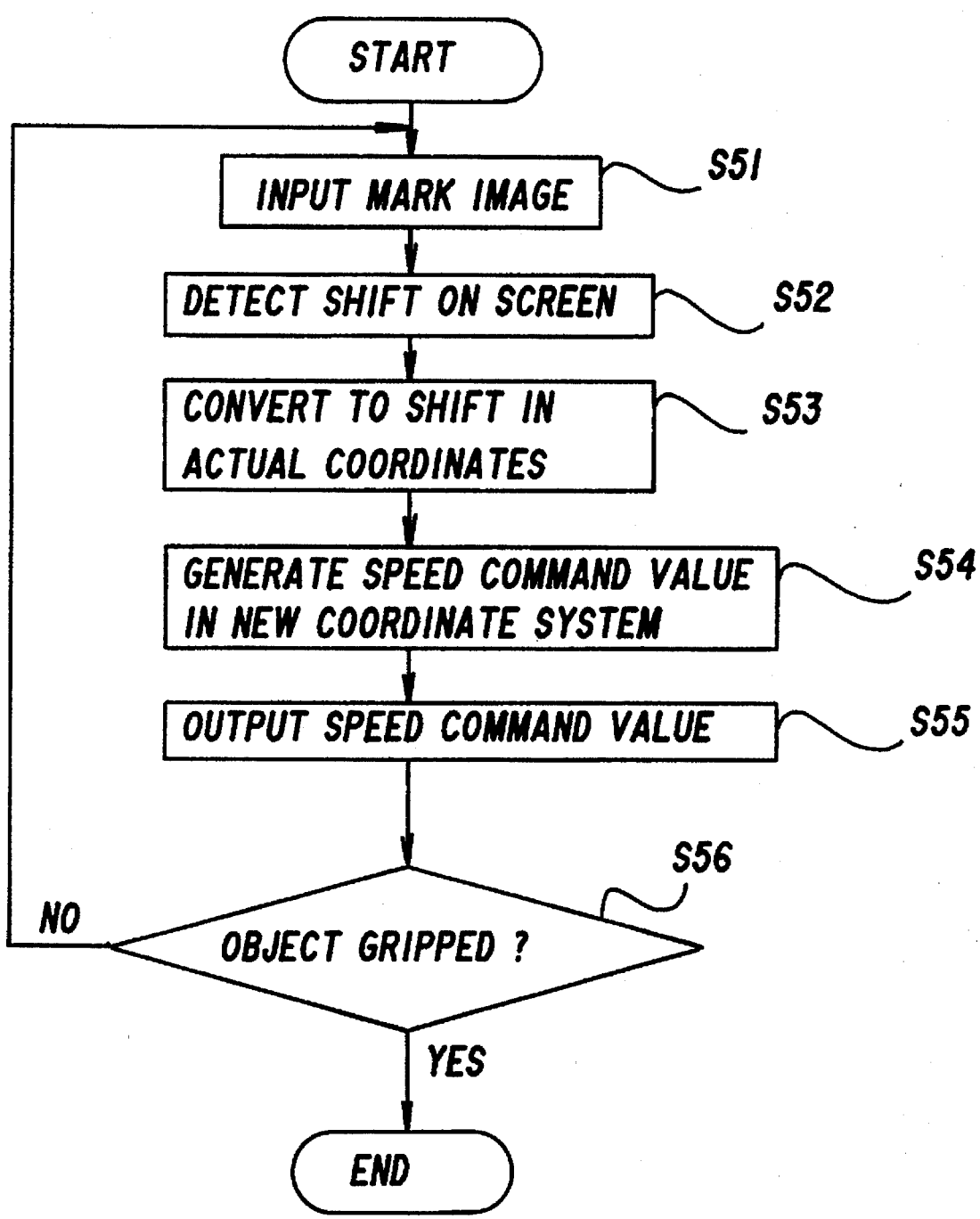
FIG. 39 is a flowchart of a control sequence according to a first embodiment.
Figure 42:
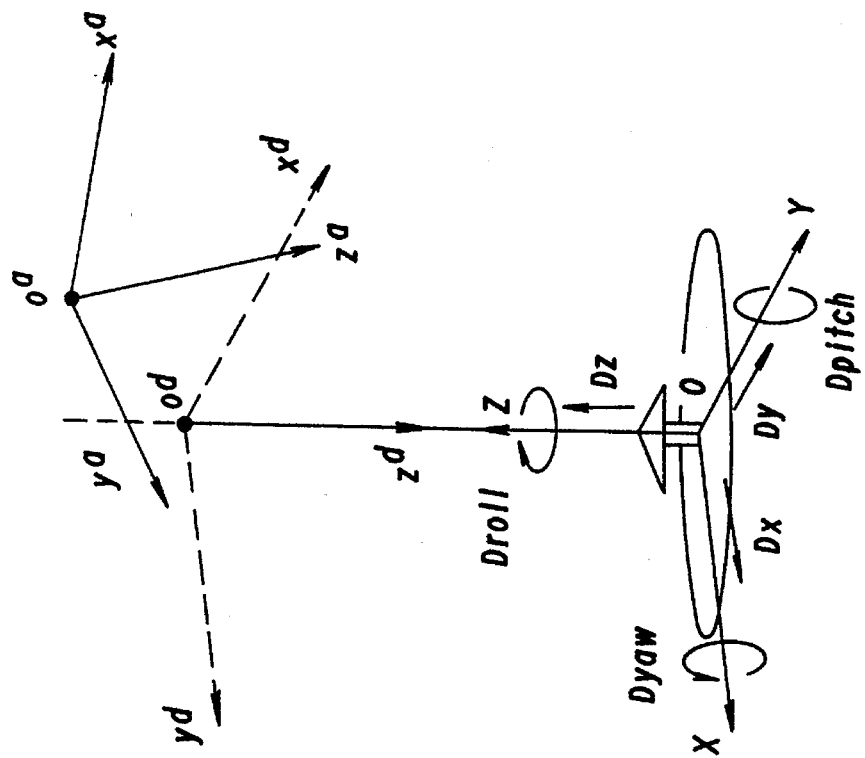
FIG. 42 is a diagram illustrative of a coordinate transformation.

FIG. 39 shows a control sequence according to a first embodiment. According to the first embodiment, the video camera 20 is rotated about the origin O of the target coordinate system O-XYZ to effect positional correction. The control sequence according to the first embodiment is effective when shifts relative to the attitude are relatively small, and requires a short processing time though it is less strict. In FIG. 39, numerals following the letter "S" indicate step numbers.

[S51] An image of the target mark 10 is inputted from the video camera 20.

[S52] Shifts E* (*=x, y, z, roll, pitch, and yaw) on the screen are detected by the image processor 40 and the positional shift calculating unit 50.

[S53] The shifts E* are converted into actual shifts D* (*=x, y, z, roll, pitch, and yaw) by the robot controller 60.

[S54] Speed commands V* (*=x, y, z, roll, pitch, and yaw) are calculated by multiplying the actual shifts D* produced in the step S53 by proportional gains * (*=x, y, z, roll, pitch, and yaw) with the robot controller 60 according to the following equation (14):

$$\begin{bmatrix} Vx \\ Vy \\ Vz \\ Vroll \\ Vpitch \\ Vyaw \end{bmatrix} = \begin{bmatrix} 0 & Ky & 0 & 0 & 0 & 0 \\ Kx & 0 & 0 & 0 & 0 & 0 \\ 0 & 0 & Kz & 0 & 0 & 0 \\ 0 & 0 & 0 & Kroll & 0 & 0 \\ 0 & 0 & 0 & 0 & 0 & Kyaw \\ 0 & 0 & 0 & 0 & Kpitch & 0 \end{bmatrix} \begin{bmatrix} Dx \\ Dy \\ Dz \\ Droll \\ Dpitch \\ Dyaw \end{bmatrix} \quad (14)$$

Figure 40:
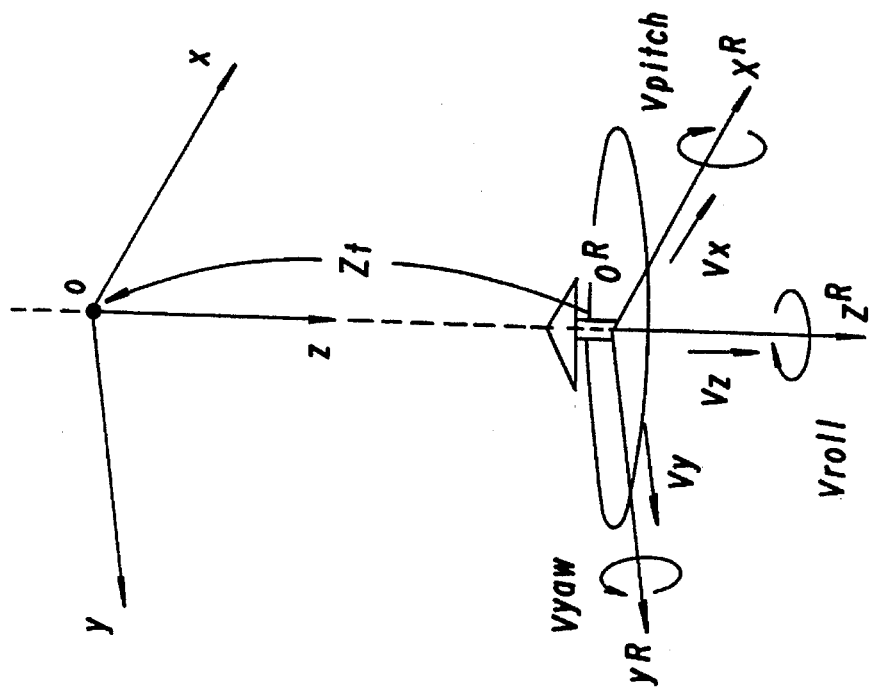
FIG. 40 is a diagram illustrative of a coordinate transformation.

As shown in FIG. 40, the speed commands V* are converted into speed commands in a new coordinate system $o^R\text{-}x^R y^R z^R$ that is created by shifting the camera coordinate system o-xyz by a distance Zt between the video camera 20 and the target mark 10 in the z-axis direction with respect to the rotation components. In this manner, shifts (in the pitch and yaw directions) of the attitude of the video camera 20 are approximately rotated about the origin O of the target coordinate system O-XYZ.

[S55] The speed commands V* calculated in the step S54 are outputted to the manipulator 30a.

[S56] As a result of outputting the speed commands V* in the step S55, the video camera 20 and the target mark 10 are brought into the certain positional relationship. Whether the hand 30b has gripped the object 1 or not is determined. If not gripped, control goes back to the step S51.

Figure 41:
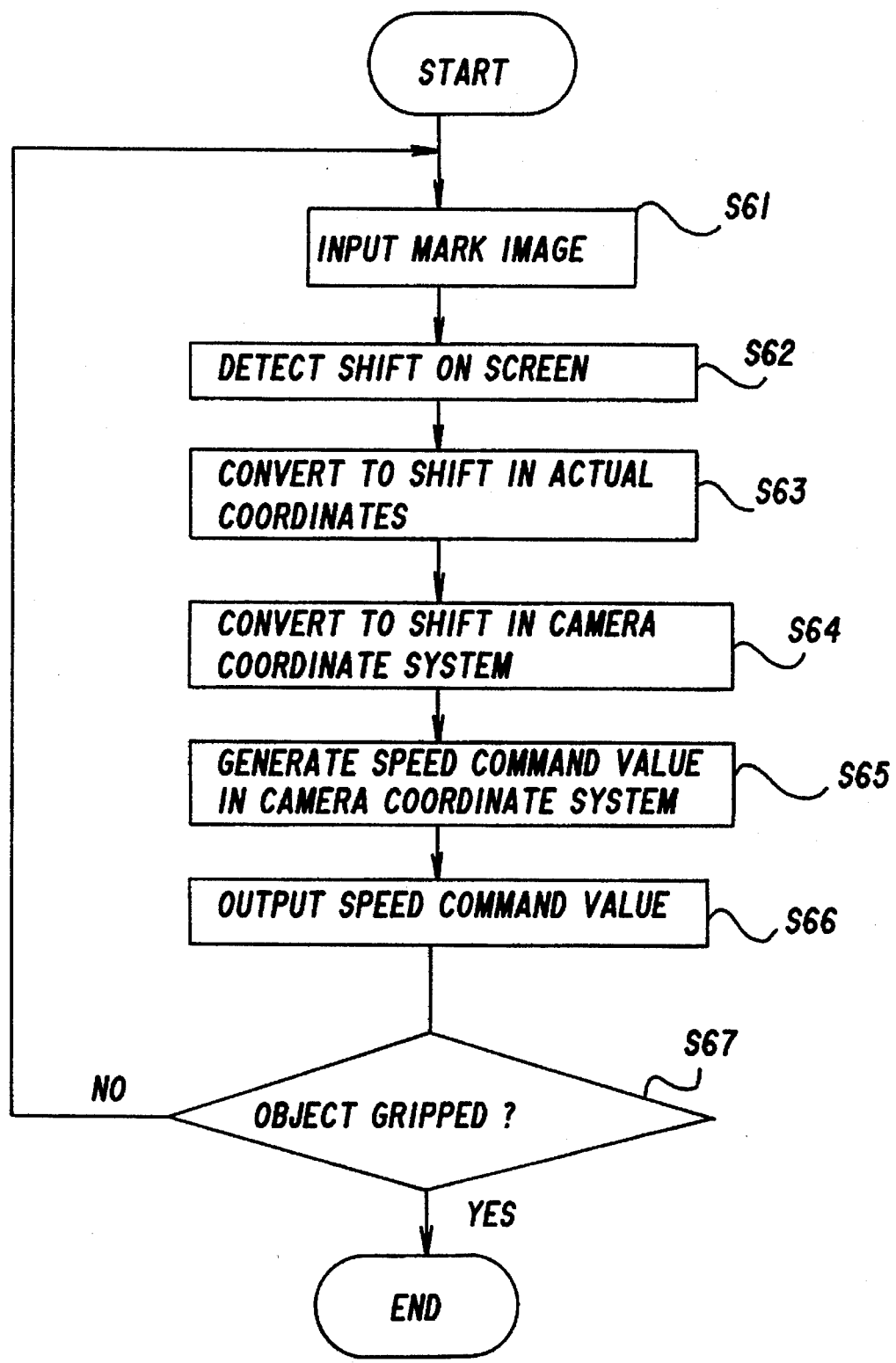
FIG. 41 is a flowchart of a control sequence according to a second embodiment.

FIG. 41 shows a control sequence according to a second embodiment. According to the second embodiment, actual shifts D* in the target coordinate system O-XYZ are converted into actual shifts in the camera coordinate system o-xyz, and the video camera 20 is positionally controlled based on the actual shifts. The control sequence according to the second embodiment takes a processing time slightly, but is a strict control process that is effective irrespective of the magnitudes of shifts relative to the attitude. In FIG. 41, numerals following the letter "S" indicate step numbers.

[S61] An image of the target mark 10 is inputted from the video camera 20.

[S62] Shifts E* (*=x, y, z, roll, pitch, and yaw) on the screen are detected by the image processor 40 and the positional shift calculating unit 50.

[S63] The shifts E* are converted into actual shifts D* (*=x, y, z, roll, pitch, and yaw) by the robot controller 60.

[S64] The actual shifts D* are converted into shifts in the camera coordinate system o-xyz by the robot controller 60. This conversion process will be described below.

If it is assumed that a rotation matrix indicative of a predetermined (target) attitude of the video camera 20 as seen from the target coordinate system O-XYZ is represented by Cd, a rotation matrix indicative of the present attitude of the video camera 20 is represented by Ca, and a matrix indicative of a rotation transformation of shifts Droll, Dpitch, Dyaw of the video camera 20 in the target coordinate system O-XYZ is represented by Dt, then the following equation (15) is satisfied:

$$Ca = Dt Cd \qquad (15).$$

From the equation (15) is derived the following equation (16):

$$Cd = Ca(Cd^{-1} Dt^{-1} Cd) \qquad (16).$$

If $Da = Cd^{-1} Dt^{-1} Cd$, then Da is a matrix indicating a rotation transformation of shifts of the attitude of the video camera 20 as seen from a present camera coordinate system $o^a\text{-}x^a y^a z^a$ into a camera coordinate system $o^d\text{-}x^d y^d z^d$ in a predetermined position. Therefore, Da is calculated to determine actual shifts in the camera coordinate system o-xyz.

[S65] The actual shifts in the camera coordinate system o-xyz determined in the step S64 are multiplied by a constant gain thereby to produce speed commands for the camera 20.

[S66] The speed commands V* calculated in the step S65 are outputted to the manipulator 30a.

[S67] As a result of outputting the speed commands V* in the step S66, the video camera 20 and the target mark 10 are brought into the certain positional relationship. Whether the hand 30b has gripped the object 1 or not is determined. If not gripped, control goes back to the step S61.

The control sequence according to the second embodiment requires a slightly increased amount of calculations, but achieves tracking control with better response.

In each of the above embodiments, the z-Ez relationship and the z-A* relationship are regarded as being approximately expressed by quartic and quadratic curves, respectively, suitable approximate functions z=f(Ez), A*=g*(z) are established, and these functions are used to convert shifts on the screen into actual shifts. According to another process, the z-Ez relationship and the z-A* relationship may be regarded as being approximately expressed by respective straight lines, and suitable approximate linear functions may be established. Such another process results in greater conversion errors, but can accomplish faster conversions. The z-Ez relationship and the z-A* relationship may not be replaced with functions, but may be stored as tables, and shifts on the screen may be converted into actual shifts using such tables. This process can also accomplish faster conversions though a storage capacity for the tables is additionally needed.

As shown in FIGS. 28 through 42, the certain positional relationship between the video camera and the target mark is experimentally shifted, and shifts on the image of the target mark from the target position and actual shifts from the certain positional relationship between the video camera and the target mark are related to each other. As a result, actual shifts from the certain positional relationship between the video camera and the target mark are determined based on the shifts on the image of the target mark from the target position.

By thus relating the shifts on the image to the actual shifts, the shifts on the image of the target mark from the target position can quickly be converted into the actual shifts from the certain positional relationship between the video camera and the target mark. Therefore, even when the distance between the target mark and the video camera varies greatly, the moving object can be tracked stably with a response that is not lowered.

The actual shifts are multiplied by a proportional gain, and speed commands are calculated in a coordinate system that is shifted by the distance between the video camera and the target mark with respect to rotational components and are used as speed commands for positionally controlling the video camera. In case the shifts from the certain positional relationship between the video camera and the target mark are relatively small, high-speed feedback can be achieved for tracking control with a good response.

Alternatively, shifts of the attitude of the video camera are determined in a coordinate system fixed to the video camera from actual shifts, and multiplied by a constant gain to produce speed commands for controlling the position of the video camera. Thus, accurate tracking control can be accomplished regardless of shifts from the certain positional relationship between the video camera and the target mark. Although the amount of calculations is slightly increased, tracking control with a better response can be achieved.

The above embodiments are based on the assumption that the shift Lroll (see the equation (12) and FIG. 22) of the target mark in the roll direction is small. However, if the shift Lroll in the roll direction exceeds ±90 degrees, then the shift Lroll cannot be detected irrespective of the triangular shape of the target mark. If the triangular shape represents an acute isosceles triangle, a smaller rotation cannot be detected.

In the above embodiments, the shift in the roll direction is corrected by repeatedly detecting the shift Lroll in the roll direction. Therefore, the time required for correction is long. Since the corrective gain in the roll direction is nonlinear due to the attitude of the object, no stable convergence is ensured unless corrective data are generated by calibration.

Figure 43:
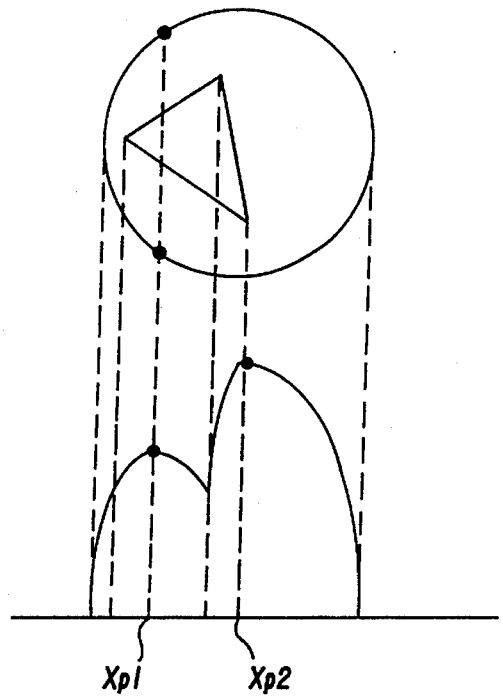
FIG. 43 is a diagram showing a projected histogram indicating that a triangle is largely displaced from the center of a circle in the image of a target mark.

Furthermore, as shown in FIG. 43, in the case where shifts in the X and Y directions of the center of the triangle from the center of the circle in the target mark image are large, the projected histogram may not be of a maximum value at the vertex of the triangle. If the middle point between the two peaks Xp1, Xp2 in the X-projected histogram is regarded as the center of the triangle, then since positional shifts are detected as being excessively small, it takes a long period of time to correct the shifts. In addition, when the two peaks Xp1, Xp2 are detected, a local peak may possibly be detected as these peaks due to noise or the like.

A process of detecting a target mark according another embodiment of the present invention while solving the above problem will be described below.

Figure 44:
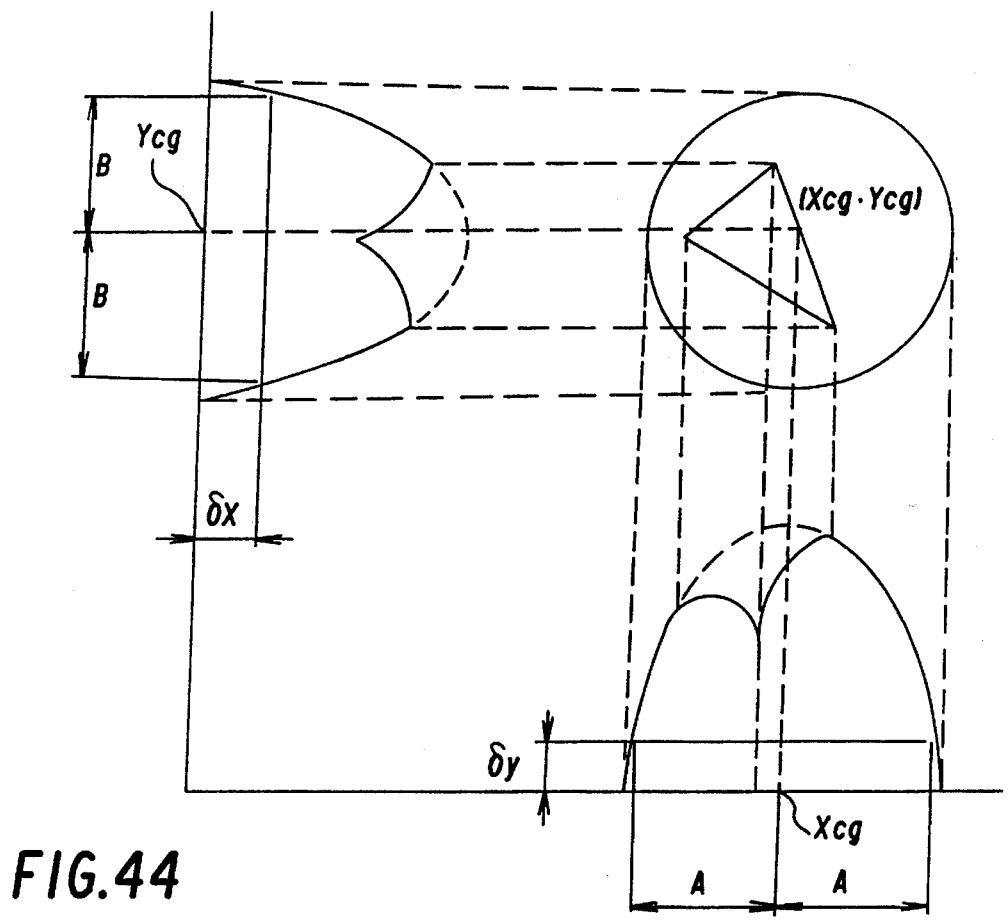
FIG. 44 is a diagram showing a projected histogram illustrative of the manner in which the center of the circle in the image of the target mark is determined.

In X- and Y-projected histograms of an image of a target mark composed of a triangle and a circle behind the triangle, as shown in FIG. 44, two points where the histograms have predetermined values δx, δy, and middle points Xcg, Ycg between these two points are determined. The middle points Xcg, Ycg are regarded as the central position (Xcg, Ycg) of the image of the circle of the target mark. By setting the predetermined values δx, δy to values slightly greater than the noise level, it is possible to detect the central position of the circle of the target mark without being affected by noise.

Figure 45A:
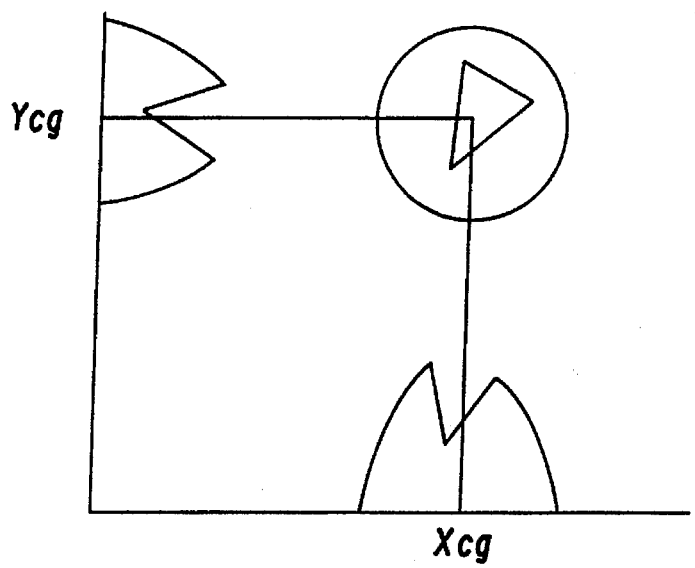
FIGS. 45(A), 45(B), and 45(C) are diagrams showing the manner in which projected histograms of an image of only a triangle are determined from actually measured projected histograms of a target mark composed of a triangle and a circle.
Figure 45B:
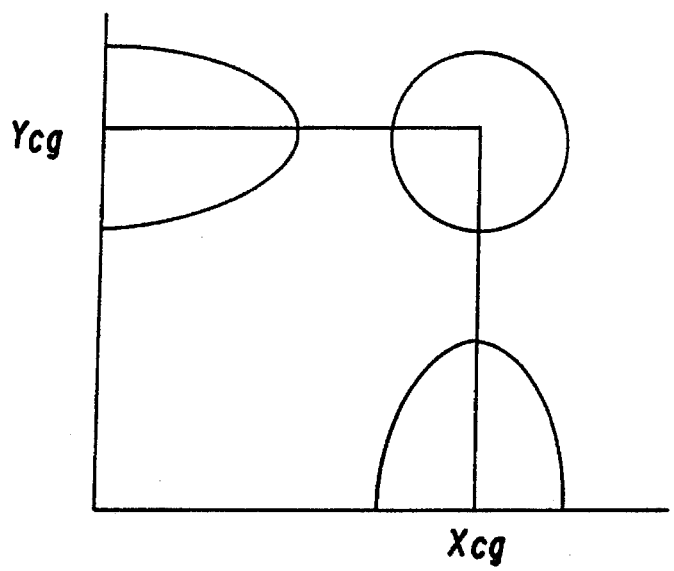
Figure 45C:
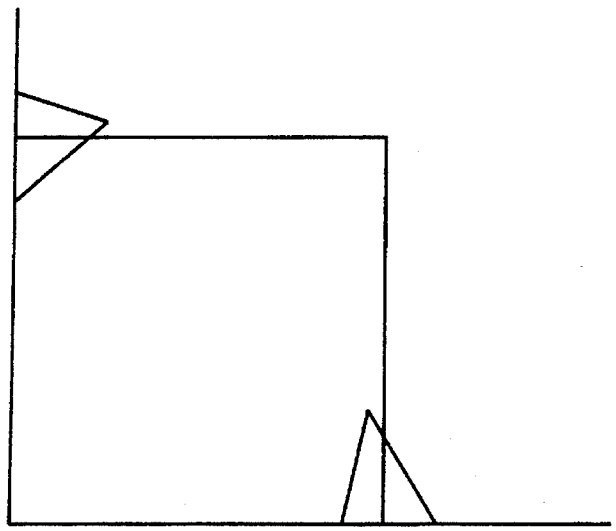

Then, X- and Y-projected histograms of the image of the circle are calculated from the detected central position (Xcg, Ycg) of the image of the circle and known geometric data (such as the radius) of the circle. FIG. 45(B) shows the calculated X- and Y-projected histograms of the image of the circle. FIG. 45(A) shows measured X- and Y-projected histograms of the image of the target mark that is composed of the triangle and the circle behind the triangle. Then, X- and Y-projected histograms of a triangle shown in FIG. 45(C) are obtained by deducing the measured X- and Y-projected histograms of the image of the target mark that is composed of the triangle and the circle behind the triangle from the calculated X- and Y-projected histograms of the image of the circle.

The attitude of the triangle that is rotated in the roll direction is detected based on the X- and Y-projected histograms of the triangle, as follows.

First, it is determined that the triangle of the target mark is an acute isosceles triangle and the acute angle of the triangle is smaller than 45 degrees. The image of the triangular target mark has a reference attitude indicated by a triangle 12a drawn by the two-dash-and-dot line in FIG. 46. A triangle 12b is rotated counterclockwise in the roll direction about the center of gravity G of the triangle 12a by an angle θ. A line interconnecting a bottom corner E of the triangle 12a and its center of gravity G intersects with the X-axis at an angle θo, and also intersects with a side of the triangle 12a at a point F. The line segment EF has a length Lp (the number of pixels).

Figure 47:
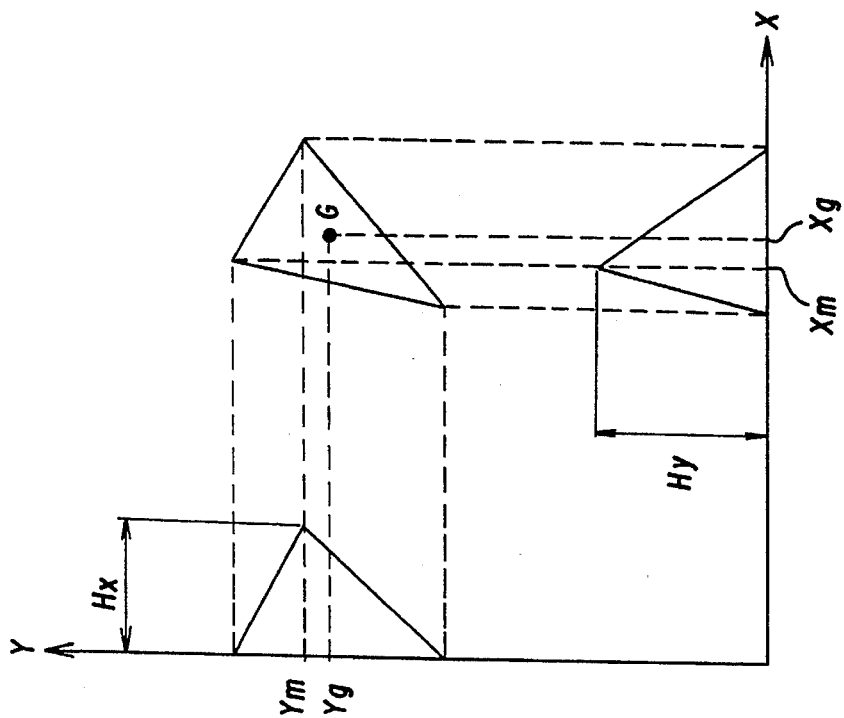
FIG. 47 is a diagram showing the position of the center of gravity of the triangle of the target mark and the maximum values of the histograms and their positions.

As shown in FIG. 47, coordinates (Xg, Yg) of the center of gravity G, X and Y coordinates Xm, Ym where histograms have maximum values, and maximum values Hy, Hx are determined using X- and Y-histograms of the image of the triangle.

The attitudes of the triangle 12B as it is rotated are classified into the following attitude patterns depending on the magnitudes of the values Xg, Yg, Xm, Ym, Hy, Hx.

FIGS. 48 and 49 show the positions of the center of gravity G as it varies with respect to the coordinates Xm, Ym when the angle θ is progressively increased. The positions of the center G of gravity are classified into 24 patterns. Denoted at A, B, a, b, 0 are signs for indicating a weight (area) balance with respect to the coordinates Xm, Ym, and the weights (areas) are related to each other as follows: A>a>0 and B>b>0. The arrows indicate the directions in which the center of gravity G (indicated by the black dots) are present with respect to the coordinates Xm, Ym. The symbol [ ] over each of the frames in FIGS. 48 and 49 represents the pattern number.

Figure 46:
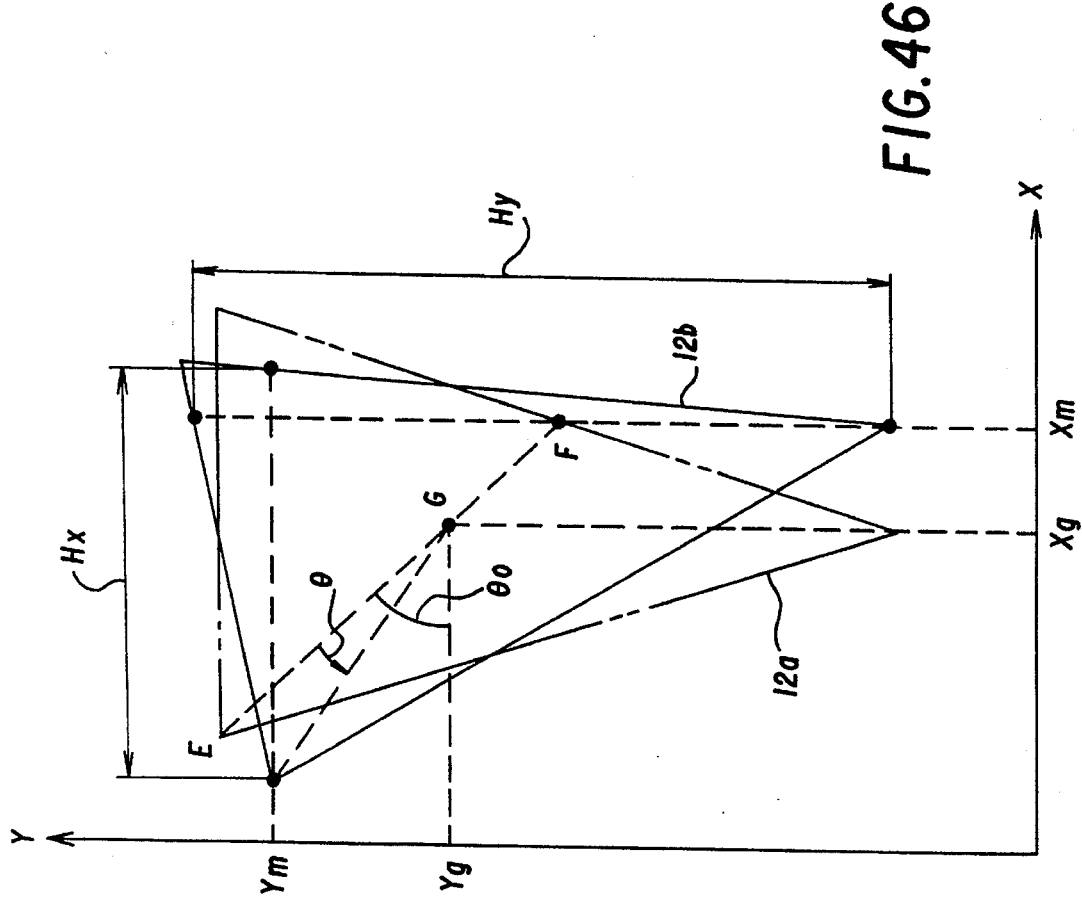
FIG. 46 is a diagram showing the reference shape and position of the triangle of the target mark.

The rotational angle θ in each of the attitude patterns is expressed according to the following equations:

[1] $\theta = 0$ (17),

[2] This attitude pattern is shown in FIG. 46.

[3] $\theta = \theta o - \arcsin[3(Ym-Yg)/2Lp]$ (18),

[3] $\theta = \pi/2 - \theta o$ (19),

[4] $\theta = \pi/2 - \theta o + \arcsin[3(Xg-Xm)/2Lp]$ (20),

[5] $\theta = \theta o$ (21),

[6] $\theta = \pi/2 - \theta o + \arcsin[3(Xg-Xm)/2Lp]$ (22),

[7] $\theta = \pi/2$ (23),

[8] $\theta = \pi/2 + \theta o - \arcsin[3(Xg-Xm)/2Lp]$ (24),

[9] $\theta = \pi - \theta o$ (25),

[10] $\theta = \pi - \theta o + \arcsin[3(Yg-Ym)/2Lp]$ (26),

[11] $\theta = \pi/2 + \theta o$ (27),

[12] $\theta = \pi - \theta o + \arcsin[3(Yg-Ym)/2Lp]$ (28),

[13] $\theta = \pi$ (29),

[14] $\theta = \pi + \theta o - \arcsin[3(Yg-Ym)/2Lp]$ (30),

[15] $\theta = 3\pi/2 - \theta o$ (31),

[16] $\theta = 3\pi/2 - \theta o + \arcsin[3(Xm-Xg)/2Lp]$ (32),

[17] $\theta = \pi + \theta o$ (33),

[18] $\theta = 3\pi/2 - \theta o + \arcsin[3(Xm-Xg)/2Lp]$ (34),

[19] $\theta = 3\pi/2$ (35),

[20] $\theta = 3\pi/2 + \theta o - \arcsin[3(Xm-Xg)/2Lp]$ (36),

[21] $\theta = 2\pi - \theta o$ (37),

[22] $\theta = 2\pi - \theta o + \arcsin[3(Ym-Yg)/2Lp]$ (38),

[23] $\theta = 3\pi/2 + \theta o$ (39), and

[24] $\theta = 2\pi - \theta o + \arcsin[3(Ym-Yg)/2Lp]$ (40).

FIG. 50 shows the above 24 attitude patterns classified according to the magnitude of values Xg, Yg, Xm, Ym, Hy, Hx and their magnitude relationship. The attitude patterns indicated as being surrounded by thick frames are singularly impossible to be classified according the values Xg, Yg, Xm, Ym, Hy, Hx.

When the coordinates (Xg, Yg) of the center of gravity G, the X and Y coordinates Xm, Ym where the histogram values are maximum, and the maximum values Hy, Hx are determined using the measured X- and Y-histograms of the image of the triangle, these values may be compared with the classifications shown in FIG. 50 to know which attitude pattern the triangle of the measured target mark belongs to. It is also possible to know the rotational angle θ according to the equations (17)-(40).

However, it is not possible to identify which of the two attitude patterns the triangle belongs to with respect to the attitude patterns surrounded by the thick frames. For these attitude patterns, the camera is slightly rotated in the roll direction to bring the triangle into an attitude pattern out of the thick frames, and then the rotational angle θ is detected again.

The shift Lroll in the roll direction is detected using the rotational angle θ thus detected.

A simple process of calculating the coordinates (Xg, Yg) of the center of gravity G of the triangle of the target mark that is composed of the triangle and the circle behind the triangle.

The coordinates (Xag, Yag) of the center of gravity of a target mark image are determined based on the measured projected histograms of the target mark image. Based on the area Sc of the circle and the area St of the triangle of a known target mark, their ratio γ (=St/Sc) is determined. As described above, the central position of the image of the circle of the target mark is indicated by (Xcg, Ycg).

At this time, the following equations (41), (42) are satisfied.

$$Xag = (\gamma \cdot Xg + Xcg)/(1+\gamma) \quad (41), \text{ and}$$

$$Yag = (\gamma \cdot Yg + Ycg)/(1+\gamma) \quad (42).$$

These equations are modified as follows:

$$Xg = [(1+\gamma)Xag - Xcg]/\gamma \quad (43), \text{ and}$$

$$Yg = [(1+\gamma)Yag - Ycg]/\gamma \quad (44).$$

Therefore, the coordinates (Xg, Yg) of the center of gravity G of the triangle of the target mark can simply be calculated from the coordinates (Xag, Yag) of the center of the gravity of the target mark image and the ratio γ (=St/Sc) of the area St of the triangle to the area Sc of the circle of the triangle.

In the above embodiment, the rotation of the acute isosceles triangle of the target mark whose acute angle is less than 45 degrees has been described. With respect to rotation in the roll direction of a triangle whose acute angle is equal to or greater than 45 degrees and smaller than 60 degrees, the rotational angle θ can be detected basically on the same principles though the classifications shown in FIGS. 48–50 are slightly modified.

As described above, using a target mark in the form of a triangle of a certain shape and X- and Y-histograms of the triangle image, the coordinates (Xg, Yg) of the center of gravity G of the triangle image, the X and Y coordinates Xm, Ym where the histogram values are maximum, and the maximum values Hy, Hx are determined, and the attitude of the triangle is determined as a rotational angle from the classified attitude patterns. In this fashion, a wide range of rotational angles can be detected stably, and shifts of rotational angles can be detected accurately. Accordingly, the time required to correct positional shifts may be shortened. The values Xg, Yg, Xm, Ym, Hy, Hx can be detected highly simply on image processing. Therefore, the attitude of a triangle can be identified much more easily than the known process which needs a complex processing of extracting boundary lines, determining the lengths of the sides of a target mark triangle, and determining the attitude of the triangle on the image from the ratio of the sides.

The above embodiment employs a general-purpose image processor as shown in FIG. 51(A). According to commands given over a bus, one frame of scanned image data from a camera is stored in a frame memory 301, and a window is established and stored in a frame memory 302. Then, the image data is converted into binary image data which is stored in a frame memory 303. Finally, projected histograms are generated from the binary image data and stored in a histogram memory 304. The data stored in the histogram memory 304 is read by a CPU for detecting positional shifts.

When the above general-purpose image processor is employed, it is necessary to write and rear one frame of image data each time it is supplied from the camera, a window is established, the data is converted into binary image data, and projected histograms are generated. The time required to write and read the data and the time required to access the bus total about 50 ms. Therefore, the general-purpose image processor requires at least 200 ms to obtain projected histogram data of one frame of image data. However, a higher-speed processing is desirous for tracking a target mark that moves at high speeds. An image processor capable of processing image data at a higher speed will be described below.

FIG. 51(B) shows the principles of an image processor for processing image data to obtain projected histogram data at a higher speed. The image processor according to this embodiment stores image data from a video camera, establishes a window, converts the image data into binary image data, and generates projected histograms simultaneously without using frame memories, and stores the generated projected histogram data in a histogram memory 305.

Figure 53:
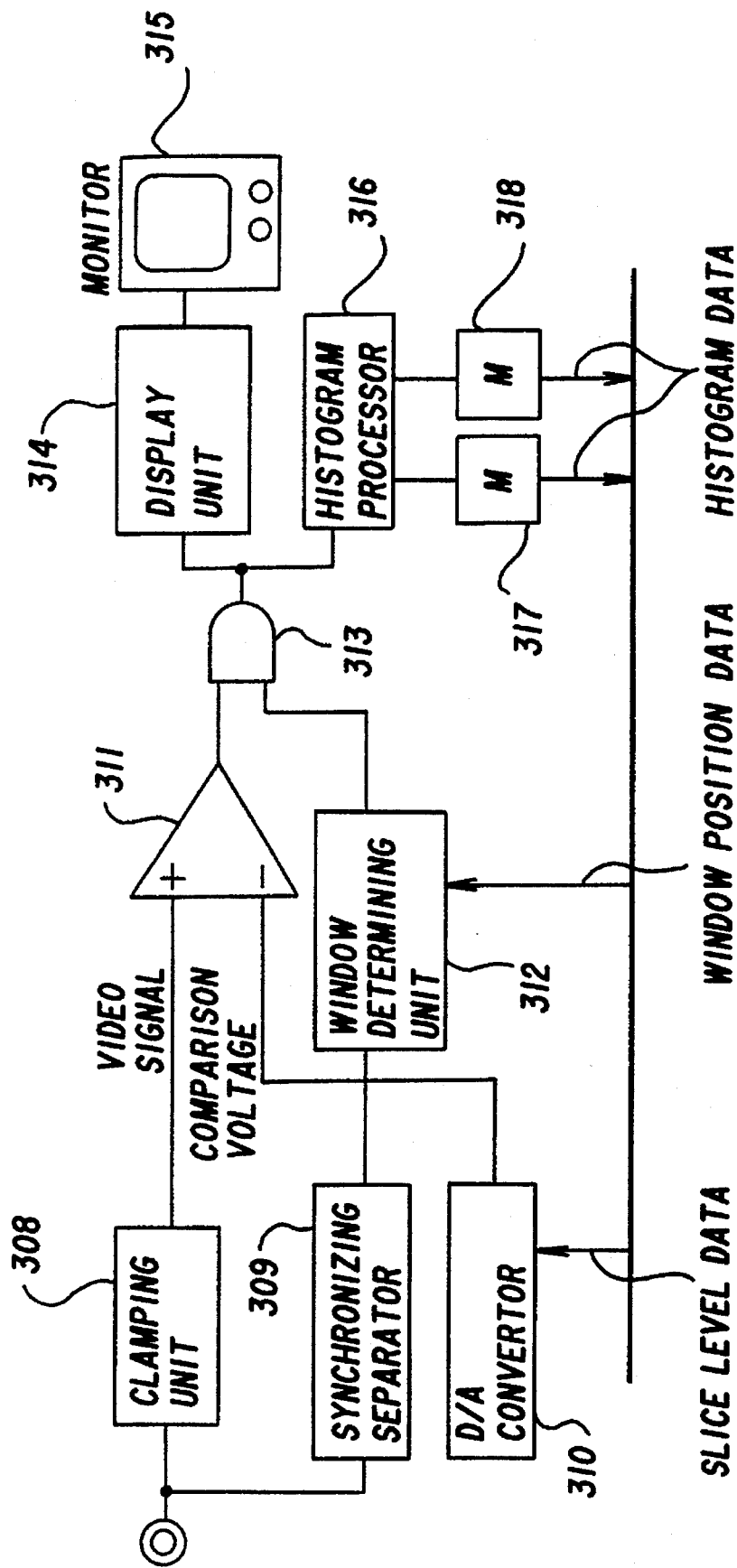
FIG. 53 is a diagram of a hardware arrangement for producing projected histogram data.
Figure 54:
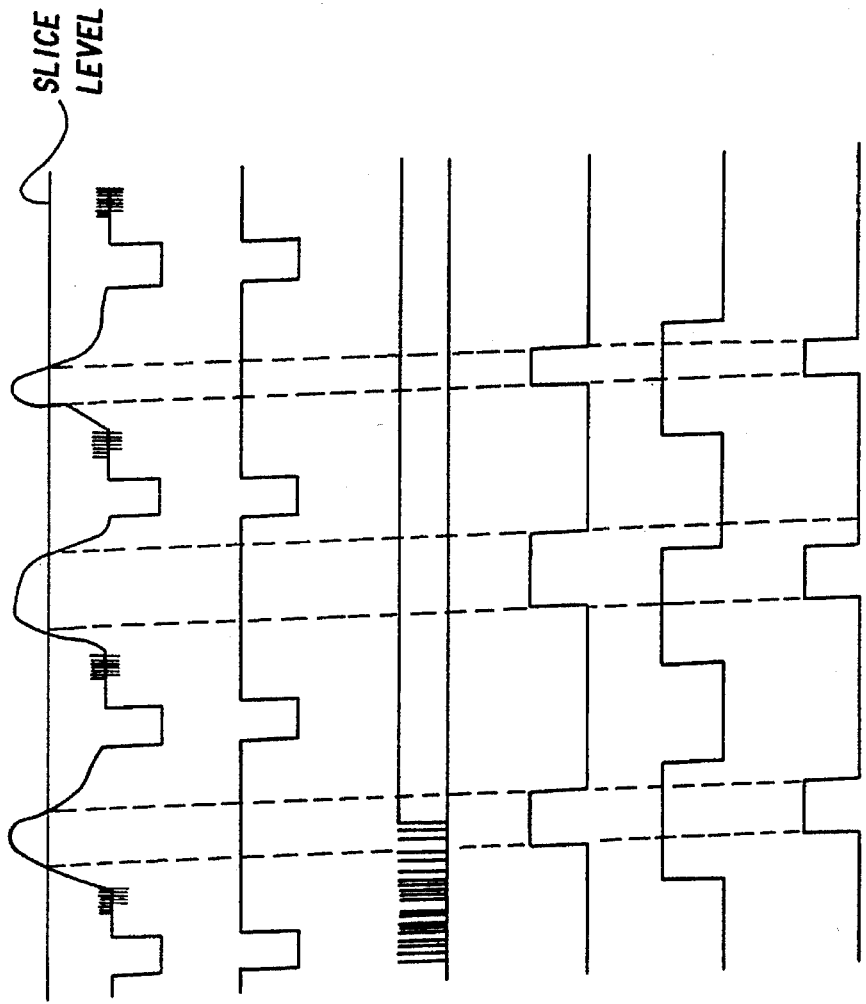
FIG. 54 is a timing chart of signal waveforms in the blocks of the hardware arrangement shown in FIG. 53.

FIG. 53 is a block diagram of a specific arrangement of the image processor shown in FIG. 51(B). FIG. 54 is a timing chart of signal waveforms in the blocks of the image processor shown in FIG. 53. The timing chart of FIG. 54 will be referred to from time to time in the following description of the image processor shown in FIG. 53.

A video signal [FIG. 54(A)] is inputted through a clamping unit 308 to an analog comparator 311, which is also supplied with a slice level of data from a bus after it is converted to an analog value by a D/A converter 310. The comparator 311 outputs a binary pulse signal [FIG. 54(D)] in response to the video signal that exceeds the slice level. A synchronizing separator 30 separates vertical and horizontal synchronizing signals [FIG. 54(B)] from the video signal, and outputs them to a window determining unit 312.

The window determining unit 312 determines a window in the X direction by starting to count dot clock pulses [FIG. 54(C)] of 12 MHz in response to the horizontal synchronizing signal, and comparing the count with data indicative of a window position which has been set by a CPU through a bus. The window determining unit 312 determines a window in the Y direction by counting the horizontal synchronizing in response to the vertical synchronizing signal, and comparing the count with the window position. The window determining unit 312 produces an output signal [FIG. 54(E)] by ANDing an intra-window signal on the X-axis side and a window signal on the Y-axis side.

An AND gate 313 produces an AND output signal [FIG. 54(F)] by ANDing the binary pulse signal [FIG. 54(D)] and the intra-window signal [FIG. 54(E)]. The AND output signal represents a binary signal in the window. A histogram processor 316 counts the dot clock pulses [FIG. 54(C)] only while the AND output signal is of "1", thus generating histogram values. The generated X- and Y-projected histograms are stored in an X-direction memory (M) 317 and a Y-direction memory (M) 318. The CPU reads the histogram data from the memories 317, 318 through the bus. The AND output signal is also outputted through a display unit 314 to an image monitor 315.

The above window comparison, storage, conversion to the binary signal, and generation of projected histograms are carried out during horizontal scans, and the histogram values are stored in the memories 317, 317 during vertical blanking times. Therefore, the window comparison, storage, conversion to the binary signal, and generation of projected histograms, and the storage of the histogram values are completed until a next frame of image data starts to be scanned.

As described above, the general-purpose image processor repeats accessing frame memories which are not necessary for the tracking algorithm and requires a processing time of at least 200 ms to determine projected histograms once. The image processor according to this embodiment requires not frame memory, and hence does not access any frame memory, with the result that its processing time corresponds only one frame (33 ms). The image processor can thus achieve a high-speed processing and is capable of tracking a target mark that moves at a high speed.

Figure 52:
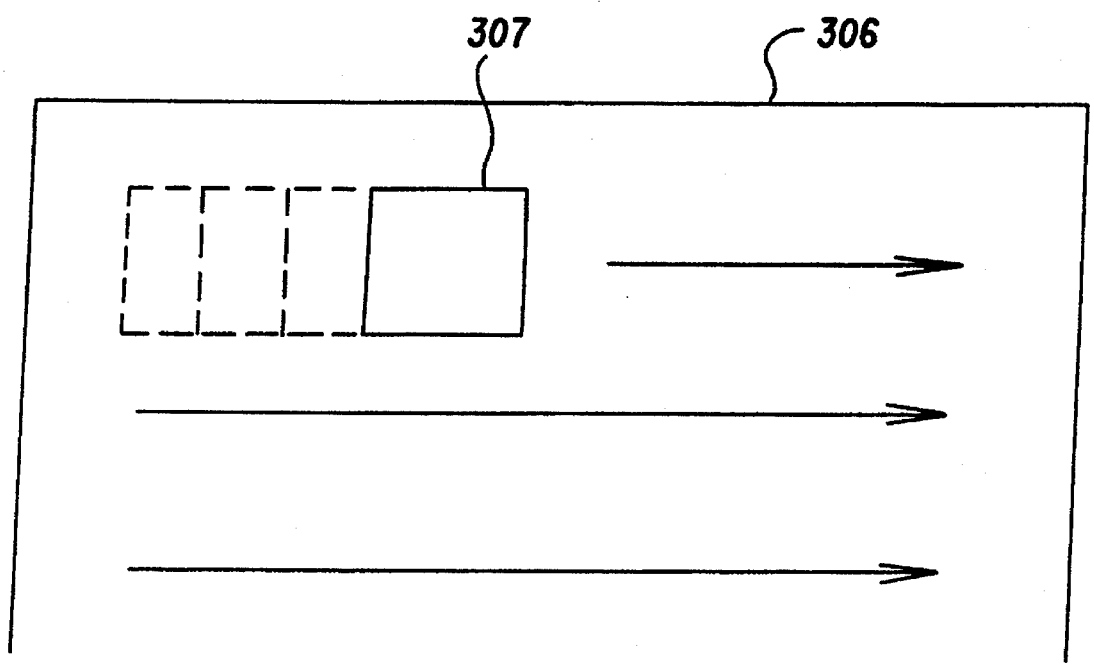
FIG. 52 is a diagram illustrative of the manner in which a window is moved.

Since the hardware of the image processor cannot label the binary image, a window 307 is moved at a high speed in a screen 306 as shown in FIG. 52, and projected histograms are checked in the window for thereby searching for a target mark.

The target mark is required to have a triangular shape in the above embodiments. Now, an embodiment for recognizing a target mark which does not have a triangular shape will be described below.

Figure 55:
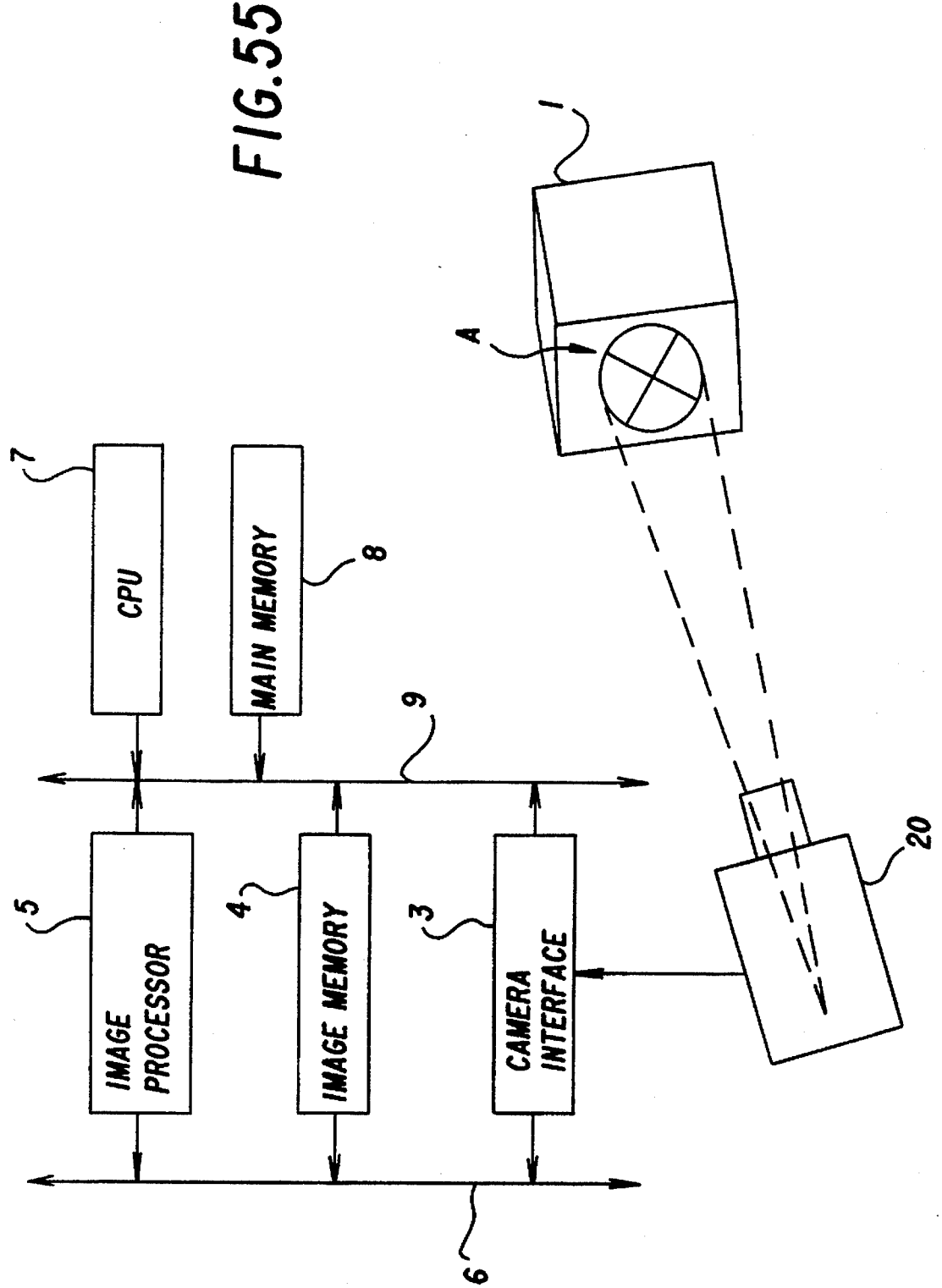
FIG. 55 is a block diagram of an apparatus for measuring a position and an attitude.

FIG. 55 shows the arrangement of such an embodiment in block form. In FIG. 55, an object 1 to be gripped by a robot hand during operation of a robot is in any optional position and has any optional attitude in a three-dimensional space. An apparatus for measuring the position and attitude of the object 1 is supplied with an image of a target mark A imaged by a single camera 20 through a camera interface 3. The position and attitude measuring apparatus measures the position and attitude of the object 1 based on the image data of the target mark A.

The target mark A is placed on a certain plane of the object 1 and includes a circle and its central point. The target mark A is imaged by the camera 20, which generates the image of its circle and central point. The camera interface 3 is connected to an image memory 4 and an image processor 5 through an image bus 6. The image of the target mark A is stored in the image memory 4, for example, and the image processor 5 extracts feature points that are required to measure the position and attitude of the object 1.

A CPU 7 and a main memory 8 constitute calculating means for calculating the position and attitude of the object 1. They can calculate the position and attitude of the target mark A in an object space by carrying out projective geometric calculations relative to feature points that are extracted from an image space. The calculating means is connected through a control bus 9 to the image processor 5, etc.

Figure 56:
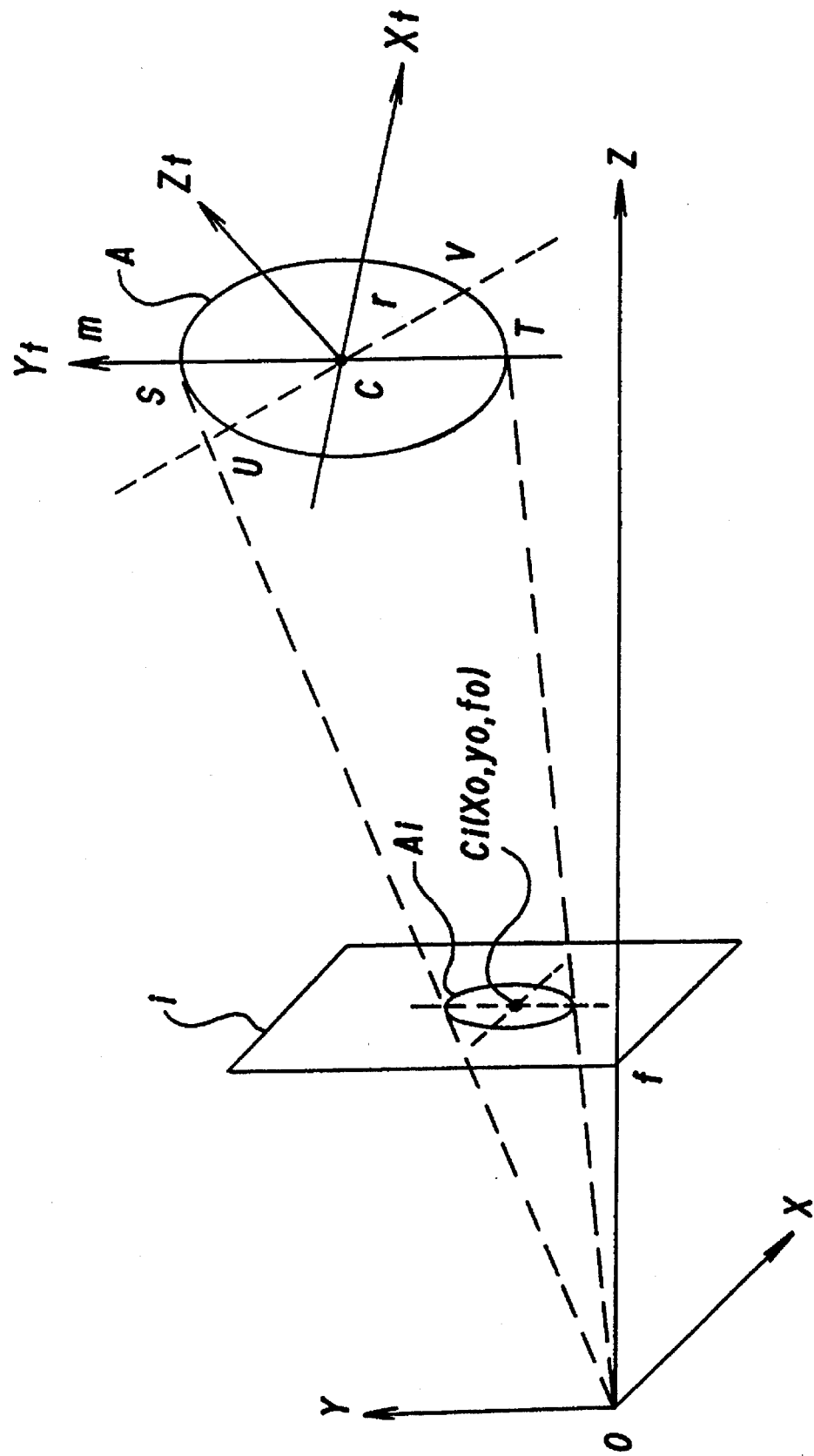
FIG. 56 is a diagram showing the principles of measurement using a target mark.

FIG. 56 shows the principles of position and attitude measurement using a target mark A. The target mark A is composed of a circle having a radius r and its central point C. FIG. 56 illustrates projected images Ai, Ci of the target mark A which are viewed in perspective on an image plane i which is the image plane of the camera 20. A viewpoint O is at the lens center of the camera 20. Though the image plane i is originally positioned on a negative side on the Z-axis, it is plotted on a positive side in order to show object and image planes in clearly corresponding relationship. Denoted at f is the focal length of the lens of the camera 20, X, Y, Z are reference coordinates of the camera 20, and Xt, Yt, Zt are reference coordinates of the object space whose origin is the central point C of the target mark A.

The attitude of the target mark A relative to the camera 20 is such that the target mark A is slightly rotated about a straight line m on the Yt-axis. A diametrical vector which interconnects points S, T of intersection between the straight line m and the circle of the target mark A extends parallel to the image plane i. The image processor 5 extracts predetermined feature points from the image Ai of the circle of the target mark A and the image Ci of its central point, and the CPU 7 measures the position and attitude of the target mark A. This embodiment is based on the fact that the position and attitude in a three-dimensional space of a circle whose radius is known are uniquely determined from projected images of the circle and its central point.

In this embodiment, when the circle in the three-dimensional space is projected, at least one of the straight lines extending diametrically across the circle in the object space extends parallel to the image plane. Based on this fact, two points S, T that define a diameter parallel to the image plane i of the target mark A are determined, and the coordinates of the central point C are determined from the ratio between the distance between image points in the image plane and the diameter 2r of the circle.

In this embodiment, furthermore, two or more vanishing points are determined from the image of a desired diameter of the circle in the three-dimensional space. Based on the fact that any of the lines that connect the vanishing points to the image Ci of the central point is aligned with the direction of the diameter of the actual circle in the object space, a vector Zt normal to a plane that contains the circle of the target mark A. The direction of the plane containing the target mark A can be determined even if the radius of the circle of the target mark A is unknown.

The principles described above will be described in greater detail below.

Figure 57:
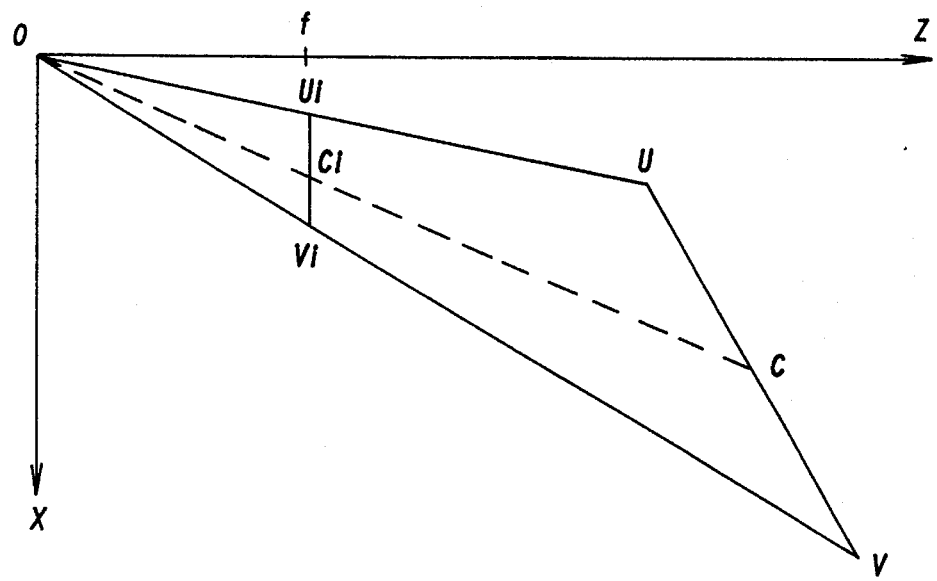
FIG. 57 is a diagram showing the relationship between a target mark and its image.

FIG. 57 shows the relationship between a target mark A in the reference coordinates of the camera 20 and its image. When an image Ai of a circle and an image point Ci of a central point C are obtained from the target mark A that is composed of the circle having a radius r and its central point, two straight lines passing through the image point Ci are considered. When points of intersection between the straight lines and the image Ai of the circle are determined, the position and attitude of the target mark A can be determined. The reasons for this will be described below with reference to FIG. 57.

FIG. 57 illustrates a cross section produced by cutting an oblique circular cone determined by a viewpoint O and the image Ai of the circle with a plane that contains the viewpoint O and two points U, V on the diameter of the target mark A. The vectors of the points U, V, and C are expressed by the following equations (45)-(47):

$$(OU) = s(OUi) \quad (45),$$

$$(OV) = t(OVi) \quad (46),$$

and $$(OC) = u(OCi) \quad (47),$$

where (OU), (OV), (OC) represent vectors who have a starting point O and ending points U, V, C, and s, t, u are scalar quantities. Since the points U, V are points on the circumference of the circle and the point C is the central point of the circle, the following equations are satisfied:

$$(UC) = (CV) \quad (48),$$

and $$|UC| = r \quad (49).$$

As can be understood from the above equations, when the coordinates of the points Ui, Vi, Ci in the image plane i are determined, the scalar quantities s, t, u corresponding thereto are determined, and hence the coordinates of the points U, V, C are determined. Likewise, when the coordinates of points on the circumference of the target mark A corresponding to another straight line passing through the image point Ci are determined, the position and attitude of the target mark A can uniquely be determined.

Figure 58:
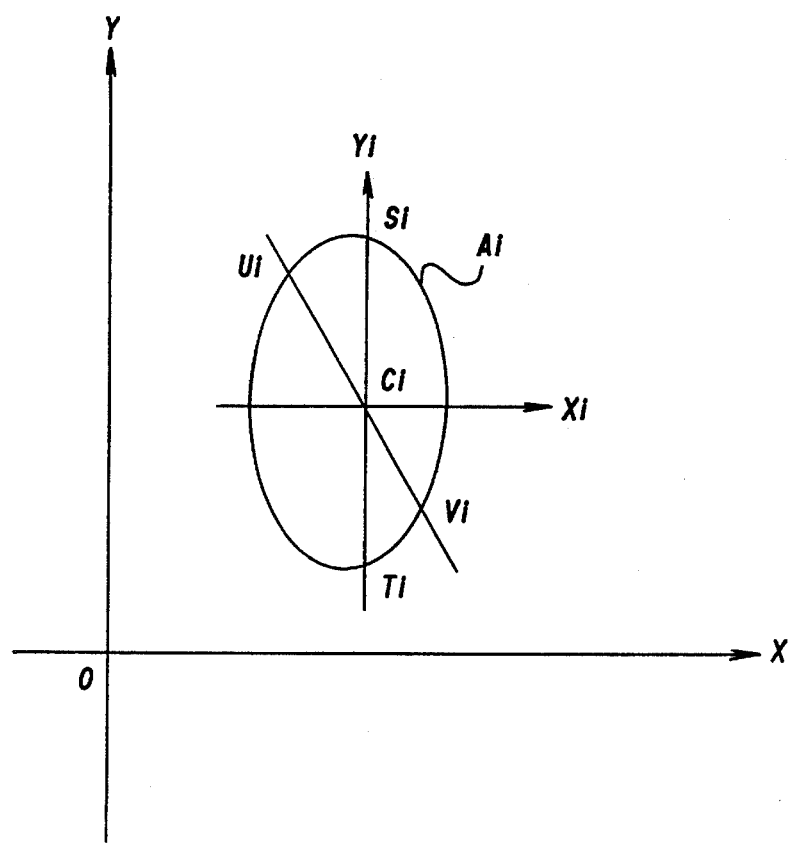
FIG. 58 is a diagram showing images of a circle and its center.

FIG. 58 shows an image of the circle of the target mark A and an image of its central point as they are projected onto the image plane i.

Except when the camera 20 faces the plane of the target mark A of the object 1 head on, the circle of the target mark A projects an image Ai of an ellipse onto the image plane i. If it is assumed that image points of points S, T of intersection between the circle of the target mark A and a straight line m passing through its central point C are represented by Si, Ti, respectively, there exists only one line segment that is divided into two equal parts by the image point Ci of the central point C, and that line segment can easily be extracted as the image points Si, Ti by the image processor 5. If the coordinates of the image point Ci are represented by $(x_o, y_o)$, then the coordinates of the central point C are determined by the ratio p between the diameter 2r of the circle and the distance between the image points Si, Ti in the image plane i, as follows:

$$C(px_o, py_o, pf) \qquad (50).$$

Since calculation parameters can thus be greatly reduced, the position of the target mark A can be measured highly accurately with simple calculations.

Another process of measuring the attitude of the target mark A will be described below.

Figure 59:
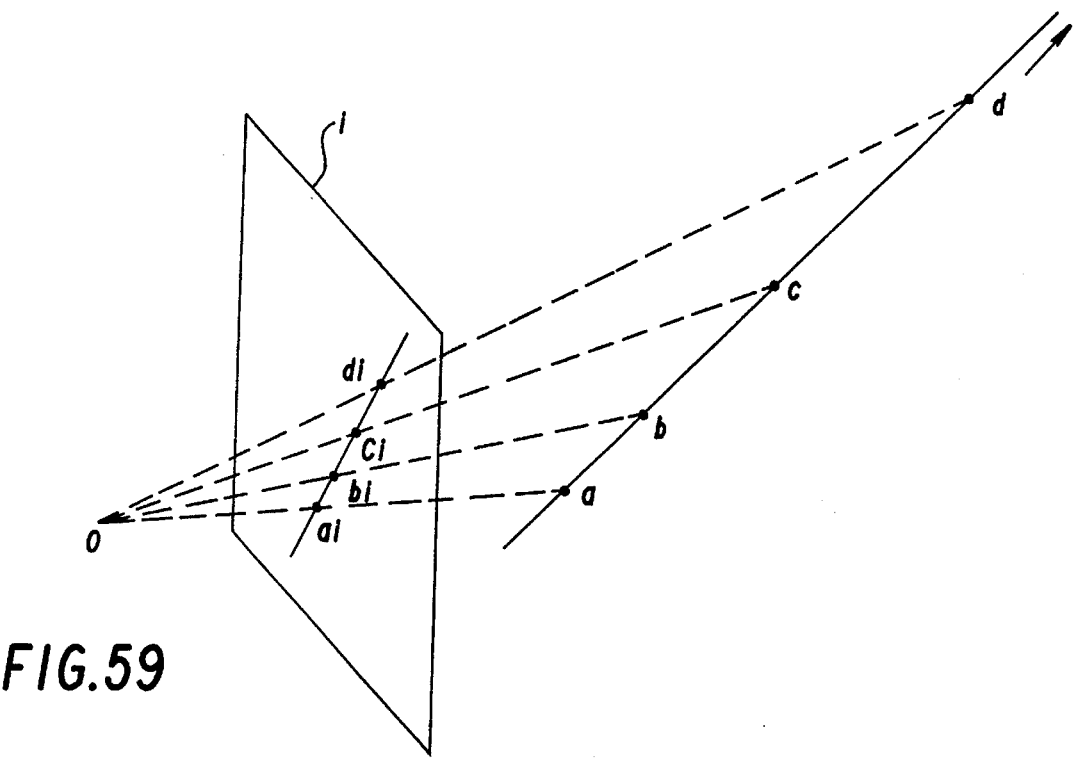
FIG. 59 is a diagram showing the manner in which a vanishing point is determined.

FIG. 59 shows the manner in which a vanishing point is determined when four points on one straight line are projected onto the image plane i. If a cross ratio R of four points a, b, c, d on a straight line are expressed as R (a, b, c, d), then it is defined as follows:

$$R(a, b, c, d)=(ac/bc)/(ad/bd) \qquad (51),$$

and is equal to a cross ratio R (ai, bi, ci, di) with respect to four points ai, bi, ci, di projected onto the image plane i because the cross ratio is generally preserved by projection. If three points on a straight line whose distances are known and their image points are given, then because their cross ratios R are equal to each other, a vanishing point on the image plane i can be determined as follows:

$$(ac/bc)/(ad/bd)=(aici/bici)/(aidi/bidi) \qquad (52).$$

If the point d is brought to an infinite distance on a straight line, then $$di=(ai*bici*ac-bi*aici*bc)/(bici*ac-aici*bc) \qquad (53)$$

and di represents the coordinates of a vanishing point on the image plane i. a, b indicates coordinates of the point and ab, aici represent the distance between two points.

If the points U, C, V of the target mark A are given in place of the points a, b, c, then since the distances therebetween are of known values as the radius r, the vanishing point can uniquely be determined from the coordinates in the image plane containing two points on a circumference having a desired diameter and the central point C of the circle. The direction of a line segment extending from the viewpoint O to the vanishing point is aligned with the direction of a line segment interconnecting the points U, V on the circumference of the target mark A. However, since the values corresponding to the distances ac, bc in the above equation are r, they are canceled out by each other as they are in the denominator and numerator, and hence the radius of the circle of the target mark A may not be known.

When two or more vanishing points with respect to a projected image of a straight line interconnecting desired two points on the circumference which define the diameter of the circle of the target mark A in the image plane, the normal vector Zt (see FIG. 56) of the target mark A is determined from two diametrical vectors in the plane containing the circle of the target mark A, so that the attitude of the object 1 can be determined.

Then, a process of measuring the position of the target mark A accurately if the normal vector Zt of the target mark A is known will be described below.

Figure 60:
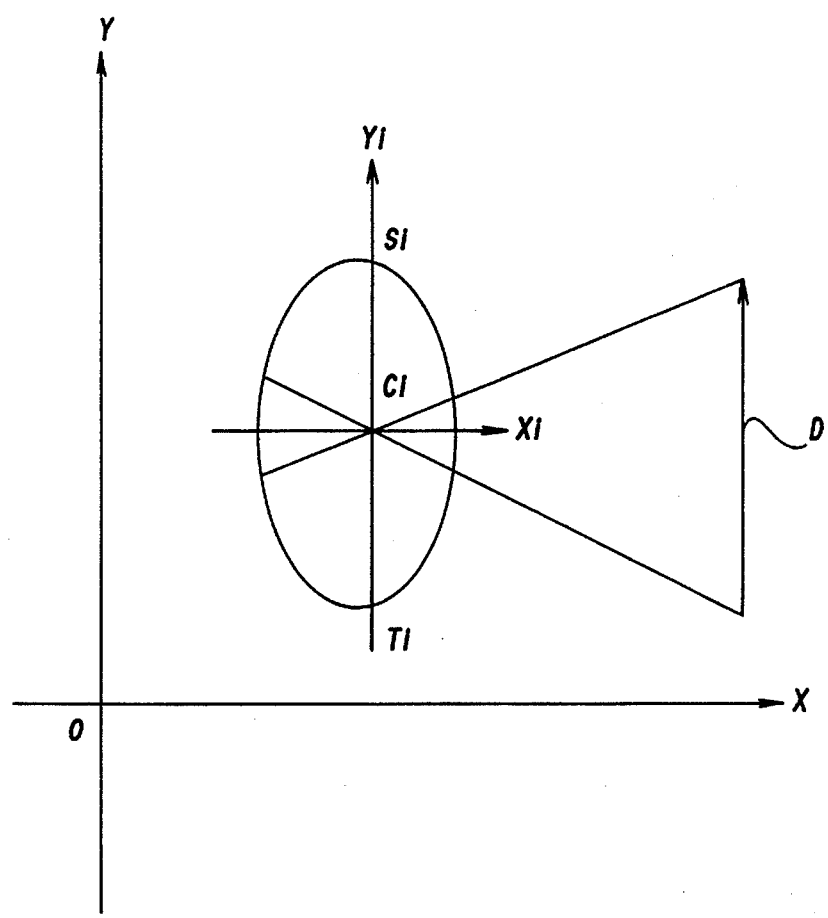
FIG. 60 is a diagram showing the manner in which the attitude of a target mark is determined.

FIG. 60 shows the manner in which the attitude of the target mark A is determined from the image Ai of the target mark A. Two or more straight lines, different from the line segment SiTi, passing through the image point Ci of the central point C in the image plane i are assumed, and two or more vanishing points are determined from the points of intersection between the straight lines and the projected image Ai of the circle. Based on the nature of the cross ratio, a certain vanishing line is determined from the vanishing points. The vanishing line determines a vector, like a vector D shown in FIG. 60, parallel to a straight line m serving as a diameter parallel to the image plane i of the target mark A in the object space. The normal vector of the target mark A is then determined according to the vector thus determined.

In FIG. 60, when the line segment SiTi is determined from the vector D parallel to the vanishing line, the coordinates of the central point C are determined as C $(px_o, py_o, pf)$ from the coordinates of the image point Ci by the ratio p between the diameter 2r of the circle and the distance between the image points Si, Ti in the image plane i.

Furthermore, when the line segment SiTi is to be extracted in the image plane i of the target mark A, if the direction of the axis Zt in the object plane, i.e., the normal vector of the target mark A, is known, a diametrical vector parallel to the image plane i of the target mark A can be determined, as with the vector D, by the outer product of the normal vector of the target mark A and the normal vector of the image plane i.

Figure 61:
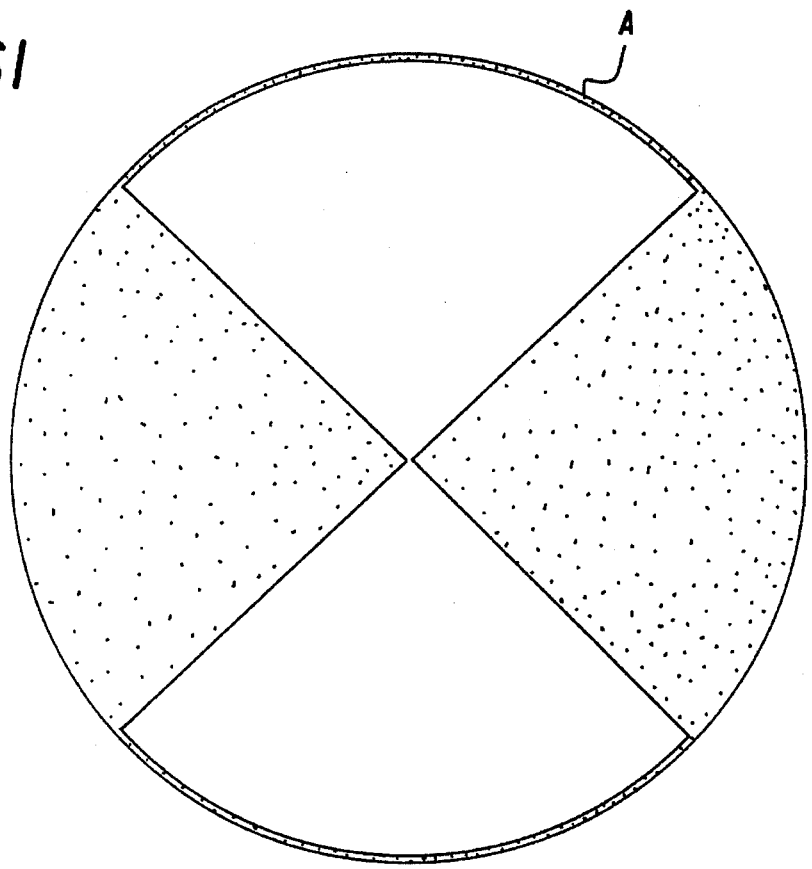
FIG. 61 is a view showing a target mark by way of example.

FIG. 61 shows a target mark A by way of example. The target mark A comprises a circle divided into four regions by two perpendicular diameters, the four regions being alternately painted white and black to define its central point. If the central point is expressed by a dot having a certain area to define itself, it is necessary to extract the center of gravity thereof as a central point. However, since the center of gravity is not necessary in agreement with the central point, a certain error has heretofore been produced in the process of extracting feature points.

With the target mark A according to the present embodiment, the central point thereof is defined by the point of intersection between two boundary lines, and can be extracted with high sensitivity. Therefore, the image processor 5 can stably extract feature points without being affected by noise. The central point can be extracted with increased accuracy simply by defining the central point with the point of intersection between two diameters.

In this embodiment, as described above, the target mark is composed of a circle that does not depend on the attitude of an object and its central point. Therefore, the position and attitude can be measured with stable accuracy. Since the parameters used in the measurement of the position and attitude are few, accurate measurements are made possible with simple calculations.

Another embodiment in which no triangular target mark will be described below.

Figure 62:
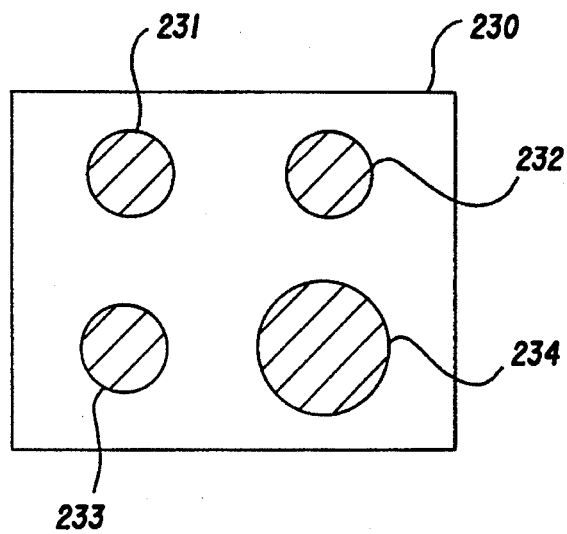
FIG. 62 is a plan view of a target mark according to a first example on an object.

FIG. 62 shows in plan a target mark according to a first example on an object. The target mark comprises four black (shown hatched) disk-shaped marks 231–234 disposed on a flat white background 230 and spaced by spaced distances from each other. At least one of the marks 231–234 has a radius different from those of the other marks. The target mark is attached to the object. The white background 230 of the target mark may not necessarily be flat. If the white background 230 is not flat, then it is necessary that the centers of gravity of the four disk-shaped marks 231–234 be positioned on a flat surface.

The target mark is imaged by a small-size CCD camera mounted on the tip of a manipulator, and image data is processed by a distance and attitude calculating apparatus.

Figure 63:
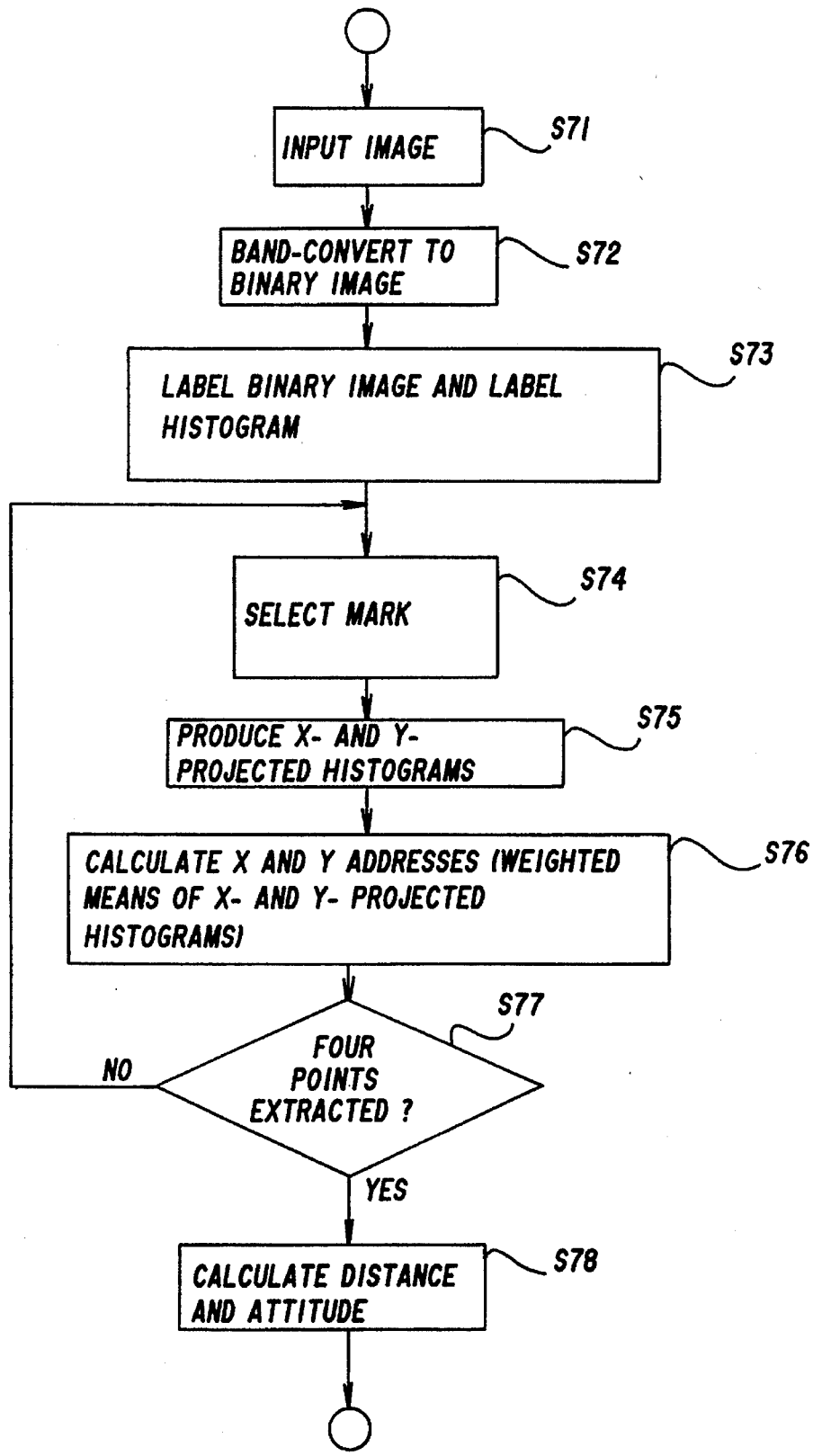
FIG. 63 is a flowchart of a first sequence for carrying out a distance and an attitude.

FIG. 63 is a flowchart of a first sequence of distance and attitude calculations carried out by the distance and attitude calculating apparatus. The first sequence of distance and attitude calculations will be described below with reference to the flowchart of FIG. 63. In FIG. 63, numerals following the letter "S" indicate step numbers.

[S71] Image data relative to the marks 231–234 are inputted from a camera.

[S72] The inputted image data are reversed in white and black, and converted into binary image data.

[S73] The binary image data are labeled. More specifically, as shown in FIG. 64(A), the mark 231 is assigned a label 4, the mark 232 a label 6, the mark 233 a label 7, and the mark 234 a label 3. Then, as shown in FIG. 64(B), the pixels in the regions that are assigned the label numbers are counted.

[S74] The mark having the label number with the greatest pixel count is selected from a mark selection range. First, the mark selection range contains all the marks 231–234, and hence the mark 234 assigned the label number 3 with the pixel count 8500 shown in FIG. 64(B) is selected. The mark selected in this step will be excluded from the mark selection range upon execution of this step in subsequent cycles. Therefore, when this step is executed in the next cycle, the mark 232 with the pixel count 5120 is selected. When this step is executed in the third cycle, the mark 233 with the pixel count 5114 is selected. When this step is executed in the fourth cycle, the remaining mark 231 is selected.

[S75] As shown in FIG. 65, the mark selected in the step S74, e.g., the mark 234, is processed in the X and Y directions to thereby produce X- and Y-projected histograms 235, 236.

[S76] Weighted means Xo, Yo of the X- and Y-projected histograms 235, 236 are determined, and regarded as the addresses in the respective X and Y directions of the center of gravity of the mark 234.

[S77] If the execution of the above steps S75, S76 is completed with respect to all the four marks 231–234, then control proceeds to a step S78. If not completed, control returns to the step S74.

[S78] A layout of the centers of gravity of the four marks 231–234 is determined based on the positions of the centers of gravity, and a four-point perspective problem is solved to calculate the distance up to and the attitude of the object. The solution of the four-point perspective problem will be described later on in detail. If the radius of at least one of the four circles is different from those of the other circles, a layout of the centers of gravity of the four circles can uniquely be determined.

As described above, the positions of the centers of gravity of the four disk-shaped marks 231–234 are determined based on the four disk-shaped marks 231–234 mounted on the object. Therefore, the positions of the four marks can accurately be determined, and the distance up to and the attitude of the object can accurately and simply be measured.

Figure 66A:
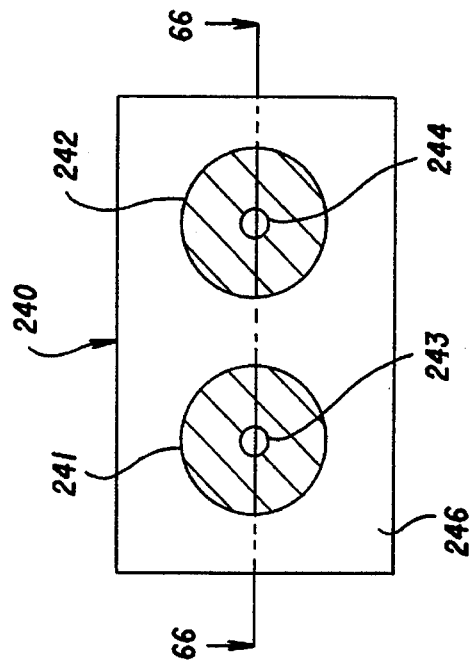
FIGS. 66(A) and 66(B) are plan and cross-sectional views of a target mark according to a second example on an object.
Figure 66B:
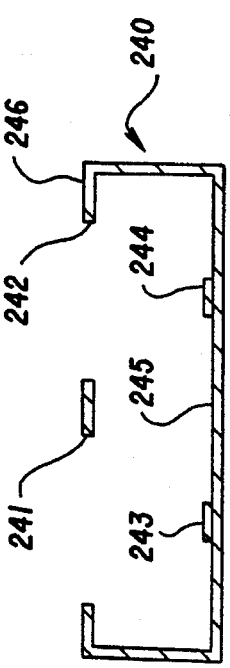

FIGS. 66(A) and 66(B) show a target mark according to a second example for attachment to an object. FIG. 66(A) is a plan view of the target mark, and FIG. 66(B) is a cross-sectional view of the target mark taken along line C-D of FIG. 66(A). The target mark comprises a box-shaped body 240 having two circular holes 241, 242 (hereinafter referred to as marks 241, 242) defined in an upper white panel 246, and two white disks 243, 244 (hereinafter referred to as marks 243, 244) placed on a bottom plate 245. The marks 241, 242 have different radii, and the marks 243, 244 have respective radii smaller than the marks 241, 242 and are located directly below the marks 241, 242. The inside of the box-shaped body 240 is black-colored. The target mark of the above structure is mounted on an object.

The target mark is imaged by a small-size CCD camera mounted on the tip of a manipulator, and image data is processed by a distance and attitude calculating apparatus.

Figure 67:
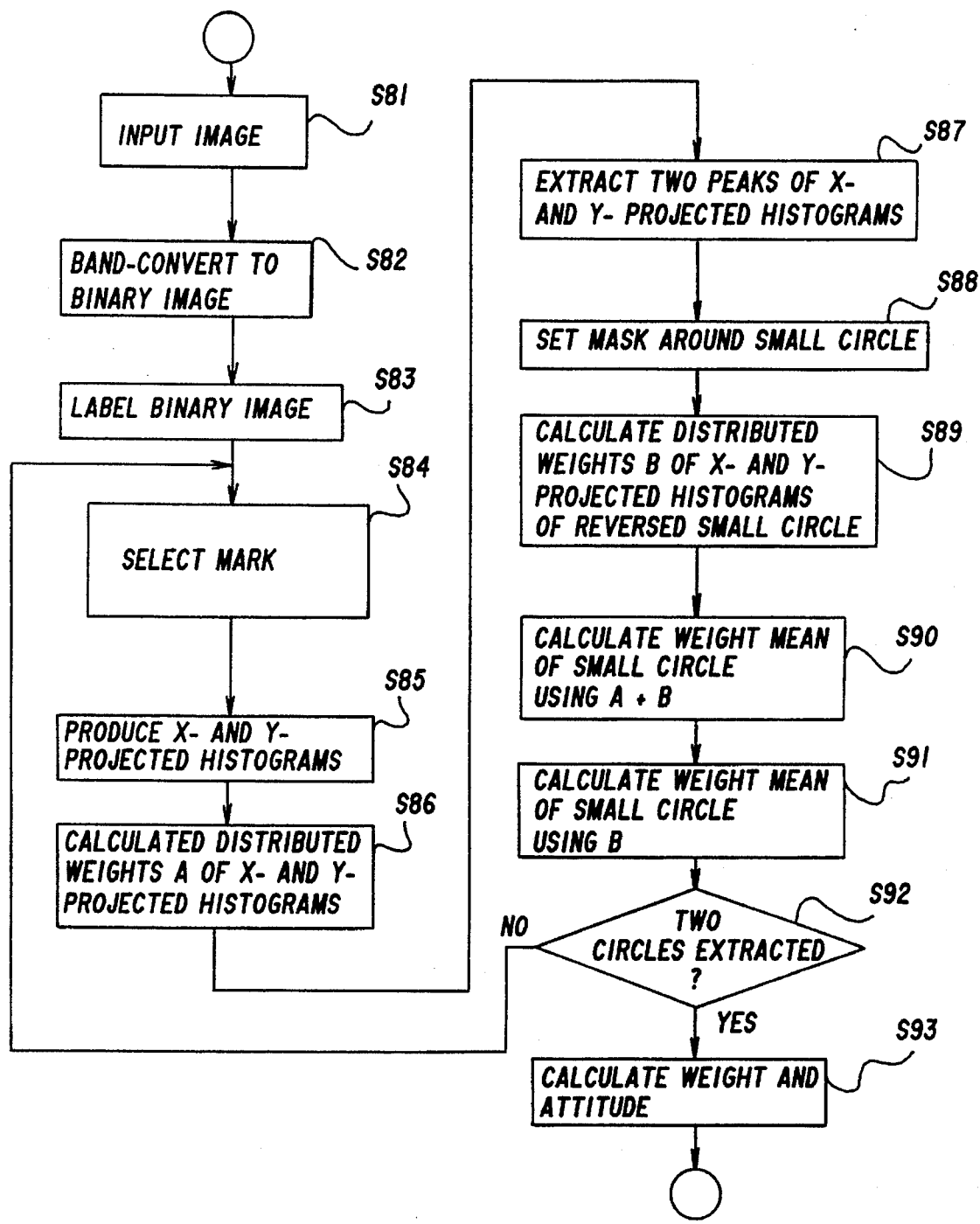
FIG. 67 is a flowchart of a second sequence for carrying out a distance and an attitude.

FIG. 67 is a flowchart of a second sequence of distance and attitude calculations carried out by the distance and attitude calculating apparatus. The second sequence of distance and attitude calculations will be described below with reference to the flowchart of FIG. 67. In FIG. 67, numerals following the letter "S" indicate step numbers.

[S81] Image data relative to the marks 241–244 are inputted from a camera.

[S82] The inputted image data are reversed in white and black, and converted into binary image data.

[S83] The binary image data are labeled. Then, the pixels in the regions that are assigned the same label numbers are counted.

[S84] The mark having the label number with the greater pixel count is selected from the marks 241, 242 which are larger circles. When this step is executed in the next cycle, the mark having the label number with the smaller pixel count is selected from the marks 241, 242 which are larger circles.

Figure 68A:
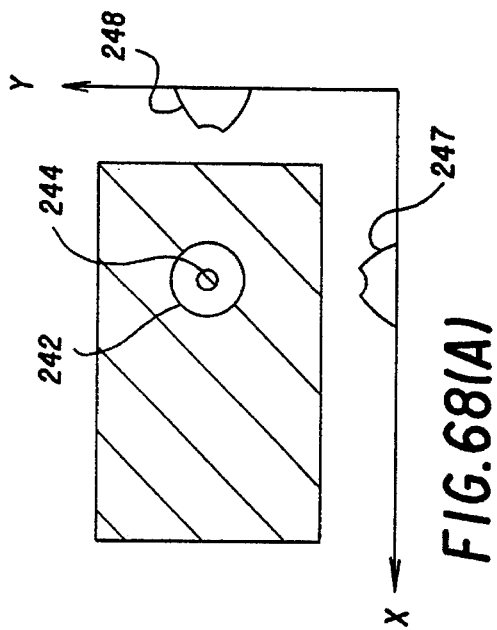
FIGS. 68(A) and 68(B) are diagrams X- and Y-projected histograms.

[S85] As shown in FIG. 68(A), the mark selected in the step S84, e.g., the mark 242, and the mark 244 positioned within the mark 242 are processed in the X and Y directions to thereby produce X- and Y-projected histograms 247, 248.

[S86] Weighted means Ax, Ay of the X- and Y-projected histograms 235, 236 are determined.

[S87] Two peaks of each of the X- and Y-projected histograms 235, 236 are extracted, and their X and Y coordinates are determined.

Figure 68B:
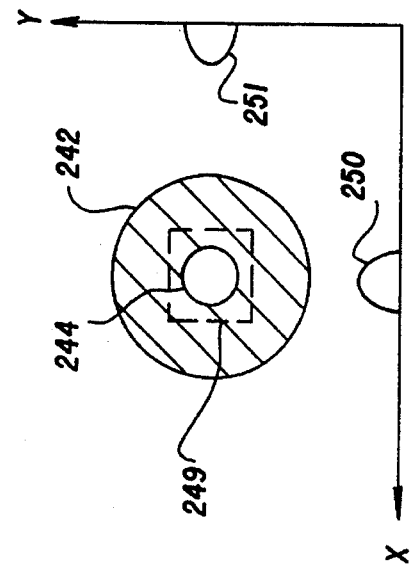

[S88] As shown in FIG. 68(B) which is an enlarged view of the mark 244 shown in FIG. 68(A), a mask 249 is established slightly outside of a range surrounded by X and Y coordinates of the peaks determined in the step S87.

[S89] As shown in FIG. 68(B), the data in the mask 249 established in the step S88 is reversed in white and black and processed to produce X- and Y-projected histograms 250, 251. Then, weighted means Bx, By of the X- and Y-projected histograms 250, 251 are determined.

[S90] The weighted means Ax, Ay determined in the step S86 and the weighted means Bx, By determined in the step S89 are added to determine Ax+Ay, Bx+By (which are weighted means of only the mark 242 that is a larger circle). Based of these sums Ax+Ay, Bx+By, weighted means in the X and Y directions of the mark 242 are determined and regarded as the addresses in the respective X and Y directions of only the mark 242.

[S91] Based on the weighted means Bx, By determined in the step S89 (which are weighted means of only the mark 244 that is a smaller circle), weighted means in the X and Y directions of the mark 244 are determined and regarded as the addresses in the respective X and Y directions of only the mark 244. The addresses in the respective X and Y directions of only the mark 244 are the addresses of the position of the center of gravity in a projected figure which is obtained by projecting the mark 244 toward the camera onto a plane of the mark 242.

[S92] If the execution of the above steps S85–S91 is completed with respect to the two marks 241, 242, then control proceeds to a step S93. If not completed, control returns to the step S84.

[S93] A layout of the centers of gravity of the four marks 241–244 is determined based on the positions of the centers of gravity, and a four-point perspective problem is solved to calculate the distance up to and the attitude of the object. The solution of the four-point perspective problem will be described later on in detail.

Since the four marks 241–244 are mounted on the object, the distance up to and the attitude of the object can accurately be measured without lowering the resolution even when the camera faces the object head on.

Figure 69:
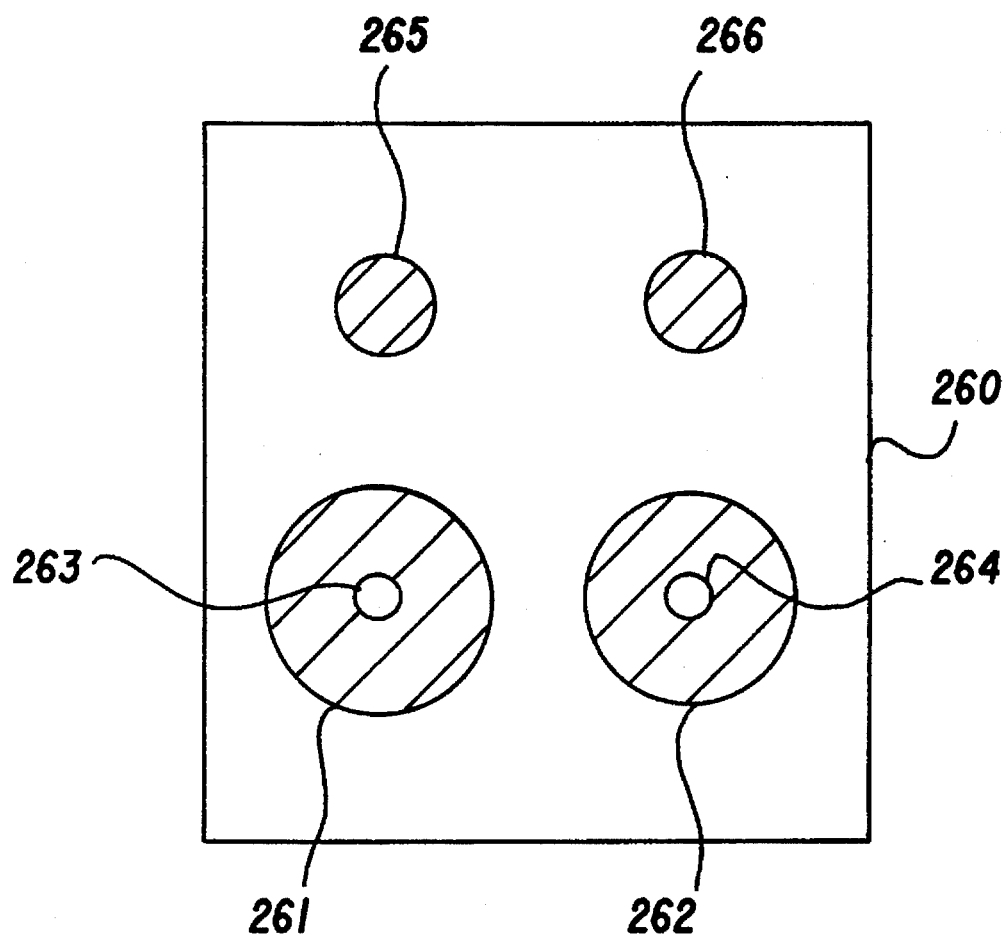
FIG. 69 is a plan view of a target mark according to a third example on an object.

FIG. 69 shows in plan a target mark according to a third example on an object. In FIG. 69, the target mark is composed of marks 261–264 which are identical in structure to the marks 241–244 of the target mark according to the second example shown in FIG. 66, and marks 261, 262, 265, 266 which are identical in structure to the marks 231–234 of the target mark according to the first example shown in FIG. 62. The target mark is mounted on an object.

The target mark is imaged by a small-size CCD camera mounted on the tip of a manipulator, and image data is processed by a distance and attitude calculating apparatus.

Figure 70:
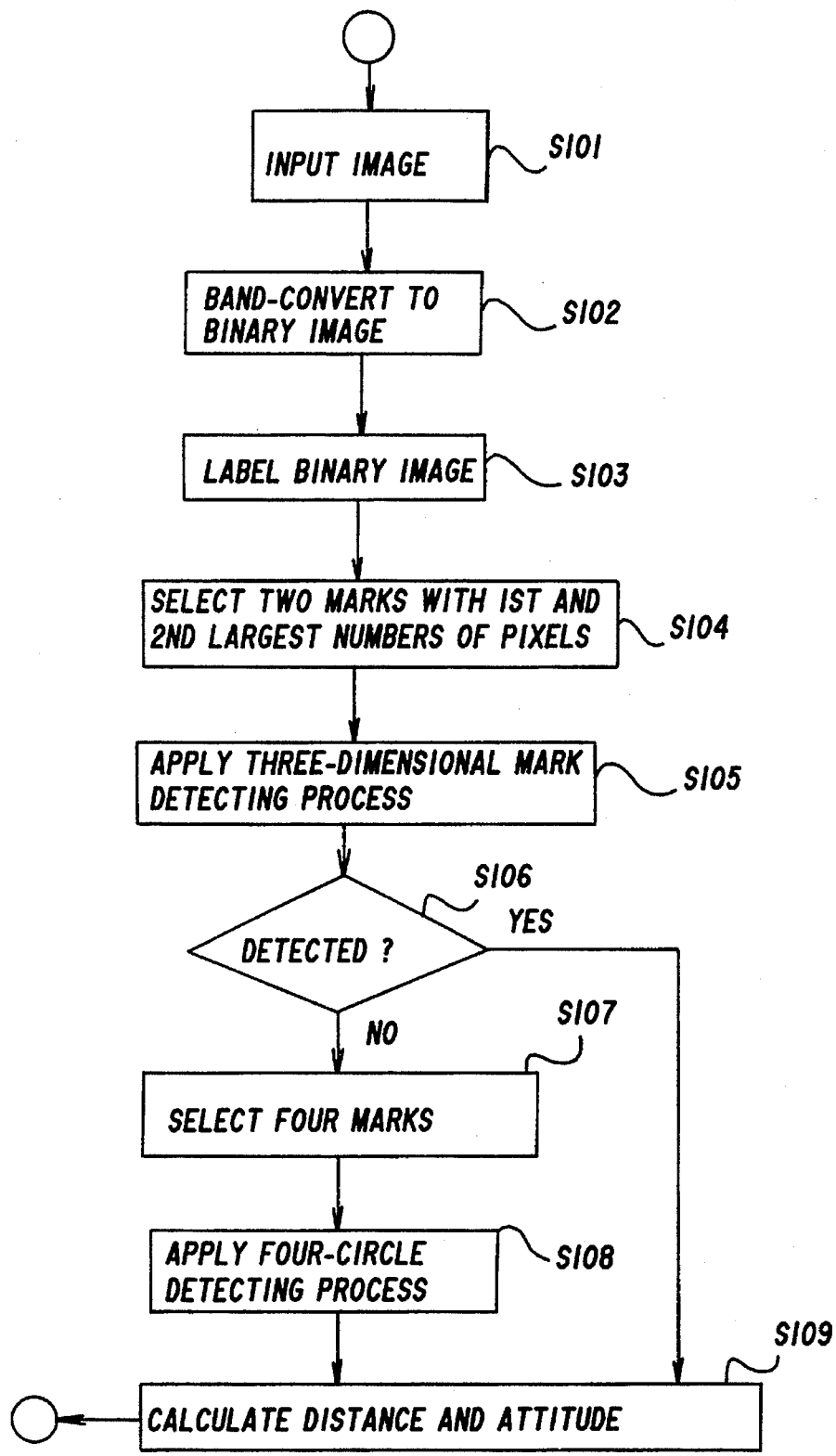
FIG. 70 is a flowchart of a third sequence for carrying out a distance and an attitude.

FIG. 70 is a flowchart of a third sequence of distance and attitude calculations carried out by the distance and attitude calculating apparatus. The third sequence of distance and attitude calculations will be described below with reference to the flowchart of FIG. 70. In FIG. 70, numerals following the letter "S" indicate step numbers.

[S101] Image data relative to the marks 261–266 are inputted from a camera.

[S102] The inputted image data are reversed in white and black, and converted into binary image data.

[S103] The binary image data are labeled. Then, the pixels in the regions that are assigned the same label numbers are counted.

[S104] Two marks having label numbers with the largest and second largest pixel counts, i.e., the marks 261, 262, are selected.

[S105] A three-dimensional mark detecting process, i.e., the same process as the steps S84–S92 shown in FIG. 67, is effected on the marks 261, 262 selected in the step S104 and the marks 263, 264 positioned in these marks 261, 262.

[S106] If the four centers of gravity are detected by the execution of the step S105, then control goes to a step S109. If the direction of the camera is largely inclined to the disk-shaped marks and the marks 263, 264 are concealed from view by the marks 261, 262 and hence cannot be detected, then control proceeds to a step S107.

[S107] The marks 261, 262, 265, 266 on a flat surface 260 are selected.

[S108] The same process as the steps S74–S77 shown in FIG. 63 is effected on the marks 261, 262, 265, 266 selected in the step S107.

[S109] Based on either the positions of the centers of gravity of the four marks 261–264 calculated in the step S105, or the positions of the centers of gravity of the four marks 261, 262, 265, 266 calculated in the step S108, a four-point perspective problem is solved to calculate the distance up to and the attitude of the object. The solution of the four-point perspective problem will be described later on in detail.

As described above, usually the three-dimensional mark detecting process in the step S105 which has good resolution is applied. However, when the direction of the camera is largely inclined to the disk-shaped marks, the marks 263, 264 are concealed from view by the marks 261, 262, making it impossible to detect the two positions of their centers of gravity. In this case, the detecting process in the step S108 is applied.

The solution of the four-point perspective problem (algorithm) will be described below.

Figure 71:
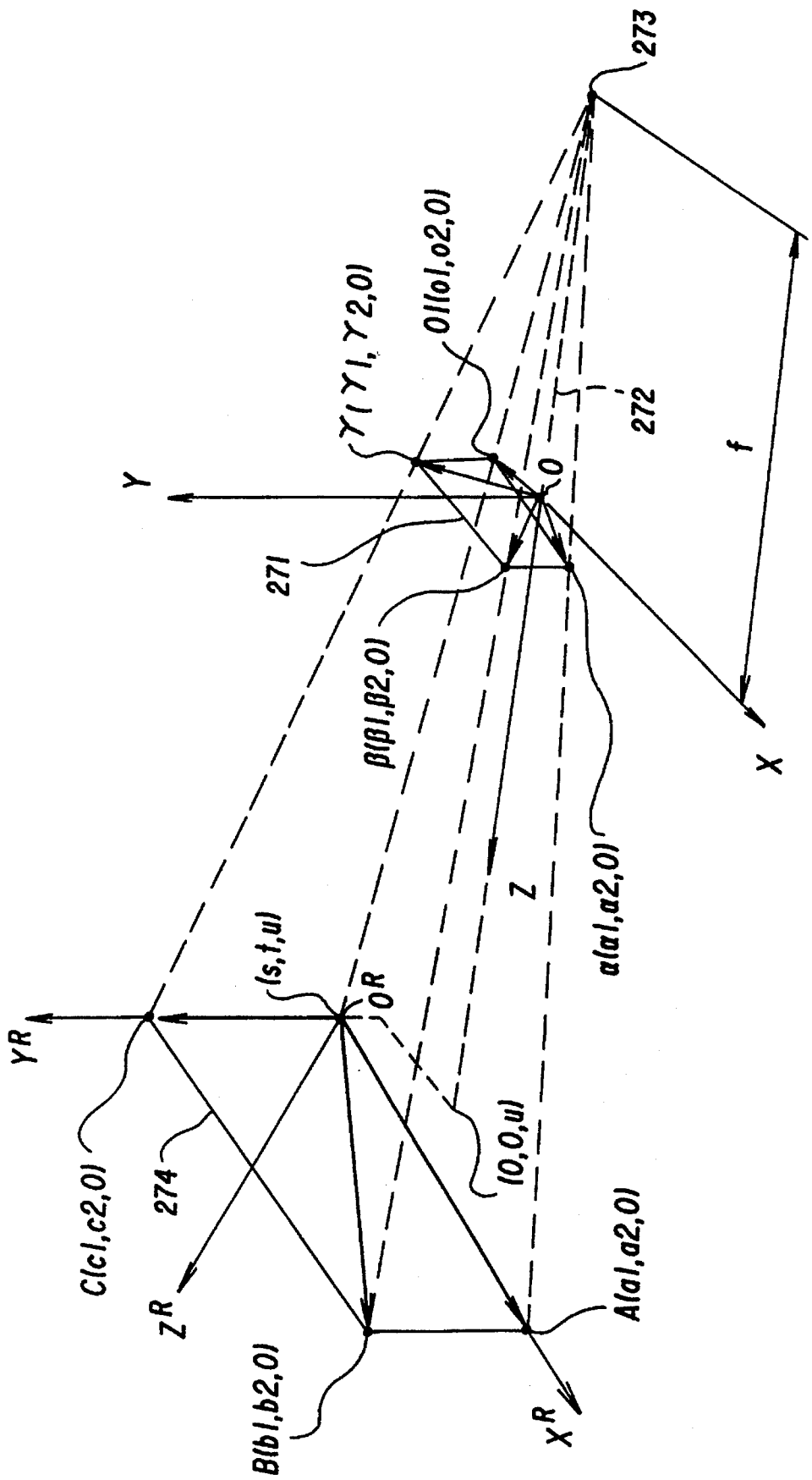
FIG. 71 is a diagram showing a coordinate system fixed to an object and a coordinate system fixed to a camera.

FIG. 71 shows a coordinate system fixed to an object and a coordinate system fixed to a camera. A reference coordinate system is established on an image plane 271 of the camera. At this time, a right-hand coordinate system is established which has its origin O positioned at the point of intersection between an optical axis 272 and the image plane 271, a Z-axis aligned with the direction of the camera (the optical axis 272), an X-axis on the left-hand side of the camera direction, and a Y-axis above the camera direction. The camera is modeled such that a focal point 273 is located at a point spaced a distance f in the negative direction of the Z-axis. The camera is simply modeled here though an actual perspective transformation matrix needs to take the actual lens system into account.

The object coordinate system has an origin $O^R$ at one of four feature points (the positions of the centers of gravity described above) that are used for measurement. The object coordinate system has a $Z^R$-axis normal to a plane 274 where the four points exist, and $X^R$- $Y^R$- and $Z^R$-axes selected such that the object coordinate system is a right-hand coordinate system. In the object coordinate system thus arranged, three vectors extending from the origin $O^R$ toward the other three feature points are represented by A (a1, a2, 0), B (b1, b2, 0), and C (c1, c2, 0), respectively (each feature point exists in an $X^R Y^R$ plane).

The feature points $O^R$, A, B, C are projected onto the image plane 271 at respective points O1, α, β, γ, and vectors from the origin O to the respective projected points are represented by O1 (o1, o2, 0), α (α1, α2, 0), β (β1, β2, 0), β (β1, β2, 0), and γ (γ1, γ2, 0). The above definition makes it possible to express the feature points $O^R$, A, B, C and the projected points O1, α, β, γ on the image plane 271 with respect to the coordinate systems.

A coordinate transformation between the feature points $O^R$ A, B C and the feature points (projected points) O1, α, β, γ on the image plane 271 will be described below.

First, a transformation matrix which links the vectors A, B, C from the object coordinate system origin $O^R$ and the feature point vectors α, β, γ on the image plane is determined. Hereinafter, the vectors will be indicated by homogeneous coordinates in which the fourth component is normalized to 1.

As shown in FIG. 71, the coordinate system $O^R$-$X^R Y^R Z^R$ can be understood as being created by translating the coordinate system O-XYZ by x in the X-axis direction, by t in the Y-axis direction, and by u in the Z-axis direction, and further rotating the coordinate system O-XYZ. Therefore, the vectors A, B, C and the vectors α, β, γ are linked to each other by a transformation matrix T indicating translation and rotation and a transformation matrix indicating a perspective transformation PzP.

Therefore, the following equation (54) is satisfied:

$$I = P_z PTU \cdot I^R \quad (54)$$

where U is a unit transformation matrix, $I^R$ a vector expressed in the coordinate system $O^R\text{-}X^R Y^R Z^R$, and I a vector, which is produced by a perspective transformation of the vector $I^R$ onto an XY plane, expressed in the coordinate system O-XYZ. Pz, P, T, U are the following matrices, respectively:

$$T = \begin{bmatrix} n_{11} & n_{12} & n_{13} & s \\ n_{21} & n_{22} & n_{23} & t \\ n_{31} & n_{32} & n_{33} & u \\ 0 & 0 & 0 & 1 \end{bmatrix}, \quad (55)$$

$$P = \begin{bmatrix} -1 & 0 & 0 & 0 \\ 0 & -1 & 0 & 0 \\ 0 & 0 & -1 & 0 \\ 0 & 0 & -1/f & 1 \end{bmatrix}, \quad (56)$$

$$P_z = \begin{bmatrix} 1 & 0 & 0 & 0 \\ 0 & 1 & 0 & 0 \\ 0 & 0 & 0 & 0 \\ 0 & 0 & 0 & 1 \end{bmatrix}, \text{ and} \quad (57)$$

$$U = \begin{bmatrix} p & 0 & 0 & 0 \\ 0 & p & 0 & 0 \\ 0 & 0 & p & 0 \\ 0 & 0 & 0 & 1 \end{bmatrix}. \quad (58)$$

where p is expressed by p=f/F (f: the focal length expressed by the number of pixels and F: the focal length expressed in the unit of meters or the like), and is the number of pixels per unit length.

T represents translation and rotation between the coordinate system $O^R\text{-}X^R Y^R Z^R$ and the coordinate system O-XYZ. P represents a perspective transformation of the focal length f, and Pz represents a projected transformation onto the XY plane. The unit vectors of the respective $X^R$-, $Y^R$-, $Z^R$-axes of the coordinate system $O^R\text{-}X^R Y^R Z^R$ are expressed with respect to their components in the coordinate system O-XYZ as follows:

$$n_{X^R} = (n_{11}, n_{21}, n_{31})^T \quad (59)$$

$$n_{Y^R} = (n_{12}, n_{22}, n_{32})^T \quad (60),$$

and $$n_{Z^R} = (n_{13}, n_{23}, n_{33})^T \quad (61).$$

Calculating PzPTU based on the equations (55)–(58) results in the following transformation equation (62):

$$I = \begin{bmatrix} -pn_{11} & -pn_{12} & -pn_{13} & -s \\ -pn_{21} & -pn_{22} & -pn_{23} & -t \\ 0 & 0 & 0 & 0 \\ -prn_{31} & -pr_{32} & -pr_{33} & 1-ru \end{bmatrix} I^R \quad (62)$$

where r=1/f.

In the transformation equation (62), the vectors A, B, C are substituted for the vector $I^R$ and the vectors α, β, γ are substituted for the vector I.

$$I^R = \begin{bmatrix} a1 \\ a1 \\ 0 \\ 1 \end{bmatrix}, \begin{bmatrix} b1 \\ b1 \\ 0 \\ 1 \end{bmatrix}, \begin{bmatrix} c1 \\ c1 \\ 0 \\ 1 \end{bmatrix}, \quad (63, 64, 65)$$

$$I = \begin{bmatrix} \alpha 1 \\ \alpha 2 \\ 0 \\ 1 \end{bmatrix}, \begin{bmatrix} \beta 1 \\ \beta 2 \\ 0 \\ 1 \end{bmatrix}, \begin{bmatrix} \gamma 1 \\ \gamma 2 \\ 0 \\ 1 \end{bmatrix}. \quad (66, 67, 68)$$

From the equations (62), (63), (66) is obtained the following equation (69):

$$\begin{bmatrix} \alpha 1 \\ \alpha 2 \\ 0 \\ 1 \end{bmatrix} = P_z PTU \cdot \begin{bmatrix} a1 \\ a1 \\ 0 \\ 1 \end{bmatrix} = \quad (69)$$

$$\begin{bmatrix} -pn_{11} & -pn_{12} & -pn_{13} & -s \\ -pn_{21} & -pn_{22} & -pn_{23} & -t \\ 0 & 0 & 0 & 0 \\ -prn_{31} & -pr_{32} & -pr_{33} & 1-ru \end{bmatrix} \begin{bmatrix} a1 \\ a2 \\ 0 \\ 1 \end{bmatrix}.$$

This equation can be expressed by the following equation (70):

$$\begin{bmatrix} \alpha 1 \\ \alpha 2 \\ 0 \\ 1 \end{bmatrix} = \begin{bmatrix} -pa1n_{11} - pa2n_{12} - s \\ -pa1n_{21} - pa2n_{22} - t \\ 0 \\ -pa1rn_{31} - pa2rn_{32} + 1 - ru \end{bmatrix}. \quad (70)$$

Since the equation (70) is a simultaneous coordinate representation, it can be modified into the following equation (71):

$$\begin{bmatrix} \alpha 1 \\ \alpha 2 \\ 0 \\ 1 \end{bmatrix} = \begin{bmatrix} \dfrac{-pa1n_{11} - pa2n_{12} - s}{-pa1rn_{31} - pa2rn_{32} + 1 - ru} \\ \dfrac{-pa1n_{21} - pa2n_{22} - t}{-pa1rn_{31} - pa2rn_{32} + 1 - ru} \\ 0 \\ 1 \end{bmatrix}. \quad (71)$$

The projected point O1 of the object coordinate system origin $O^R$ can be expressed as follows:

$$\begin{bmatrix} o1 \\ o2 \\ 0 \\ 1 \end{bmatrix} = P_z PTU \cdot \begin{bmatrix} 0 \\ 0 \\ 0 \\ 1 \end{bmatrix} = \begin{bmatrix} -s \\ -t \\ 0 \\ 1-ru \end{bmatrix} = \begin{bmatrix} s/(ru-1) \\ t/(ru-1) \\ 0 \\ 1 \end{bmatrix}. \quad (72)$$

$$o1 = s/(ru-1). \quad (73)$$
$$o2 = t/(ru-1). \quad (74)$$

Both sides of the equation (71) are compared with each other, and the equations (73), (74) are substituted therein and organized into the following equations (75), (76):

$$(\alpha 1 - o1)(u - f)/p = (fa1n_{11} + fa2n_{12} - \alpha 1 a1n_{31} + \alpha a1a2n_{32}) \quad (75),$$

and $$(\alpha 2 - o2)(u - f)/p = (fa1n_{21} + fa2n_{22} - \alpha 2 a1n_{31} + \alpha 2 a2n_{32}) \quad (76).$$

The equations (62), (64), (67), and the equations (62), (65), (68) are similarly modified as follows:

$$(\beta 1 - o1)(u - f)/p = (fb1n_{11} + fb2n_{12} - \beta 1 b1n_{31} + \beta 1 b2n_{32}) \quad (77)$$

$$(\beta 2 - o2)(u - f)/p = (fb1n_{21} + fb2n_{22} - \beta 2 b1n_{31} + \beta 2 b2n_{32}) \quad (78)$$

$$(\gamma 1 - o1)(u - f)/p = (fc1n_{11} + fc2n_{12} - \gamma 1 c1n_{31} + \gamma 1 c2n_{32}) \quad (79),$$

and $$(\gamma 2 - o2)(u-f)/p = (fc1n_{21} + fc2n_{22} - \gamma 2c1n_{31} + \gamma 2c2n_{32}) \quad (80).$$

When the above equations are put together, the following linear equation (81) is obtained:

$$\begin{bmatrix} fa1 & fa2 & 0 & 0 & -\alpha 1a1 & -\alpha 1a2 \\ 0 & 0 & fa1 & fa2 & -\alpha 2a1 & -\alpha 2a2 \\ fb1 & fb2 & 0 & 0 & -\beta 1b1 & -\beta 1b2 \\ 0 & 0 & fb1 & fb2 & -\beta 2b1 & -\beta 2b2 \\ fc1 & fc2 & 0 & 0 & -\gamma 1c1 & -\gamma 1c2 \\ 0 & 0 & fc1 & fc2 & -\gamma 2c1 & -\gamma 2c2 \end{bmatrix} \begin{bmatrix} n_{11} \\ n_{12} \\ n_{21} \\ n_{22} \\ n_{31} \\ n_{32} \end{bmatrix} = \begin{bmatrix} \alpha 1 - o1 \\ \alpha 2 - o2 \\ \beta 1 - o1 \\ \beta 2 - o2 \\ \gamma 1 - o1 \\ \gamma 2 - o2 \end{bmatrix} (u-f)/p. \quad (81)$$

If the 6×6 matrix in the equation (81) is regarded as a measurement matrix M, then the following equation is derived from the equation (81):

$$\begin{bmatrix} pn_{11}/(u-f) \\ pn_{12}/(u-f) \\ pn_{21}/(u-f) \\ pn_{22}/(u-f) \\ pn_{31}/(u-f) \\ pn_{32}/(u-f) \end{bmatrix} = M^{-1} \begin{bmatrix} \alpha 1 - o1 \\ \alpha 2 - o2 \\ \beta 1 - o1 \\ \beta 2 - o2 \\ \gamma 1 - o1 \\ \gamma 2 - o2 \end{bmatrix}. \quad (82)$$

$n_{XR} = (n_{11}, n_{21}, n_{31})^T$, $n_{YR} = (n_{12}, n_{22}, n_{32})^T$ can be determined from the equation (82). s, t, u are determined as follows:

Since the norm of $n_{XR}$ is a unit vector, $$(n_{11})^2 + (n_{21})^2 + (n_{31})^2 = 1 \quad (83).$$

Q is derived from the equation (82) as follows:

$$(n_{11}^2 + n_{21}^2 + n_{31}^2) = (p/(u-f))^2 = Q \quad (84).$$

Hence, $$p/(u-f) = Q^{1/2} \quad (85).$$

From the equations (73), (74), and (85), $$u = p/Q^{1/2} + f \quad (86)$$

$$s = po1/fQ^{1/2} \quad (87),$$

and $$t = po2/fQ^{1/2} \quad (88).$$

From the equations (82), (86), (87), and (88), all the transformation equations between the coordinate system $O^R$-$X^R Y^R Z^R$ and the coordinate system O-XYZ are determined and can be expressed by the following equation (89):

$$I = TI^R \quad (89)$$

where T is referred to as a transformation matrix and given by the following equation (90):

$$T = \begin{bmatrix} n_{11} & n_{12} & n_{13} & s \\ n_{21} & n_{22} & n_{23} & t \\ n_{31} & n_{32} & n_{33} & u \\ 0 & 0 & 0 & 1 \end{bmatrix} \quad (90)$$

where $(n_{13}, n_{23}, n_{33})^T = n_{XR} \times n_{YR}$.

It is assumed that $X^R$ has been converted to the number of pixels.

Through the above formulation, the spatial layout of the feature points $O^R$, A, B, C is determined, and the distance up to the object and the attitude of the object can be expressed by the transformation matrix T that is derived.

The matrix representation, however, cannot give the operator an intuitive concept of the attitude of the object. Therefore, it is converted to either a roll-pitch-yaw representation which is considered to be a general scheme in representing the attitude of robots or a quaternionic representation that is often used in space applications.

In the above embodiment, as described above, since the positions of the centers of gravity of the four disk-shaped marks are determined based on the four disk-shaped marks that are mounted on the object, the positions of the four marks can accurately be determined, and hence the distance up to and the attitude of the object can accurately and simply be measured.

Since a three-dimensional target mark composed of four disk-shaped marks is mounted on an object, even when the imaging means faces the object head on, the distance up to and the attitude of the object can accurately be measured without a reduction in the resolution.

Furthermore, under normal conditions, the distance up to and the attitude of the object is accurately measured without a reduction in the resolution using the three-dimensional target mark. When the direction of the imaging means is largely tilted with respect to the disk-shaped marks and smaller-circle marks are concealed from view by larger-circle marks, four flat disk-shaped marks are used to eliminate the drawback of the three-dimensional mark.

We claim:

1. A target mark attitude detecting method of detecting the attitude of a target mark to detect the attitude of an object about the direction of a camera based on an image produced by the camera of a target mark which is composed of at least a triangle of a particular shape, comprising the steps of:

determining projected histograms in X and Y directions of the image of the triangle of said target mark;

determining the positions of the centers of gravity in the X and Y directions of the image of the triangle of said target mark in said projected histograms;

determining maximum histogram values and X- and Y-axis values in said projected histograms;

determining which of classified and preset attitude patterns the attitude of the triangle of said target mark belongs to based on the positions of the centers of gravity, the maximum histogram values, the X- and Y-axis values, and known geometrical data of said target mark; and calculating the attitude of the triangle of the target mark in the determined attitude pattern about the direction of the camera.

2. A target mark attitude detecting method according to claim 1, wherein the attitude of the triangle of the target mark about the direction of the camera is compared with a reference attitude of the triangle of the target mark about the direction of the camera to determine a shift of a roll angle of the triangle of the target mark about the direction of the camera.

3. A target mark attitude detecting method according to claim 1, wherein if the classified and preset attitude patterns include a plurality of different attitudes, then the attitude of the target mark is detected again after rolling the attitude of the camera slightly.

4. A target mark attitude detecting method according to claim 1, wherein said target mark includes a disk disposed behind said triangle, and the projected histograms of said triangle in the X and Y directions are determined by deducing measured projected histograms in the X and Y directions of the image of said target mark from calculated projected histograms in the X and Y directions of an image of only said disk.

5. A target mark attitude detecting method according to claim 4, wherein said projected histograms in the X and Y directions of the image of only said disk are calculated based on known geometrical data of said disk by determining two coordinates where histogram values are predetermined values, in each of the measured projected histograms in the X and Y directions of the image of said target mark, and regarding a center of the determined two coordinates as the center of said disk.

6. A target mark attitude detecting method according to claim 4, comprising the steps of:

determining the positions of the centers of gravity of the measured projected histograms in the X and Y directions of the image of said target mark which is composed of the triangle and the disk disposed behind the triangle;

determining central coordinates of the image of said disk;

determining the ratio between the area of said disk and the area of said triangle; and calculating the position of the center of gravity of said triangle based on the positions of the centers of gravity of the target mark, the central coordinates of said disk, and said ratio.

7. A position and attitude measuring apparatus for measuring the position and the attitude of an object based on an image of a target mark, comprising:

a target mark disposed on a particular flat surface of an object and composed of a circle and a central point thereof;

a camera for imaging said target mark to generate an image of the circle and the central point thereof;

feature extracting means for extracting feature points required to measure the position and attitude of said object, from the image of said target mark; and calculating means for calculating the position and attitude of said target mark in an object space according to projective geometrical calculations on said feature points.

8. A position and attitude measuring apparatus according to claim 7, wherein said feature extracting means extracts two image points for defining a diameter parallel to an image plane of the target mark among diameters of the circle in the object space, from the image of the circle of said target mark, and said calculating means calculates the position of said target mark in said object space based on the distance between the extracted two image points, the value of the diameter of the circle of said target mark, and the coordinates in an image space of the central point of said target mark imaged by said camera.

9. A position and attitude measuring apparatus according to claim 8, wherein said feature extracting means determines a diameter which is divided into two equal parts by the image of the central point of said target mark in the image plane of said target mark, among the diameters of the circle of said target mark to thereby extract said two image points.

10. A position and attitude measuring apparatus according to claim 7, wherein said calculating means calculates a diametrical vector in the object space of said target mark from the coordinates in the image plane of optional two points on a circumference defining the diameter of the circle of said target mark and the central point of the circle, and wherein a normal vector of said target mark in said object space is determined from at least two diametrical vectors with respect to said target mark thereby to determine the attitude of the object to which said target mark is attached.

11. A position and attitude of an object measuring apparatus according to claim 10, wherein said calculating means determines a diametrical vector parallel to the image plane of said target mark from the outer product of a normal vector of said target mark and a normal vector of the image plane thereby to calculate the position of said target mark in said object space based on the distance between the two image points in the image space of the two points on the circumference defining the diameter of the circle of said target mark which is determined by said diametrical vector, the value of the diameter of the circle of said target mark, and the coordinates in the image space of the central point of said target mark imaged by said camera.

12. A position and attitude measuring apparatus according to claim 7, wherein the central point of the circle of said target mark is indicated by two intersecting line segments.

13. A position and attitude measuring apparatus according to claim 7, wherein the circle of said target mark is divided into regions by two diameters.

14. A distance and attitude measuring apparatus for measuring the distance up to and the attitude of an object, comprising:

four disk-shaped marks disposed on an object and having respective centers of gravity positioned in one plane, at least one of said disk-shaped marks having a radius different from the radii of the other disk-shaped marks;

imaging means for imaging said disk-shaped marks;

center-of-gravity calculating means for calculating the positions of the centers of gravity of the respective disk-shaped marks based on image data of said four disk-shaped marks which are outputted by said imaging means; and calculating means for solving a four-point perspective problem to calculate the distance up to and the attitude of the object based on the positions of the centers of gravity calculated by said center-of-gravity calculating means.

15. A distance and attitude measuring apparatus according to claim 14, wherein said center-of-gravity calculating means converts the image data of said four disk-shaped marks which are outputted by said imaging means to binary image data, generates vertically and horizontally projected histograms of the disk-shaped marks, and calculates the positions of the centers of gravity of the disk-shaped marks by way of weighted means.

16. A distance and attitude measuring apparatus for measuring the distance up to and the attitude of an object, comprising:

first and second disk-shaped marks having respective different radii and disposed on a first plane;

third and fourth disk-shaped marks disposed on a second plane which is different from said first plane;

imaging means for imaging the first through fourth disk-shaped marks;

center-of-gravity calculating means for calculating the positions of the centers of gravity of said first and second disk-shaped marks based on image data of said first through fourth disk-shaped marks which are outputted by said imaging means, and projecting said third and fourth disk-shaped marks toward said imaging means to calculate the positions of the centers of gravity in respective projected figures on said first plane; and calculating means for solving a four-point perspective problem to calculate the distance up to and the attitude of the object based on the four positions of the centers of gravity calculated by said center-of-gravity calculating means.

17. A distance and attitude measuring apparatus according to claim 16, wherein said third and fourth disk-shaped marks are positioned on a line which is perpendicular to a plane passing through the centers of gravity of said first and second disk-shaped marks and which passes through the centers of gravity of said first and second disk-shaped marks.

18. A distance and attitude measuring apparatus according to claim 17, wherein said third and fourth disk-shaped marks have respective radii smaller than the radii of said first and second disk-shaped marks.

19. A distance and attitude measuring apparatus for measuring the distance up to and the attitude of an object, comprising:

first through fourth disk-shaped marks mounted on an object and having respective centers of gravity positioned on one plane, at least one of said disk-shaped marks having a radius different from the radii of the other disk-shaped marks, said centers of gravity of said first through fourth disk-shaped marks being positioned on a first plane;

fifth and sixth disk-shaped marks disposed on a second plane which is different from said first plane;

imaging means for imaging the first through sixth disk-shaped marks;

first center-of-gravity calculating means for calculating the positions of the centers of gravity of said third and fourth disk-shaped marks based on image data of said third through sixth disk-shaped marks which are outputted by said imaging means, and projecting said fifth and sixth disk-shaped marks toward said imaging means to calculate the positions of the centers of gravity in respective projected figures on said first plane;

second center-of-gravity calculating means for calculating the positions of the centers of gravity of the disk-shaped marks based on image data of said first through fourth disk-shaped marks which are outputted by said imaging means; and calculating means for solving a four-point perspective problem to calculate the distance up to and the attitude of the object based on the four positions of the centers of gravity calculated by said first or second center-of-gravity calculating means.

20. A distance and attitude measuring apparatus according to claim 19, wherein said calculating means solves a four-point perspective problem to calculate the distance up to and the attitude of the object based on the four positions of the centers of gravity calculated by said first center-of-gravity calculating means while the four positions of the centers of gravity are being calculated by said first center-of-gravity calculating means, and solves a four-point perspective problem to calculate the distance up to and the attitude of the object based on the four positions of the centers of gravity calculated by said second center-of-gravity calculating means when said first center-of-gravity calculating means cannot calculate the four positions of the centers of gravity.

* * * * *